US007443601B2

(12) United States Patent
Yoshida et al.

(10) Patent No.: US 7,443,601 B2
(45) Date of Patent: Oct. 28, 2008

(54) ZOOM OPTICAL SYSTEM

(75) Inventors: Hirofumi Yoshida, Yokohama (JP); Koshi Hatakeyama, Kita-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/453,120

(22) Filed: Jun. 13, 2006

(65) Prior Publication Data

US 2006/0291069 A1    Dec. 28, 2006

(30) Foreign Application Priority Data

Jun. 27, 2005  (JP)  ............................. 2005-186981
Jun. 27, 2005  (JP)  ............................. 2005-186984

(51) Int. Cl.
*G02B 15/14* (2006.01)

(52) U.S. Cl. ...................................... 359/683; 359/720

(58) Field of Classification Search ................. 359/676, 359/683, 708, 720
See application file for complete search history.

(56) References Cited

U.S. PATENT DOCUMENTS

| 3,305,294 | A  |   | 2/1967 | Alvarez |
| 3,583,790 | A  |   | 6/1971 | Baker |
| 6,850,372 | B1 | * | 2/2005 | Stenton ...................... 359/676 |
| 7,193,785 | B2 | * | 3/2007 | Yoshida et al. ............. 359/676 |

FOREIGN PATENT DOCUMENTS

JP          2-119103 A       5/1990

OTHER PUBLICATIONS

Keisuke Araki, "Paraxial Analysis for Off-Axial Optical Systems", Japanese Journal of Optics, vol. 29, No. 3, 2000.

* cited by examiner

*Primary Examiner*—Darryl J Collins
(74) *Attorney, Agent, or Firm*—Canon U.S.A. Inc., IP Division

(57) ABSTRACT

At least one exemplary embodiment is directed to a zoom optical system which includes a plurality of variable power optical units of which optical power varies accompanied by variable power, a fixed optical unit of which optical power does not vary accompanied by variable power, and a moving optical unit which moves accompanied by variable power.

20 Claims, 58 Drawing Sheets

FIG. 5
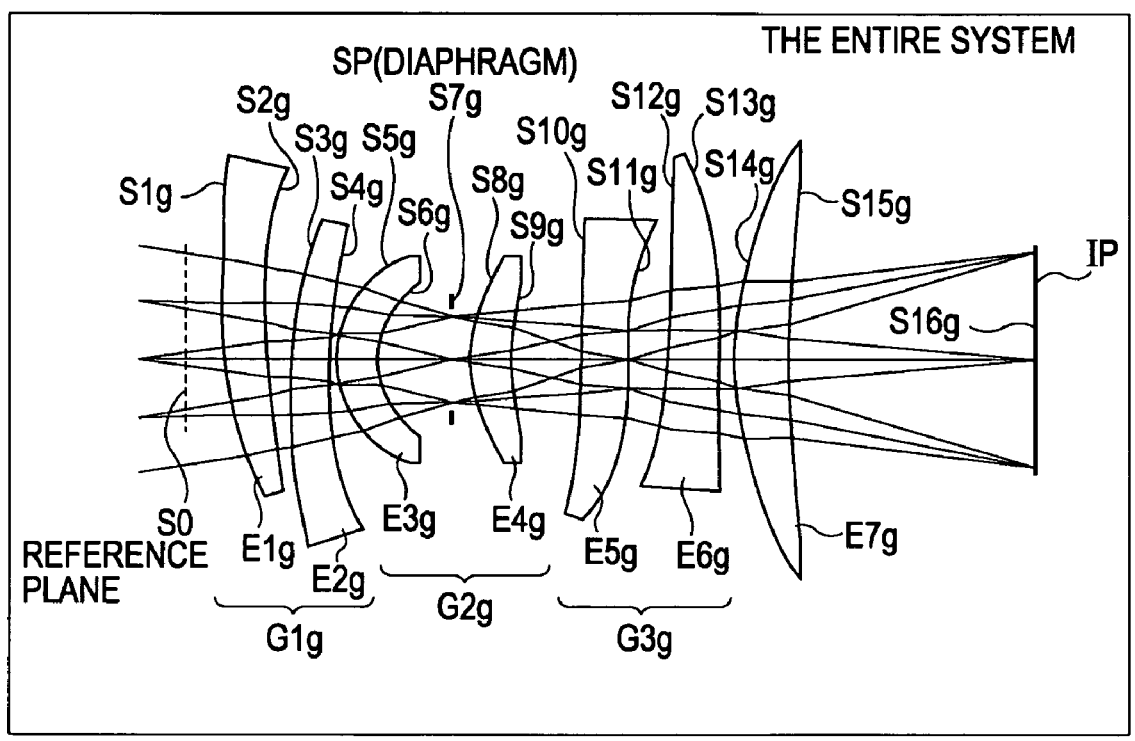
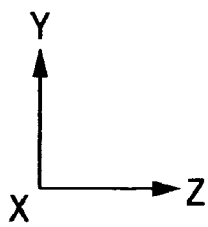

TELEPHOTO END

——————— 650 nm
- - - - - - - - 550 nm
— · — · — 450 nm

TELEPHOTO END

— 650 nm
---- 550 nm
—·—·— 450 nm

WIDE-ANGLE END

——————— 650 nm
- - - - - - - - 550 nm
— · — · — · — 450 nm

TELEPHOto END

——————— 650 nm
- - - - - - - - 550 nm
— · — · — · — 450 nm

WIDE-ANGLE END

——— 650 nm
- - - - 550 nm
— - — 450 nm

TELEPHOTO END

MIDDLE

WIDE-ANGLE END

TELEPHOTO END

MIDDLE

WIDE-ANGLE END

TELEPHOTO END

MIDDLE

WIDE-ANGLE END

TELEPHOTO END

—— 650 nm
- - - - 550 nm
— - — - 450 nm

MIDDLE

——————— 650 nm
- - - - - - - - 550 nm
— - — - — - — 450 nm

WIDE-ANGLE END

——————— 650 nm
- - - - - - - - 550 nm
— - — - — 450 nm

TELEPHOTO END

— 650 nm
······ 550 nm
— · — · — 450 nm

WIDE-ANGLE END

——————— 650 nm
- - - - - - - 550 nm
— · — · — 450 nm

ZOOM OPTICAL SYSTEM

BACKGROUND OF THE INVENTION

1. Field of the Invention

The present invention relates to a zoom optical system and an imaging apparatus using the zoom optical system.

2. Description of the Related Art

In recent years, there has been an increased demand for small high resolution zoom optical systems, such as digital cameras, and cellular phones with cameras.

With a small high-resolution zoom optical system, zooming is commonly performed by moving a plurality of lens groups (lens units) in the optical-axis direction as to a photo-accepting surface (CCD). At this time, a zoom method for moving lens groups (lens units) in the object direction causes the entire optical length (length from a first lens surface to the image plane) to be lengthened, and this contributes to restricting reductions in size of the entire lens system.

In order to reduce the above factor, heretofore, an optical system employing optical elements called Alvarez lenses has been discussed for changing the power of the entire system by moving the optical elements in a direction different from the optical-axis direction (see U.S. Pat. Nos. 3,305,294, 3,583,790, and Optics Vol. 29, No. 3 (2000)).

Subsequently, various types of zoom optical systems for performing zooming using these Alvarez lenses have been discussed (see Japanese Patent Laid-Open No. 1990-119103).

With the optical system discussed in U.S. Pat. No. 3,305,294, power is changed by providing two lenses, which can have a surface represented with a tertiary function, and shifting these lenses in the direction different from the optical-axis direction. This optical system does not send out the lens groups (lens units) in the optical-axis direction, so employing this for a zoom optical system can reduce the entire lens length.

Also, the optical system discussed in U.S. Pat. No. 3,583,790 reduces an aberration by providing lenses, which can have a curved surface represented with an order term higher than a tertiary term, particularly a quintic term.

Further, in Japanese Patent Laid-Open No. 1990-119103 there is discussed an example in which two lens are employed for a zoom optical system. Subsequently, a theory for changing power while maintaining an image point in a steady manner has been discussed by disposing at least the two above lenses.

On the other hand, Optics Vol. 29, No. 3 (2000) describes an optical system including a rotational asymmetric optical element. This optical system has no common axis (optical axis), which is different from a normal coaxial lens system. Such a non-coaxial optical system is called as an Off-Axial optical system, which can be defined as an optical system including a curved surface (Off-Axial curved surface) where when assuming that the route in which the ray passing through the image center and the pupil center traces is taken as a reference axis, a surface normal at an intersection with the reference axis of constituent surfaces is not present on the reference axis. In this case, the reference axis has a folded and bent shape. Accordingly, this needs to employ a paraxial theory based on the Off-Axial theory other than the paraxial theory of a coaxial system such as usually employed for calculation of the paraxial amount. The optical principle of the method thereof has been introduced in the optics Vol. 29, No. 3 (2000), which is performed by calculating 4×4 determinants based on a surface curvature, for example.

With U.S. Pat. Nos. 3,305,294, 3,305,294, and 3,583,790, descriptions have been made regarding a method for changing power with a pair of rotational asymmetric lenses and correction of an aberration, but they cannot maintain an image plane in a steady manner when changing power.

Also, with Japanese Patent Laid-Open No. 1990-119103, the principle for changing power while maintaining an image point in a steady manner has been described, but has not reached the design level of a zoom optical system for obtaining an actual appropriate image by performing correction of an aberration.

In order to configure a zoom optical system with Alvarez lenses, it can be necessary in some circumstances to configure the system so as to have a steady image plane even at the time of zooming, and reduce the aberration fluctuation due to zooming.

SUMMARY OF THE INVENTION

At least one exemplary embodiment is directed to a zoom optical system and an imaging apparatus using the zoom optical system for example a projector, exposure apparatus, and reader.

At least one exemplary embodiment is directed to a zoom optical system which realizes a steady image plane even at the time of zooming, less aberration fluctuation due to zooming, high optical capabilities straddling the entire zoom range, and reduction in the entire optical length by appropriately employing an optical group, which can have a plurality of optical elements which include a rotationally asymmetrical surface and move in the direction different from the optical axis, and one or more optical groups.

According to at least one exemplary embodiment, a zoom optical system includes a plurality of variable power optical units of which optical power changes as magnification varies, where the plurality of variable power optical units each has plural optical elements moving in a direction different from an optical axis as magnification varies, a fixed optical unit of which optical power does not change as magnification varies, a moving optical unit which moves as magnification varies.

According to at least one exemplary embodiment, an imaging apparatus includes the zoom optical system, and a photoelectric conversion element for photo-accepting an image to be formed by the zoom optical system.

Further features and aspects of the present invention will become apparent from the following description of exemplary embodiments with reference to the attached drawings.

BRIEF DESCRIPTION OF THE DRAWINGS

FIG. 5 is a lens cross-sectional view of the comparative example 2.

DESCRIPTION OF THE EMBODIMENTS

Figure 1:
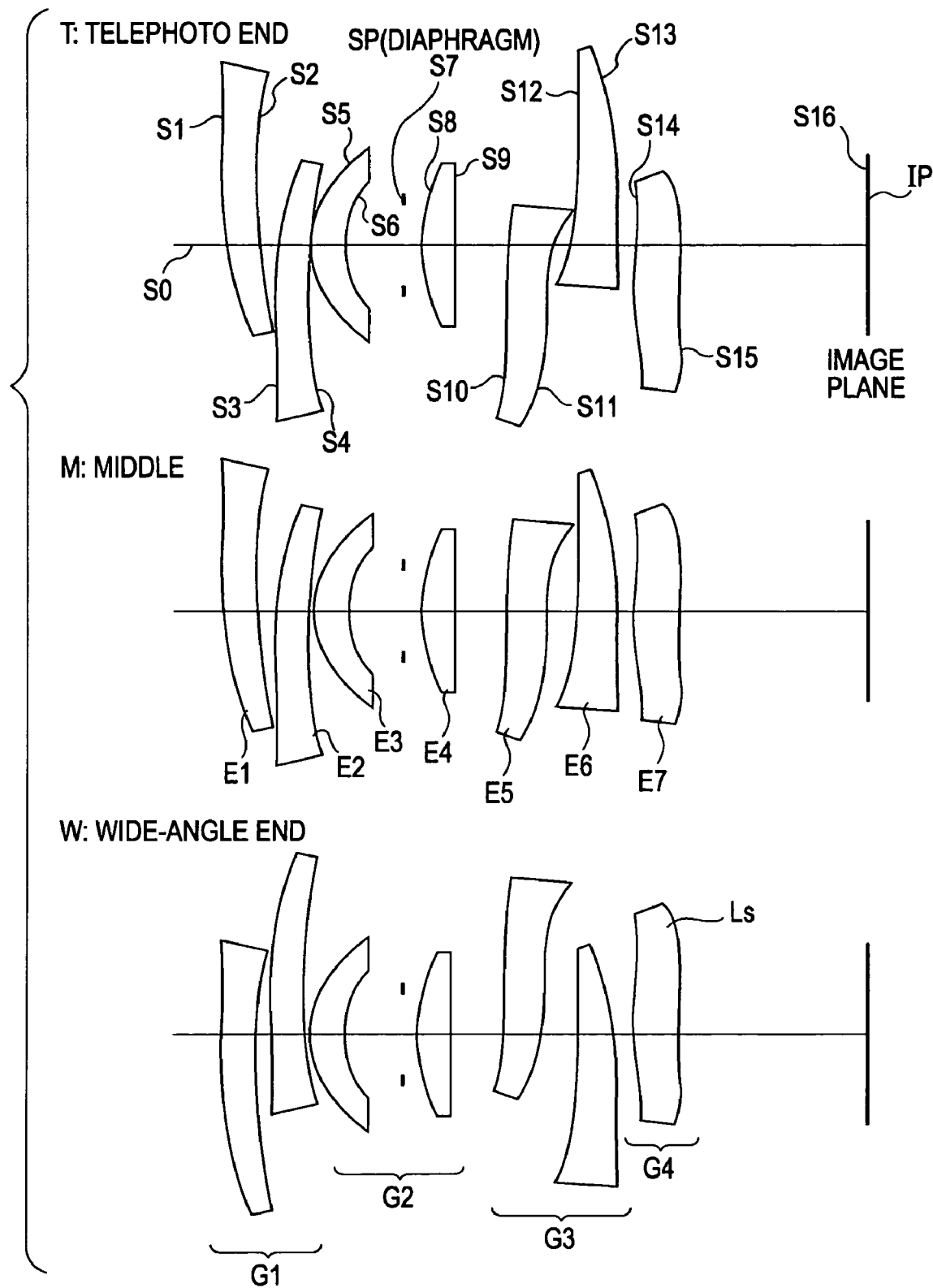
FIG. 1 is a lens cross-sectional view according to an example 1 of at least one exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed, herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

First, prior to describing examples of at least one exemplary embodiment, description will be made regarding the rotationally asymmetrical surface of the Off-Axial optical system making up the zoom optical system of at least one exemplary embodiment, and how to represent configuration specifications thereof.

Figure 2:
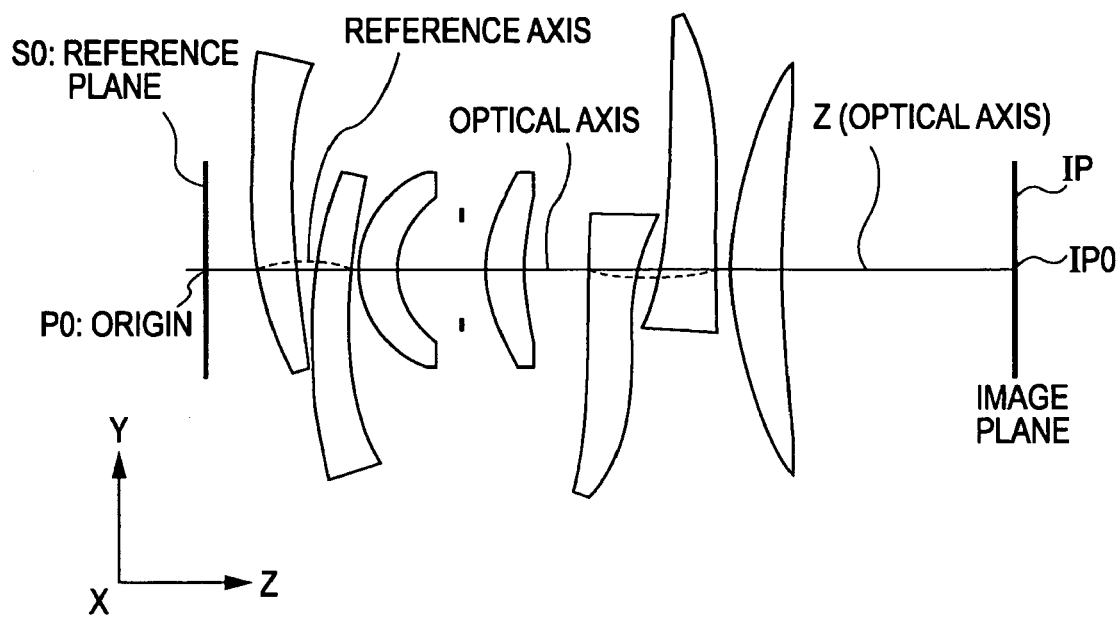
FIG. 2 is a diagram describing the Off-Axial optical system of a comparative example 2.

With the Off-Axial optical system, as shown in FIG. 2 illustrated as a later-described comparative example 2 of at least one exemplary embodiment, a surface SO on the light incident side is taken as a reference plane, and an absolute coordinates system is set with the center PO of the reference plane SO as the origin. Let us say that the route traced by a ray passing through the origin PO and the pupil center is taken as a reference axis. Also, let us say that the straight line connecting an image center IPO and the origin of the absolute coordinates system serving as the center PO of the reference plane SO is taken as the Z axis, and the orientation headed to the image center from a first surface is positive. We will refer to this Z axis as the optical axis. Further, let us say that the Y axis is taken as the straight line passing through the origin PO, and originating 90 degrees in the counterclockwise direction as to the Z axis in accordance with the definition of the right-hand coordinates system, and the X axis is taken as the straight line passing through the origin, which is perpendicular to each axis of the Z and Y axes.

The paraxial values shown below are the results of performing Off-Axial paraxial tracing. Let us say that the Off-Axial paraxial tracing is performed, and the calculated results are taken as paraxial values, unless otherwise stated.

An optical system according to at least one exemplary embodiment has a rotational asymmetric shaped aspheric surface, and the shape is represented with the following equation.

$$z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6 \quad \text{[Equation 1]}$$

Equation 1 has even order terms alone regarding x, so the curved surface stipulated with Equation 1 has a surface-symmetric shape which takes the y-z surface (see FIG. 2) as a symmetric surface.

Also, in the event of satisfying the following condition, the shape represents a shape symmetric as to the x-z surface (see FIG. 2).

$$C03 = C21 = C05 = C23 = C41 = t = 0 \quad \text{[Equation 2]}$$

Further, in the event of satisfying the following conditions, the shape represents a rotational symmetric shape.

$$C02 = C20 \quad \text{[Equation 3]}$$

$$C04 = C40 = C22/2 \quad \text{[Equation 4]}$$

$$C06 = C60 = C24/3 = C42/3 \quad \text{[Equation 5]}$$

In the event of not satisfying the above conditions, the shape is a rotational asymmetric shape.

The rotational symmetric surface and rotationally asymmetrical surface shapes shown in the following examples and comparative examples are based on Equation 1 through Equation 5.

EXAMPLE 1

FIG. 1 is a lens cross-sectional view according to an example 1 of at least one exemplary embodiment. In FIG. 1, T, M, and W are lens cross-sectional views at the telephoto end (the zoom position where the power of the entire system is the minimum), at a middle zoom position, and at the wide-angle end (the zoom position where the power of the entire system is the maximum) respectively.

Figure 10:
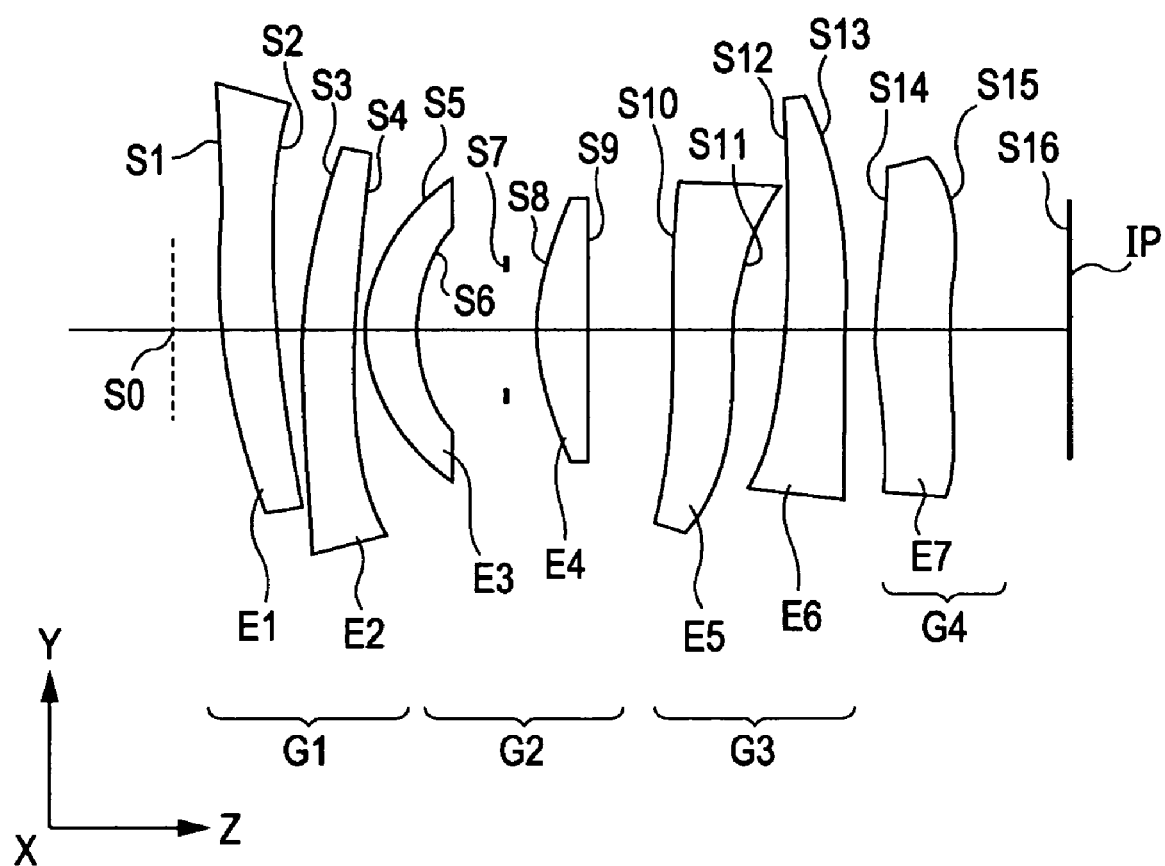
FIG. 10 is a lens cross-sectional view according to the example 1 of at least one exemplary embodiment.

FIG. 10 is a lens cross-sectional view for selecting the middle zoom position of example 1 in FIG. 1 (M in FIG. 1) as an example and describing respective factors.

A zoom optical system according to example 1 is a photography lens system employed for an imaging apparatus, with the left hand side the object side, and the right hand side the image side in the lens cross-sectional view.

Note that the zoom optical system according to example 1 can be employed as a projector, and in this case, on the left hand side is a screen, and on the right hand side is a projection surface.

In FIG. 1 and FIG. 10, G1 and G3 are optical groups in which optical power is variable (optical power and focal distance vary at the time of zooming of the zoom optical system in the present example). G2 is an optical group in which optical power is substantially unchangeable (essentially unchangeable).

G4 is an optical group having symmetry as to at least one surface (one surface taken as a symmetric center), and including one or more optical elements Ls capable of decentering. With the present example, the term "optical group" is employed, but this can be referred to as "optical unit", "lens unit", or "lens group." In other words, the optical elements Ls can have a rotational asymmetric shape symmetric as to multiple surfaces (e.g., toric surfaces or other related or equivalent surfaces as known by one of ordinary skill in the relevant art), but in at least one exemplary embodiment, which are optical elements having a rotational asymmetric shaped surface symmetric as to only one surface (only one surface serving as a symmetric center exists). This can be also applied to the optical elements included in the G1 and G3.

Zooming is performed while maintaining the image plane IP in a steady manner by changing the power of the two optical groups G1 and G3 each of which optical power is variable.

The two optical groups G1 and G3 each of which optical power is variable each include a rotationally asymmetrical surface, move in the direction substantially different from the optical axis, and include two optical elements E1 and E2 which change the power within the optical group G1, and two optical elements E5 and E6 which change the power within the optical group G3, respectively.

Note that the term "optical power" refers to the power of a surface positioned on the optical axis, and when the surface on the optical axis varies by the optical element having a rotationally asymmetrical surface being decentered, optical power is also changed in response to that change.

In example 1 of at least one exemplary embodiment, seven optical elements (lenses) are employed in total. In order from the object side, the optical elements E1, E2, E5, and E6 have a rotational asymmetric shape, these optical elements are decentered in the Y-axis direction, and the amount of decentering continuously varies. Also, the absolute value of the amount thereof is set so as to be equal with mutually positive/negative reverse. The optical elements E3 and E4 have a rotational symmetric spherical surface. In the event that an asymmetric aberration remains on the optical axis, the optical elements E3 and E4 can have a rotational asymmetric shape to reduce this. The optical element E7 has a rotational asymmetric shape symmetric as to at least one surface. This reduces the on-axis coma aberration which may not have been reduced in the optical elements E1 through E6 by shifting or tilting this aberration. Also, the first group G1 comprises the optical elements E1 and E2. Similarly, the second group G2 comprises the optical elements E3 and E4, and the third group G3 comprises the optical elements E5 and E6. The fourth group G4 comprises the optical element E7. As for surface numbers, the reference plane serving as the origin of the absolute coordinates system is determined as a surface S0, the first surface of the optical element E1 is determined as S1, and in order, the corresponding surfaces are surfaces S2, S3, S4, and so on, and following the surface S6 (backward of the optical element E3) a diaphragm S7 (SP) is disposed. The first surface of the optical element E4 is determined as S8, and the subsequent numbers are assigned in order, and the image plane IP is S16. Hereinafter, decentering continues in the Y-axis direction, and let us say that the rotational asymmetric groups (G1 and G3), which contribute to change in power, the rotational symmetric group (G2), and the fourth group G4 made up of the optical element (E7) configured to suppress the above residual aberration by decentering are referred to as decentering movable blocks G1 and G3, auxiliary block G2, and auxiliary movable block G4, respectively. Disposing the decentering movable blocks G1 and G3 alone makes the power thereof too strong, and can make it difficult to perform correction of an aberration, and accordingly, the auxiliary block G2 is disposed.

The lens data of the example 1 is shown in Table 7. The amount of shift from the Z axis of the respective optical elements is shown in Table 8. The values of the respective coefficients of the polynomial surfaces represented with Equation 1 are shown in Tables 9-1 and 9-2. FIG. 1 is a lens cross-sectional view at the telephoto end (T), middle zoom position (M), and wide-angle end (W) shown in Table 8. The optical elements E1 and E2 are decentered in the Y-axis direction, and the absolute value of the amount thereof is so as to be equal with mutually positive/negative reverse, as shown in Table 8. Thus, the power of the first group G1 is changed from positive to negative between the telephoto end and the wide-angle end. The ray emitted from the first group G1 passes through the optical element E3, diaphragm SP, and optical element E4, and illuminates the optical elements E5 and E6. The optical elements E5 and E6 are decentered in the Y-axis direction, and the absolute value of the amount thereof is so as to be equal with mutually positive/negative reverse, as shown in Table 8. Thus, the power of the third group G3 is changed from negative to positive between the telephoto end and the wide-angle end. The ray passed through these decentering movable blocks G1 and G3 illuminates the next auxiliary movable block G4. The auxiliary movable block G4 compensates the power necessary for the decentering movable blocks G1 and G3. The ray passed through these optical elements forms an image without changing the image plane IP.

Figure 8:
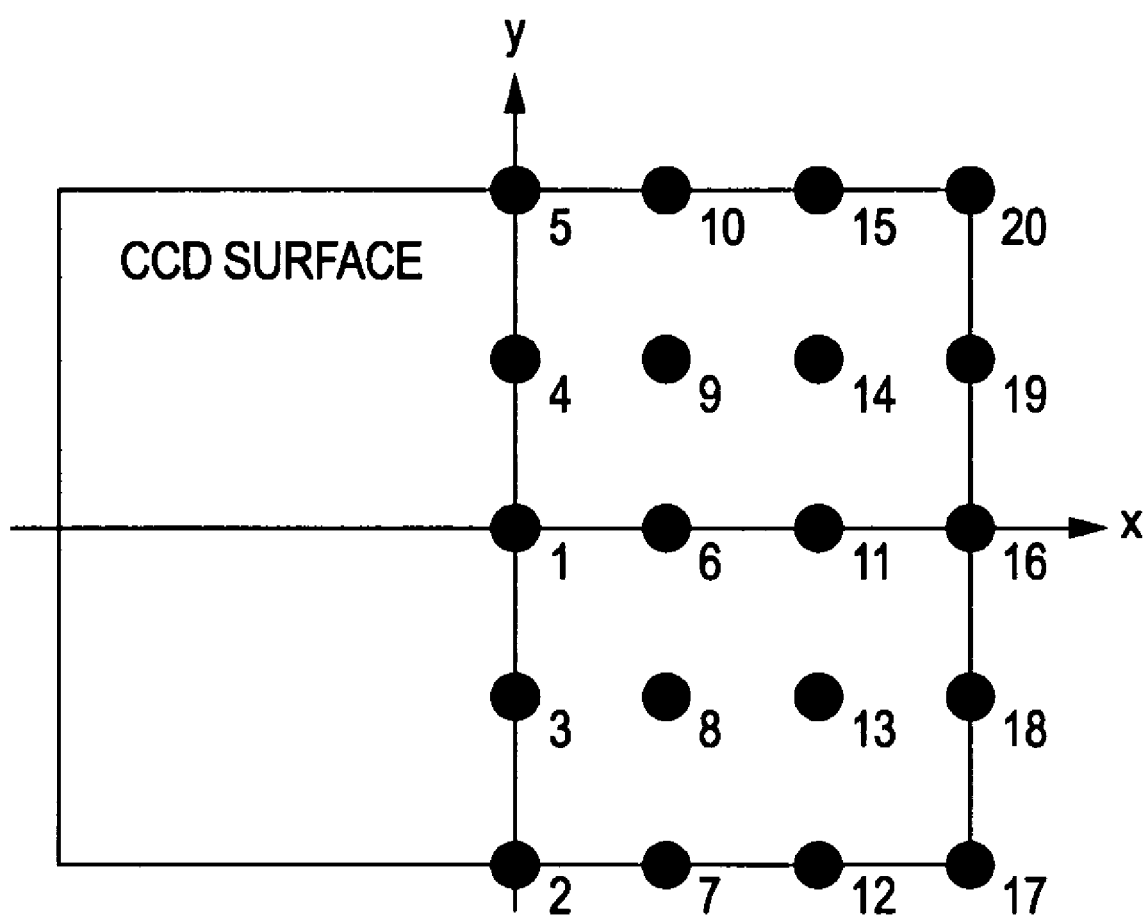
FIG. 8 is a diagram showing the numbers of the rays on an image plane according to at least one exemplary embodiment.
Figure 11A:
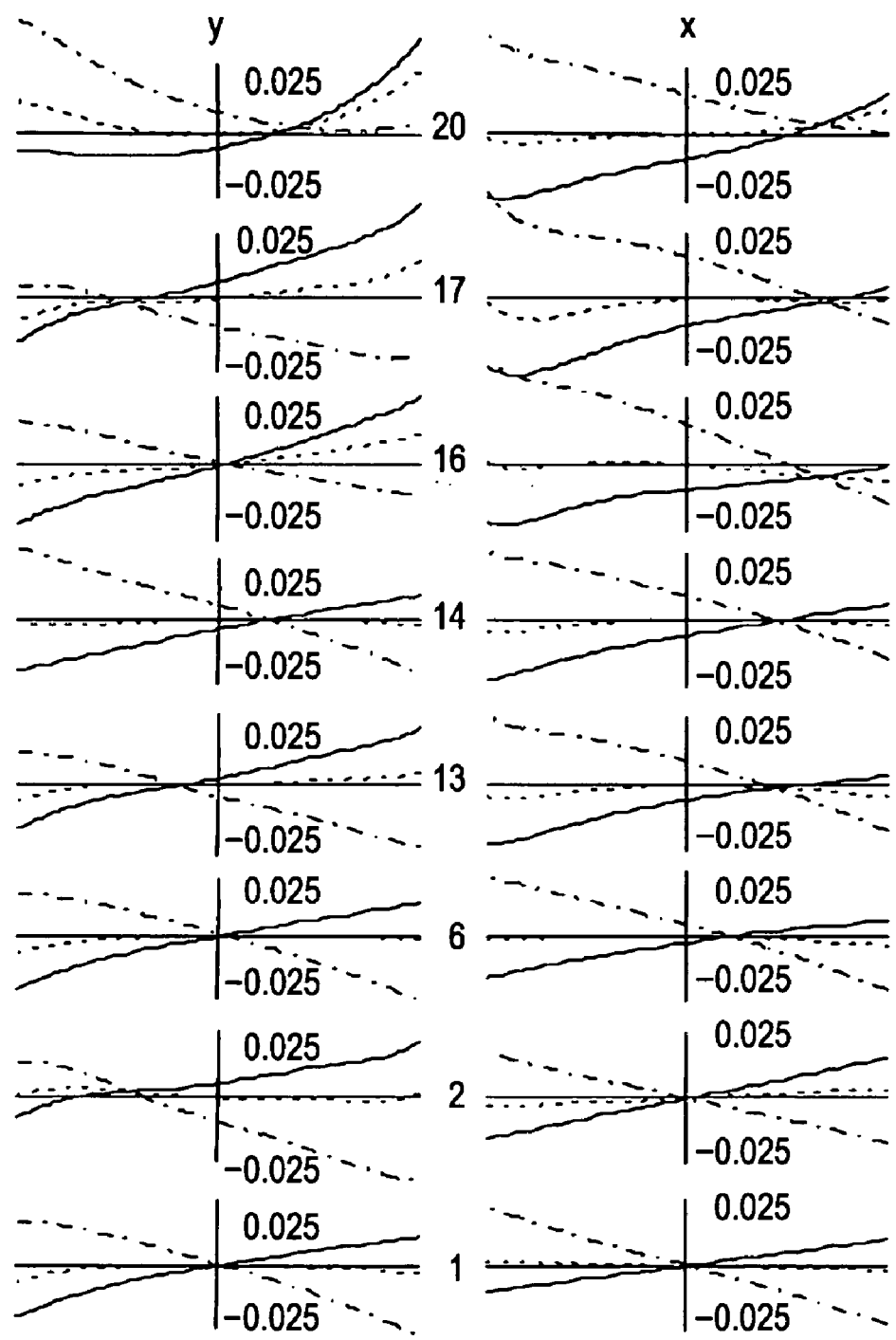
FIG. 11A is an aberration chart of the example 1 of at least one exemplary embodiment.
Figure 11B:
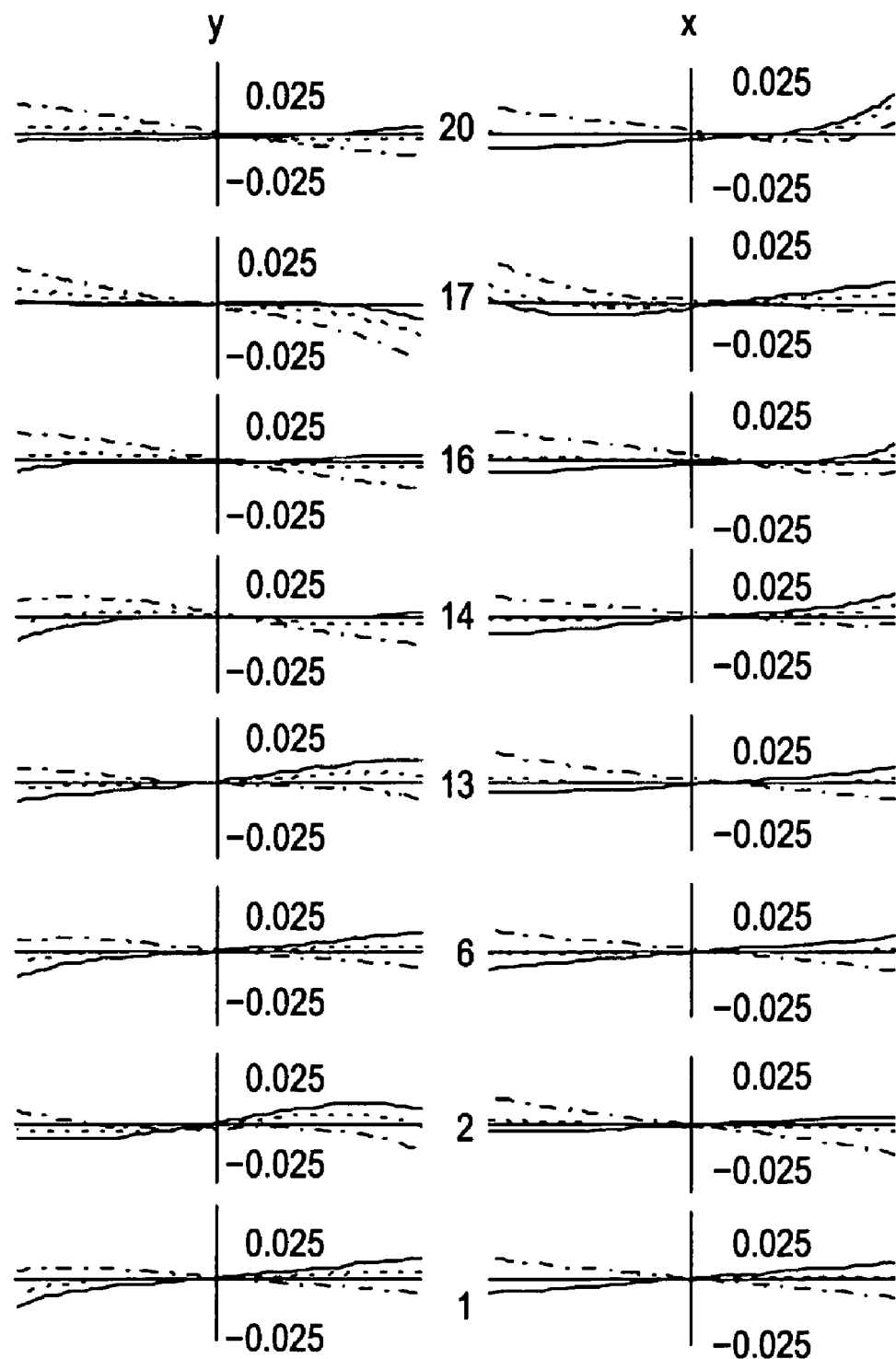
FIG. 11B is an aberration chart of the example 1 of at least one exemplary embodiment.
Figure 11C:
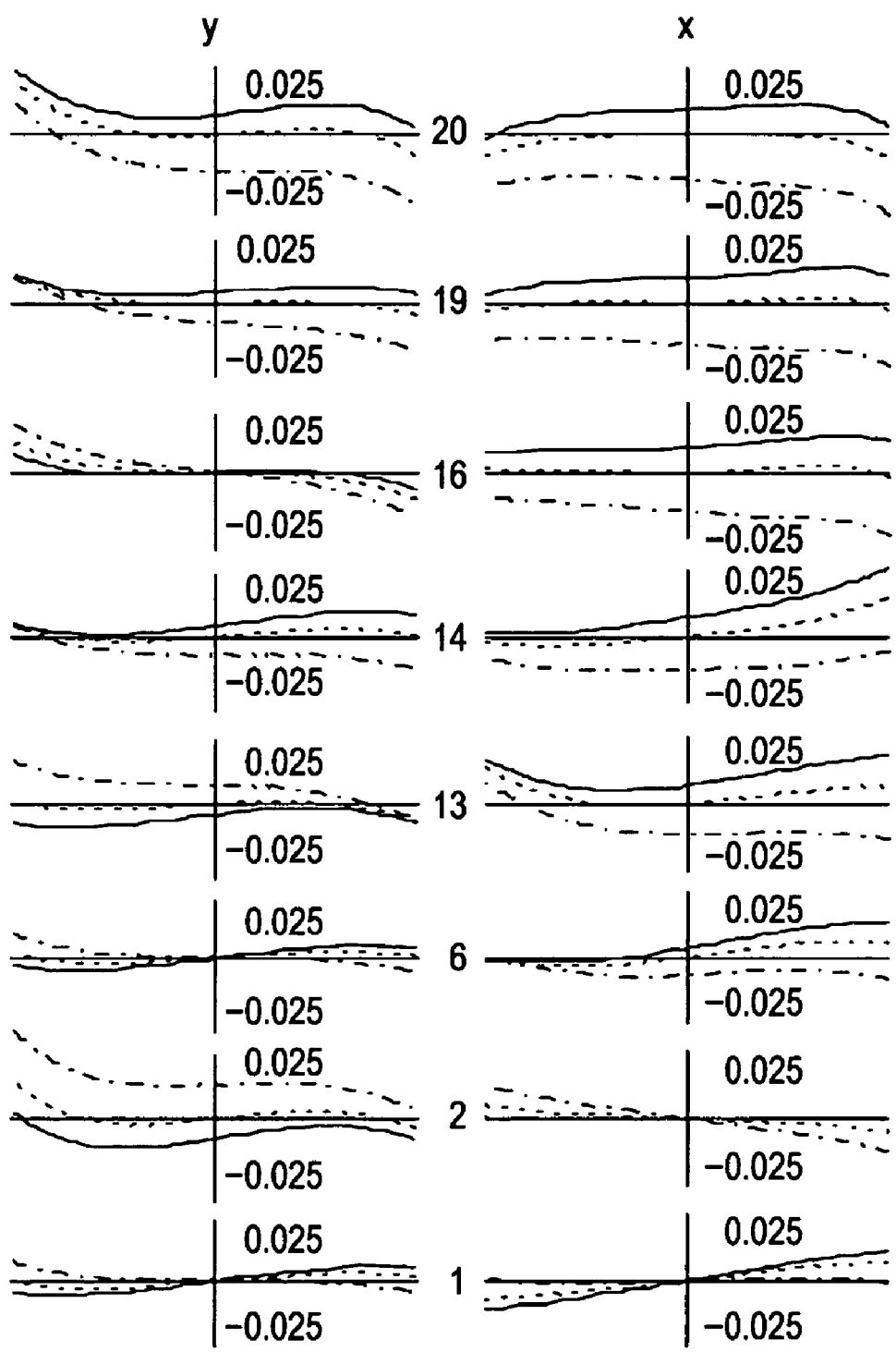
FIG. 11C is an aberration chart of the example 1 of at least one exemplary embodiment.
Figure 12:
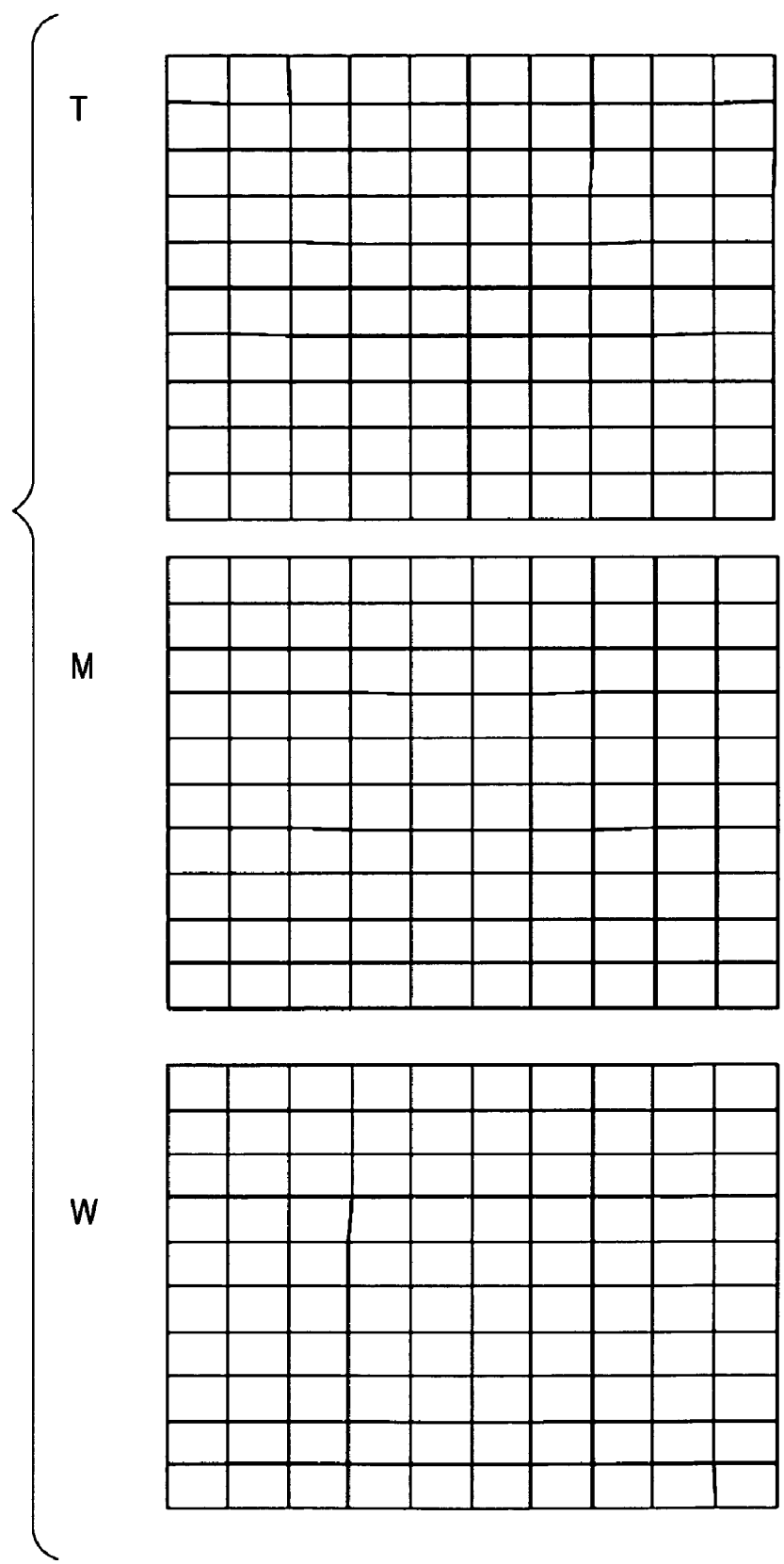
FIG. 12 is a diagram showing the distortion reactor lattices at the telephoto end, middle, and wide-angle end according to the example 1 of at least one exemplary embodiment.

Next, the aberration charts at the telephoto end, middle zoom position, and wide-angle end are shown in FIG. 11A through FIG. 11C, respectively. The horizontal axis represents the position of a ray on the pupil, and the vertical axis represents the shift from the chief ray on the image plane. The range of the vertical axis is about ±20 µm. The numbers within FIG. 11A through FIG. 11C are angle-of-view numbers, which on the image plane are such as illustrated in FIG. 8. The shapes of the optical elements are symmetric as to the X axis, so only the positive case should be taken into consideration regarding the X direction. When viewing the ray at an angle of view of 0°, it can be understood that a coma aberration can be reduced from the telephoto end to the wide-angle end. Also, FIG. 12 illustrates the distortion reactor lattices at a telephoto end T, middle zoom position M, and wide-angle end W. The lengthwise and crosswise size of the lattices is about ¼ inch (vertically 2.7 mm×horizontally 3.6 mm). When viewing this figure, it can be understood that distortion can be suppressed, but when viewing the ray at an angle of view of 0°, it can be understood that some amount of a coma aberration can remain.

Figure 13:
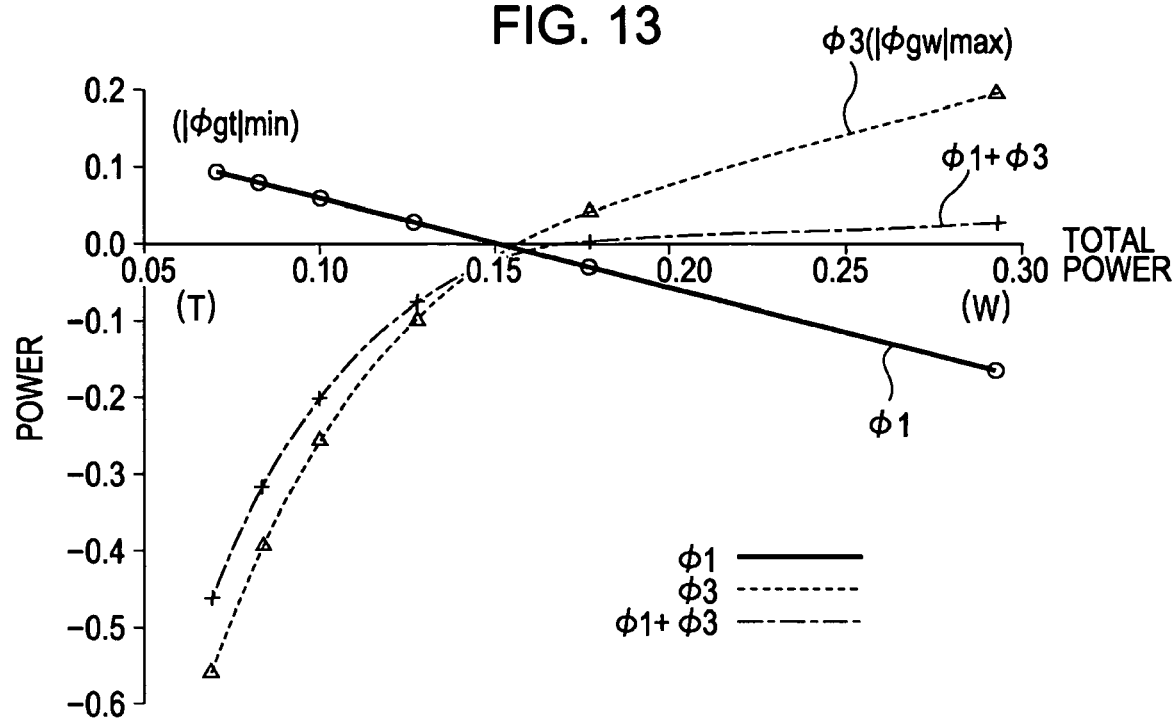
FIG. 13 is a chart illustrating change in power of an optical group G1 and an optical group G3 according to the example 1 of at least one exemplary embodiment.

FIG. 13 is a chart plotting change in power $\Phi 1$ and $\Phi 3$ of the first group G1 and the third group G3 caused by zooming, and the sum thereof $\Phi 13(\Phi 1+\Phi 3)$ as to the power of the entire system.

At this time, when assuming that the maximum value of the absolute value of the power in the first group G1 and the third group G3 is $|\Phi|max$, and the power of the sum of the first group G1 and the third group G3 is $\Phi 13$, the following condition $$-|\Phi|max \leq \Phi 13 \leq |\Phi|max$$

can be satisfied.

Satisfying the conditional expression (5) reduces the Petzval sum and the image plane distortion.

Figure 14:
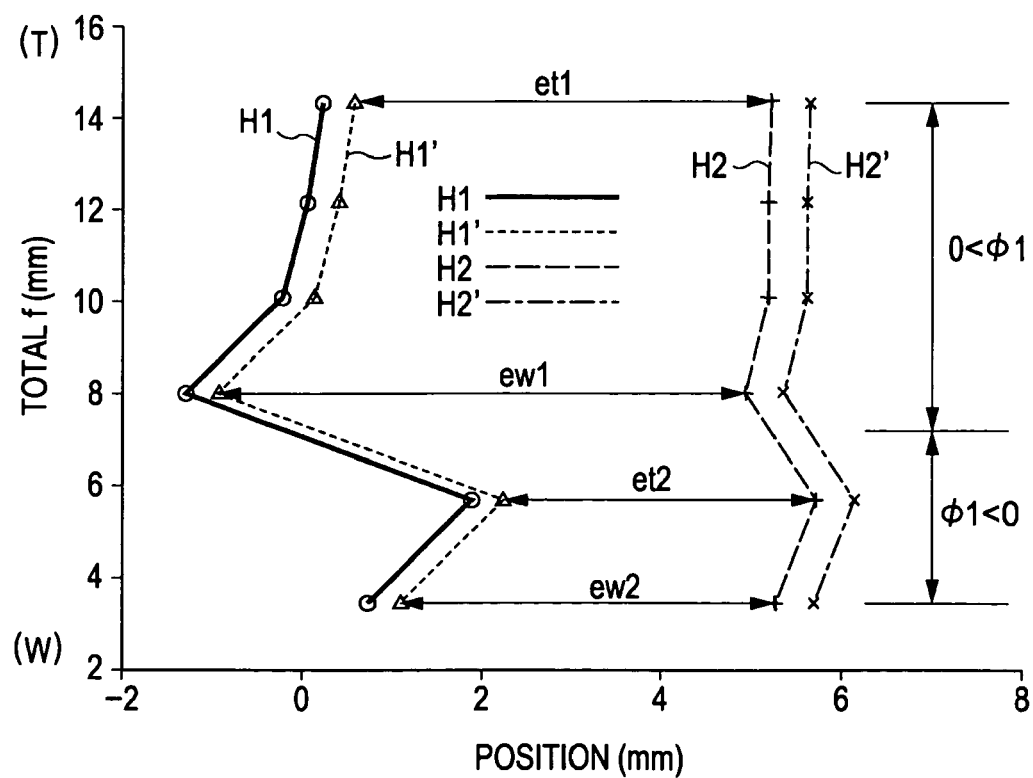
FIG. 14 is a chart illustrating change in the principal-point positions of the G1 and G3 according to the example 1 of at least one exemplary embodiment.

FIG. 14 illustrates change in the principal-point positions before and after the first group G1 and the third group G3 (H1 is the forward principal-point position of the first group G1, H1' is the backward principal-point position of the first group G1, H2 is the forward principal-point position of the third group G3, and H2' is the backward principal-point position of the third group G3). The first group G1 is made up of meniscus-shaped optical elements, so the principal-point position thereof greatly moves. Also, when comparing the change thereof with FIG. 13, it can be understood that the power of the first group G1 moves in the object direction in the positive range as the power of the entire system increases, and expands the interval of the H1 and H2. Also, it can be understood that the power of the first group G1 moves in the object direction even in the negative range as the power of the entire system increases, and expands the interval of the H1 and H2. Also, when assuming that the forward principal-point position and the backward principal-point position of the first group G1 are H1 and H1' respectively, the forward principal-point position and the backward principal-point position of the third group G3 are H2 and H2' respectively, the distance between the object point and the H1 is eo, the distance between the H1' and H2 is e, the distance between the H2' and the image point is ei, and smaller distance between the eo and ei is e', the relationships between e and e' and the relationships of e/e' are shown in Table 10. When viewing this, it can be understood that the e and e' are essentially the same at any zoom position.

Particularly, $$0.7 < e/e' < 1.4$$

can be satisfied.

Further, when assuming that the backward principal-point position of the first group G1 is H1', the forward principal-point position of the third group G3 is H2, the of the entire system is the smallest in the positive range of the power of the first group G1 at zooming is et1, the distance between the H1' and H2 in a case in which the power of the entire system is the greatest is ew1, the distance between the H1' and H2 in a case in which the power of the entire system is the smallest in the negative range of the power of the first group G1 at zooming is et2, and the distance between the H1' and H2 in a case in which the power of the entire system is the greatest is ew2, it can be understood from FIG. 14 that $$et1 < ew1$$

$$et2 < ew2$$

can be satisfied.

With the example 1, the sign of the optical power of the optical group G4 is substantially unchangeable within the entire zoom range.

Thus, correction of the residual aberration in the optical groups G1 and G3 of which optical power is variable, and correction of aberration fluctuation due to zooming can be performed.

When the maximum value of the absolute value of the optical power in the optical groups G1 and G3 of which optical power is variable is $|\Phi d|max$ at the entire zoom positions, the maximum value of the absolute value of the optical power in the optical group G4 is $|\Phi s|max$ at the entire zoom positions, the condition $$|\Phi s|max < |\Phi d|max$$

can be satisfied.

This facilitates a predetermined zoom ratio to be readily obtained, and also reduces the aberration fluctuation caused by zooming.

Also, when assuming that the optical elements E1, E2, E5, and E6 shift, the maximum value of the absolute value of the shift amount at this time at the entire zoom positions is $|Dd|max$, and the maximum value of the absolute value of the shift amount of the optical element Lss at the entire zoom positions is $|Dd|max$, the condition $$|Ds|max < |Dd|max$$

can be satisfied.

This facilitates a predetermined zoom ratio to be readily obtained, and also enables the aberration fluctuation accompanied by zooming to be preferably corrected, in the event that the optical group of which optical power is variable performs zooming by changing the optical power.

Note that with the present example and the following examples, focusing can be performed by moving the entire system, or by moving one optical group in substantially the vertical direction as to the optical axis.

Hereinafter, description will be made regarding examples 2 through 4 of at least one exemplary embodiment.

With the examples 2 through 4, description will be made with a focus on the other features other than the features of the above example 1.

EXAMPLE 2

Figure 15:
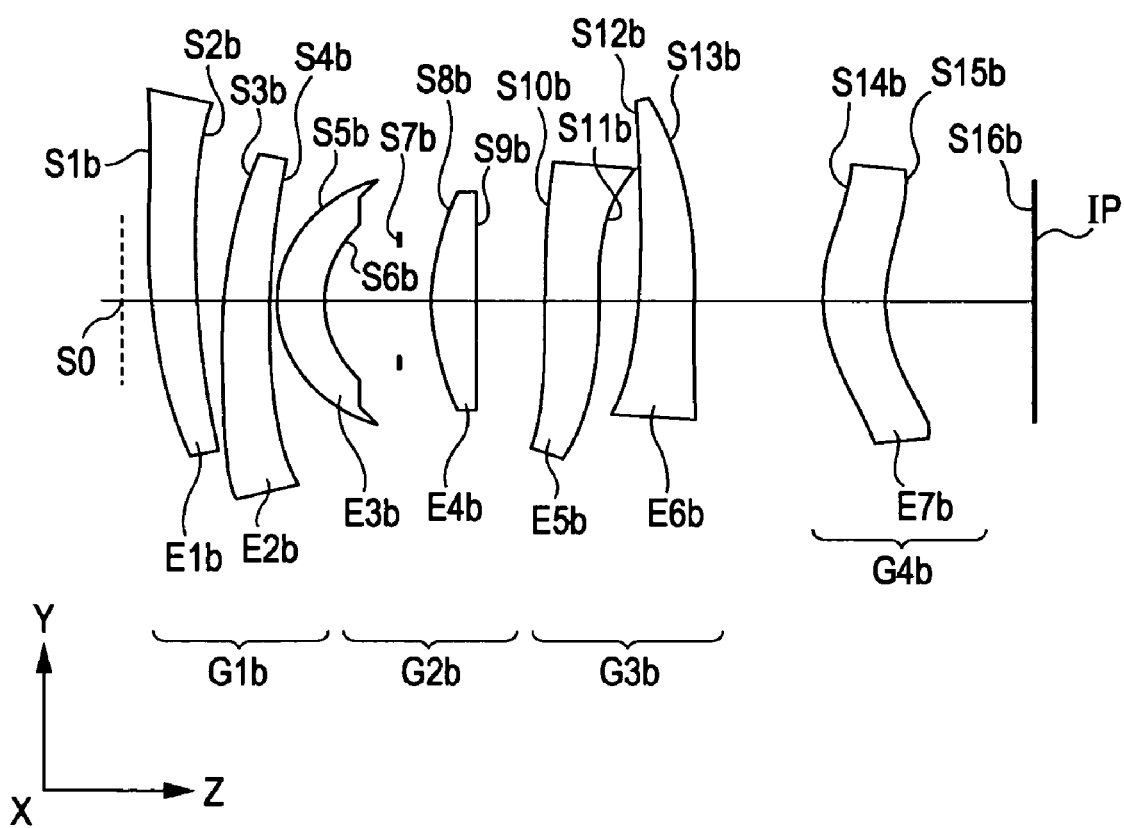
FIG. 15 is a lens cross-sectional view according to an example 2 of at least one exemplary embodiment.

FIG. 15 is a lens cross-sectional view according to an example 2 of at least one exemplary embodiment.

The specifications are substantially similar to example 1. Seven optical elements (lenses) are employed in total. In order from the object side, the optical elements E1b, E2b, E5b, and E6b have a rotational asymmetric shape, these optical elements are decentered in the Y-axis direction, and the amount of decentering thereof continuously varies. Also, the absolute value of the amount thereof is set so as to be equal with mutually positive/negative reverse. The optical elements E3b and E4b have a rotational symmetric spherical surface. In the event that an asymmetric aberration remains on the optical axis, the optical elements E3b and E4b can have a rotational asymmetric shape to reduce this. The optical element E7b has a rotational asymmetric shape symmetric as to at least one surface. This reduces the on-axis coma aberration which has not been able to be reduced in the optical elements E1b and E2b by tilting this aberration. Also, the first group G1b comprises the optical elements E1b and E2b. Similarly, the second group G2b comprises the optical elements E3b and E4b, and the third group G3b comprises the optical elements E5b and E6b. As for surface numbers, the reference plane serving as the origin of the absolute coordinates system is determined as a surface S0, the first surface of the optical element E1b is determined as S1b, and in order, the corresponding surfaces are surfaces S2b, S3b, S4b, and so on, and following the surface S6b (backward of the optical element E3b) a diaphragm S7b (SP) is disposed. The first surface of the optical element E4b is determined as S8b, and the subsequent numbers are assigned in order, and the image plane IP is S16b. Hereinafter, decentering continues in the Y-axis direction, and let us say that the rotational asymmetric groups (G1b and G3b), which contribute to change in power, the rotational symmetric group (G2b), and the optical element (E7b) configured to suppress the above residual aberration by decentering are referred to as decentering movable blocks, auxiliary block, and auxiliary movable block, respectively. Disposing the decentering movable blocks G1b and G3b alone makes the power thereof too strong, and can make it difficult to perform correction of aberrations, and accordingly, the auxiliary blocks G2b and E7b are disposed.

Figure 16:
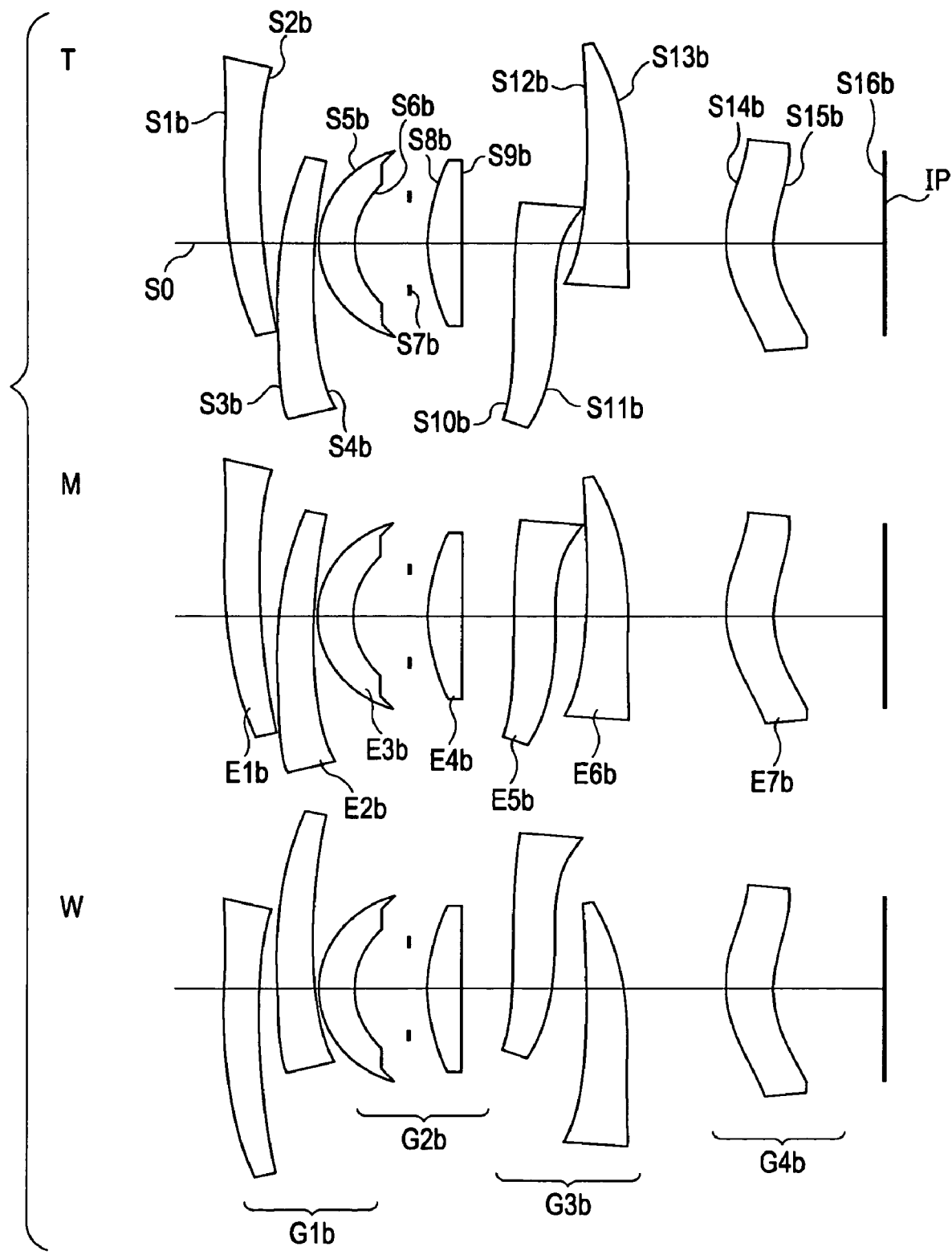
FIG. 16 is a lens cross-sectional view of the telephoto end, middle, and wide-angle end according to the example 2 of at least one exemplary embodiment.

The lens data of the example 2 is shown in Table 11. The amount of shift from the Z axis of the respective optical elements is such as shown in Table 12, the amount of tilt of the optical element E7b is such shown in Table 13. The values of the respective coefficients of the polynomial surfaces represented with Equation 1 are shown in Tables 14-1 and 14-2. FIG. 16 illustrates the optical path diagrams at this time in order of a telephoto end T, middle zoom position M, and wide-angle end W. The optical elements E1b and E2b are decentered in the Y-axis direction, and the absolute value of the amount thereof is so as to be equal with mutually positive/negative reverse, as shown in Table 12. Thus, the power of the first group G1b is changed from positive to negative between the telephoto end and the wide-angle end. The ray emitted from the first group G1b passes through the optical element E3b, diaphragm S7b (SP), and optical element E4b, and illuminates the optical elements E5b and E6b. The optical elements E5b and E6b are decentered in the Y-axis direction, and the absolute value of the amount thereof is so as to be equal with mutually positive/negative reverse, as shown in Table 10.

Thus, the power of the third group G3b is changed from negative to positive between the telephoto end and the wide-angle end. The ray passed through these decentering movable blocks illuminates the next auxiliary block E7b. The auxiliary block E7b compensates the power necessary for the decentering movable blocks G1b and G3b. The ray passed through these optical elements forms an image without changing the image plane IP.

Figure 17A:
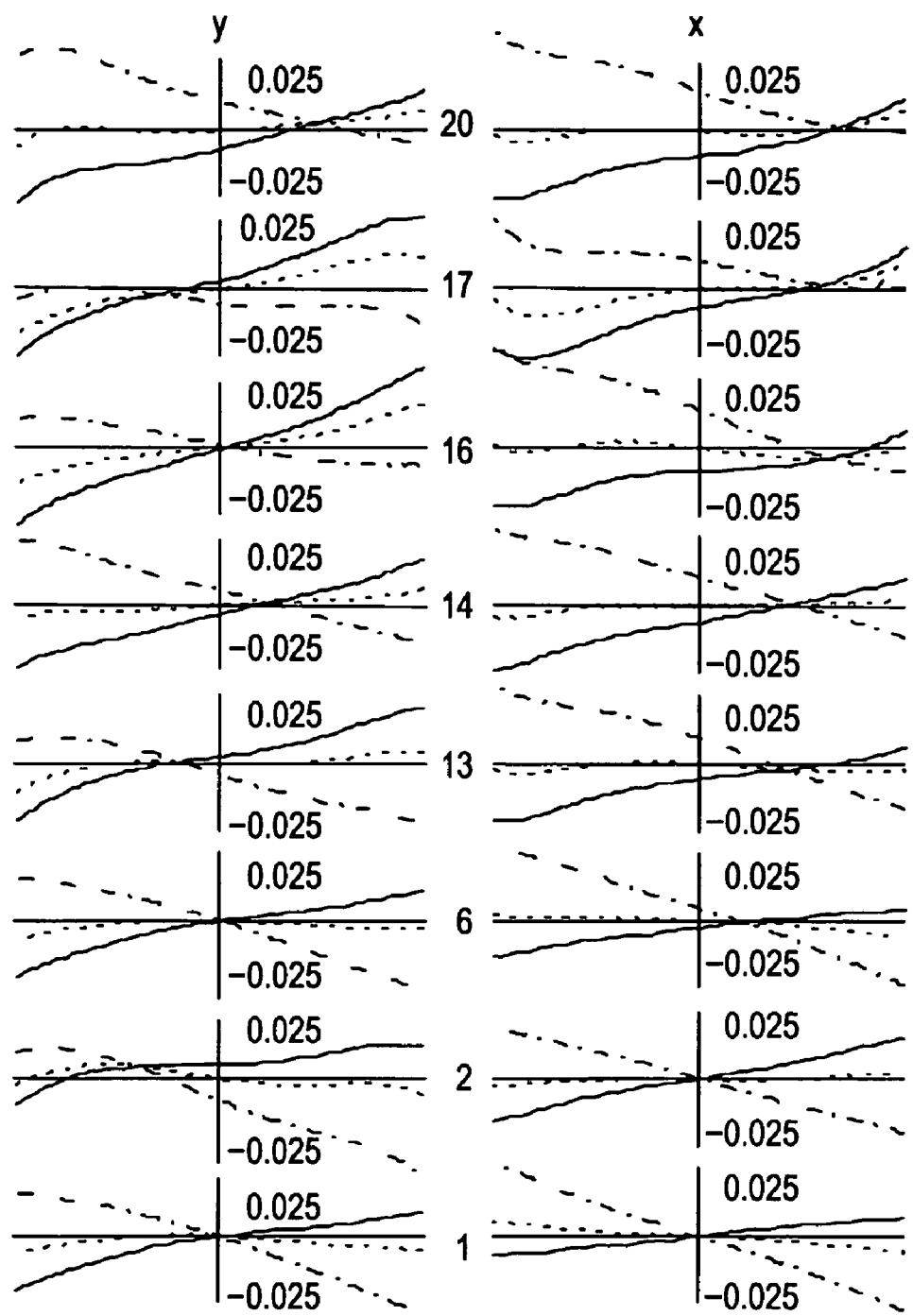
FIG. 17A is an aberration chart of the example 2 of at least one exemplary embodiment.
Figure 17B:
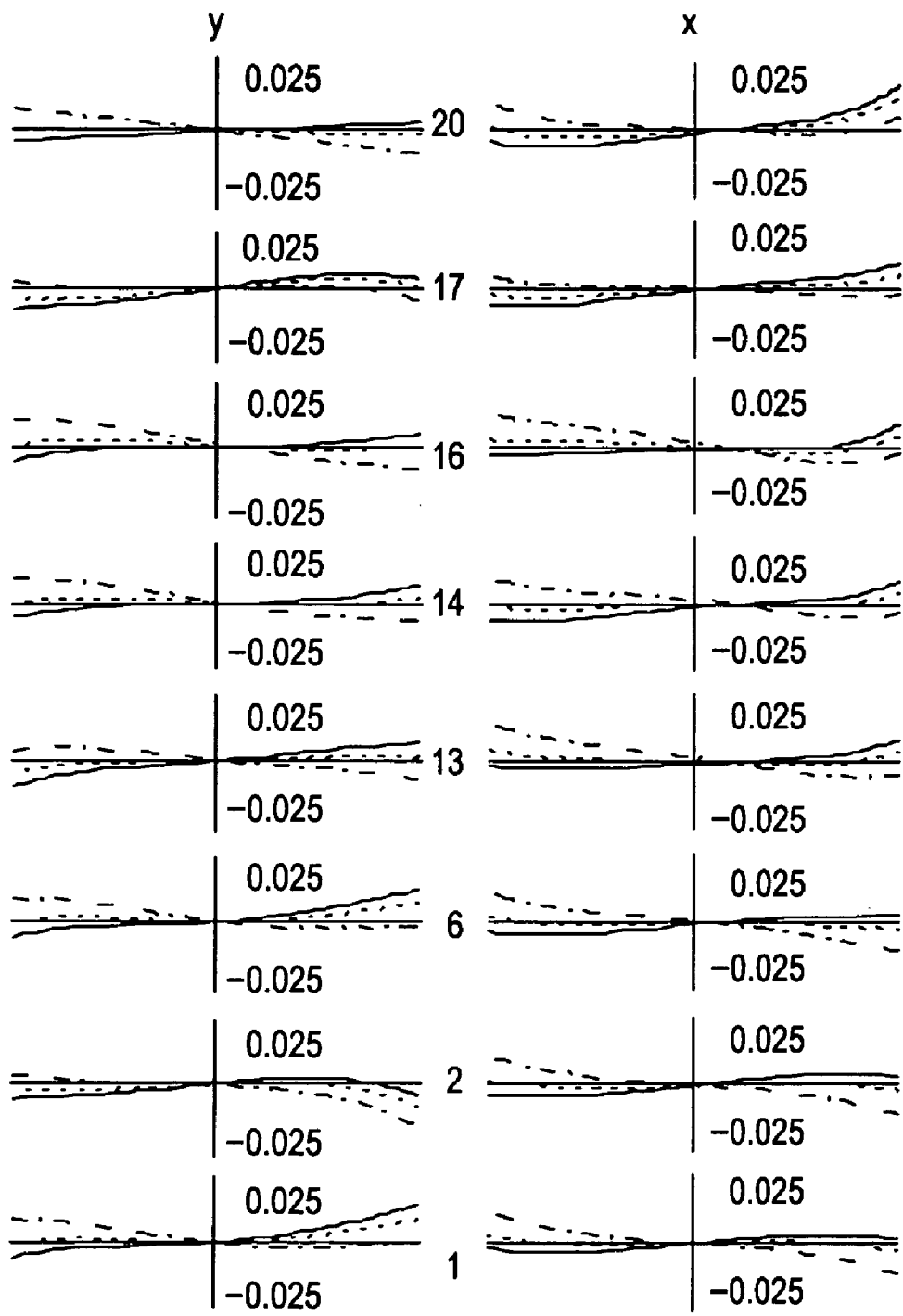
FIG. 17B is an aberration chart of the example 2 of at least one exemplary embodiment.
Figure 17C:
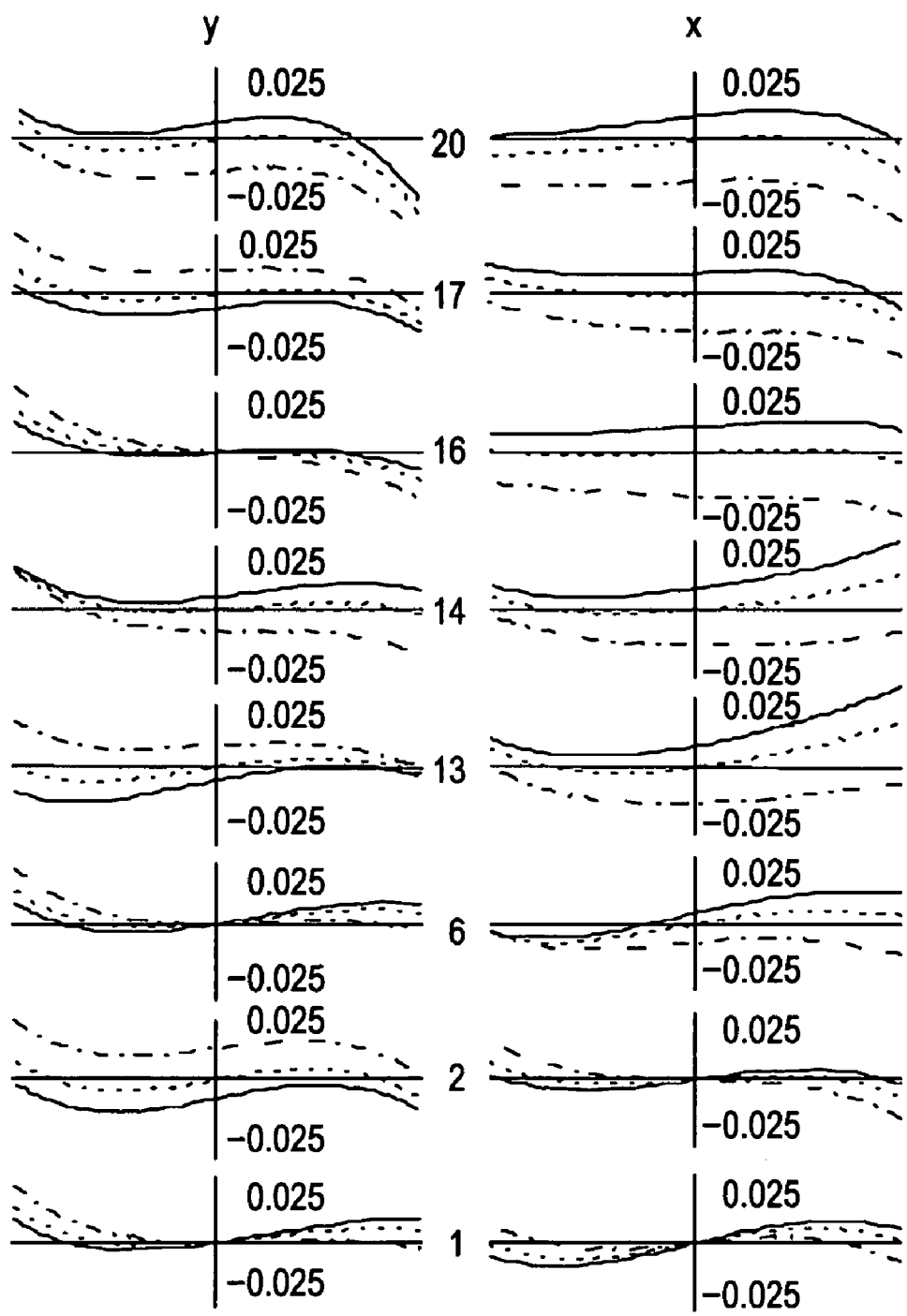
FIG. 17C is an aberration chart of the example 2 of at least one exemplary embodiment.
Figure 18:
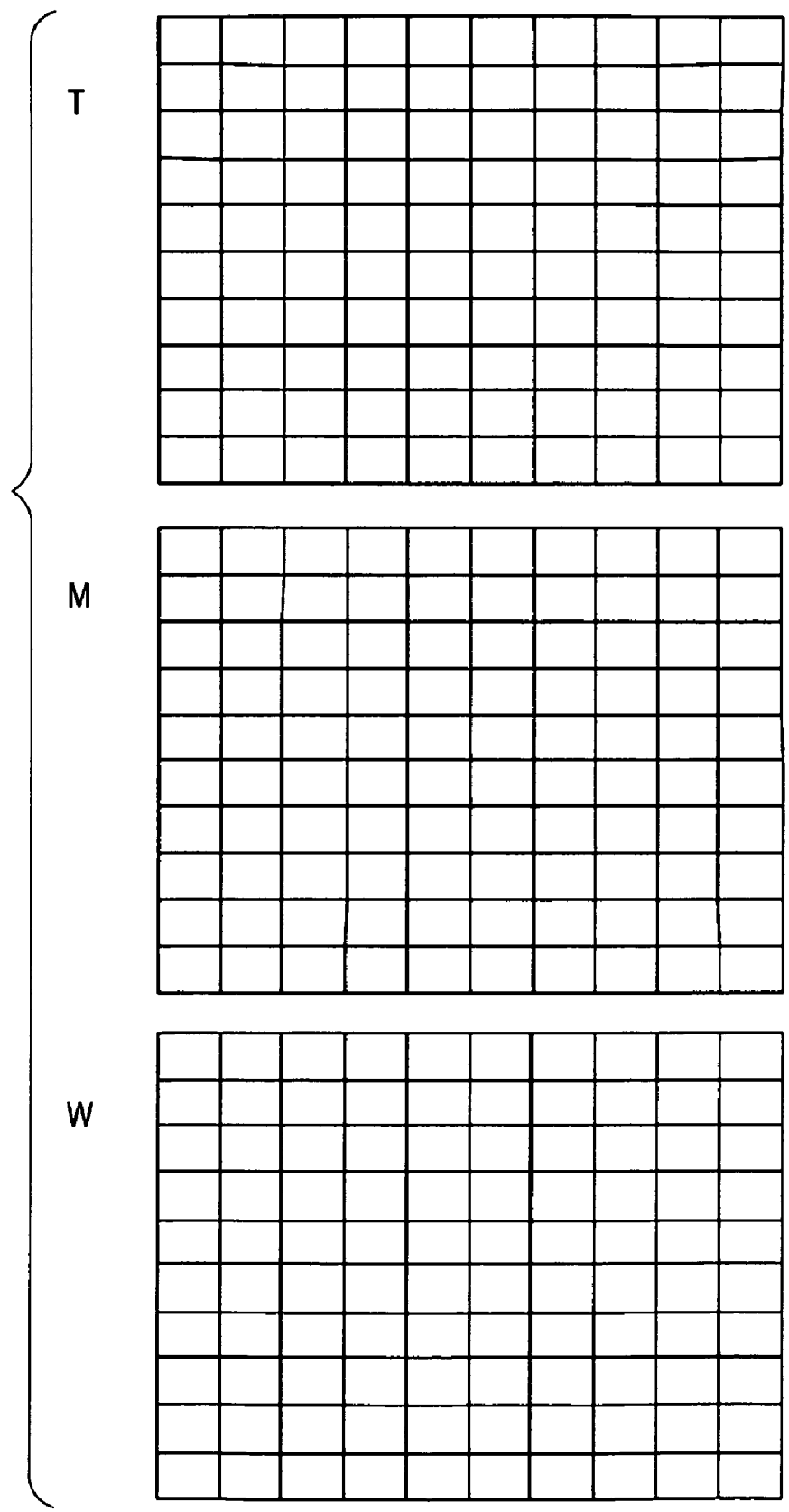
FIG. 18 is a diagram showing the distortion reactor lattices at the telephoto end, middle, and wide-angle end according to the example 2 of at least one exemplary embodiment.

Next, the aberration charts at the telephoto end, middle zoom position, and wide-angle end are shown in FIG. 17A through FIG. 17C, respectively. The horizontal axis represents the position of a ray on the pupil, and the vertical axis represents the shift from the chief ray on the image plane. The range of the vertical axis is about ±20 μm. The numbers within FIG. 17A through FIG. 17C are angle-of-view numbers, which on the image plane are such as illustrated in FIG. 8. The shapes of the optical elements can be symmetric as to the X axis, so the positive case should be taken into consideration regarding the X direction. When viewing the ray at an angle of view of 0°, it can be understood that a coma aberration can be reduced from the telephoto end to the wide-angle end. Also, FIG. 18 illustrates the distortion reactor lattices at a telephoto end T, middle zoom position M, and wide-angle end W. The lengthwise and crosswise size of the lattices is about ¼ inch (vertically 2.7 mm×horizontally 3.6 mm). When viewing this figure, it can be understood that distortion can be suppressed, but when viewing the ray at an angle of view of 0°, it can be understood that some amount of a coma aberration can remain.

Figure 19:
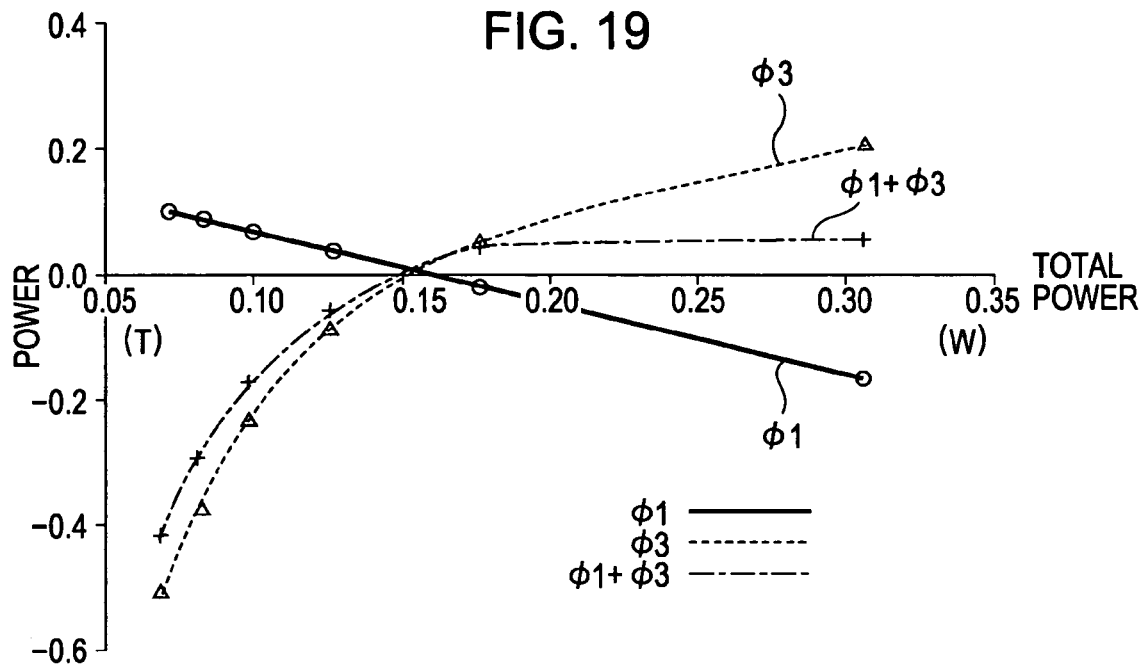
FIG. 19 is a chart illustrating change in power of an optical group G1 and an optical group G3 according to the example 2 of at least one exemplary embodiment.

FIG. 19 is a chart plotting change in power $\Phi 1$ and $\Phi 3$ of the first group G1b and the third group G3b, and the sum thereof $\Phi 13$ as to the power of the entire system.

At this time, when assuming that the maximum value of the absolute value of the power in the first group G1b and the third group G3b is $|\Phi|\max$, and the power of the sum of the first group G1b and the third group G3b is $\Phi 13$, the following condition $$-|\Phi|\max \leq \Phi 13 \leq |\Phi|\max$$

can be satisfied.

Figure 20:
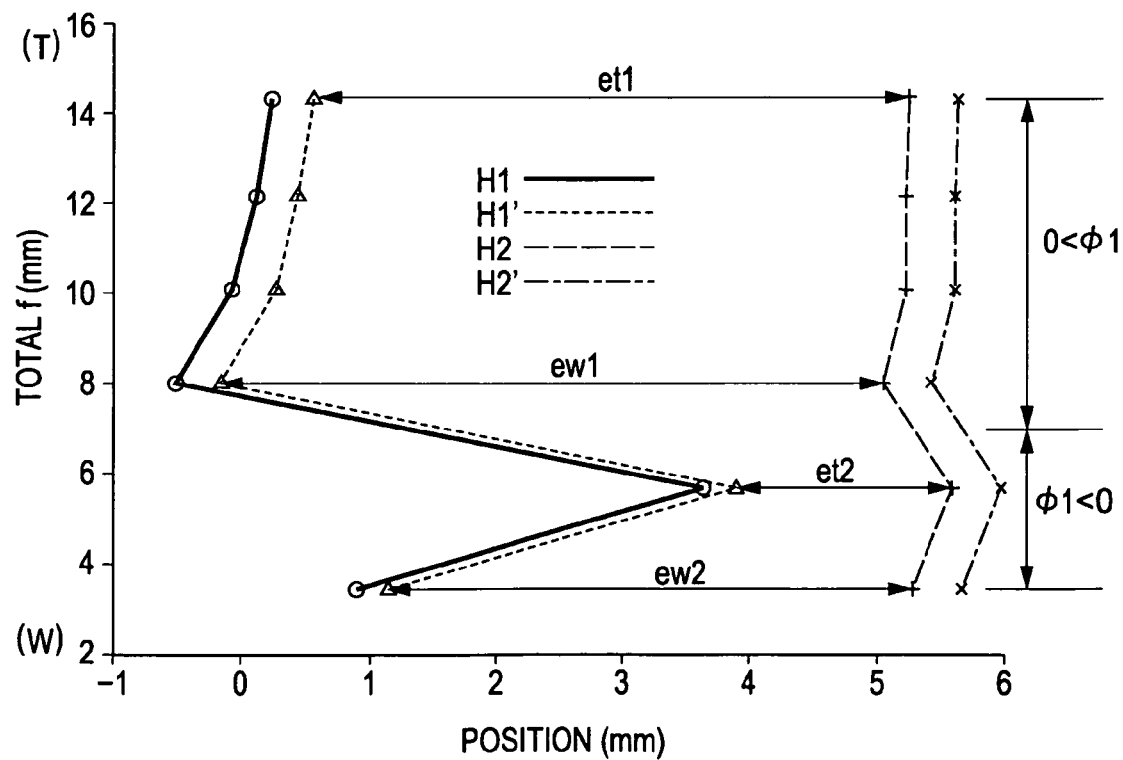
FIG. 20 is a chart illustrating change in the principal-point positions of the G1 and G3 according to the example 2 of at least one exemplary embodiment.

FIG. 20 illustrates change in the principal-point positions before and after the first group G1b and the third group G3b (H1 is the forward principal-point position of the first group G1b, H1' is the backward principal-point position of the first group G1b, H2 is the forward principal-point position of the third group G3b, and H2' is the backward principal-point position of the third group G3b). The first group G1b is made up of meniscus lenses, so the principal-point position thereof greatly moves. Also, when viewing the change thereof, it can be understood that the power of the first group G1b moves in the object direction in the positive range as the power of the entire system increases, and expands the interval of the H1 and H2.

Also, when assuming that the forward principal-point position and the backward principal-point position of the first group G1b are H1 and H1' respectively, the forward principal-point position and the backward principal-point position of the third group G3b are H2 and H2' respectively, the distance between the object point and the H1 is eo, the distance between the H1' and H2 is e, the distance between the H2' and the image point is ei, and smaller distance between the eo and ei is e', the relationships between e and e' and the relationships of e/e' are shown in Table 15. When viewing this, the relationships of e/e' at the telephoto end are as follows except for a zoom state 4:

$$0.7 < e/e' < 1.4$$

Further, when assuming that the backward principal-point position of the first group G1b is H1', the forward principal-point position of the third group G3b is H2, the distance between the H1' and H2 in a case in which the power of the entire system is the smallest in the positive range of the power of the first group G1b is et1, the distance between the H1' and H2 in a case in which the power of the entire system is the greatest is ew1, the distance between the H1' and H2 in a case in which the power of the entire system is the smallest in the negative range of the power of the first group G1b is et2, and the distance between the H1' and H2 in a case in which the power of the entire system is the greatest is ew2, it can be understood from FIG. 20 that $$et1 < ew1$$

$$et2 < ew2$$

can be satisfied. The features other than this are substantially similar to example 1.

EXAMPLE 3

Figure 21:
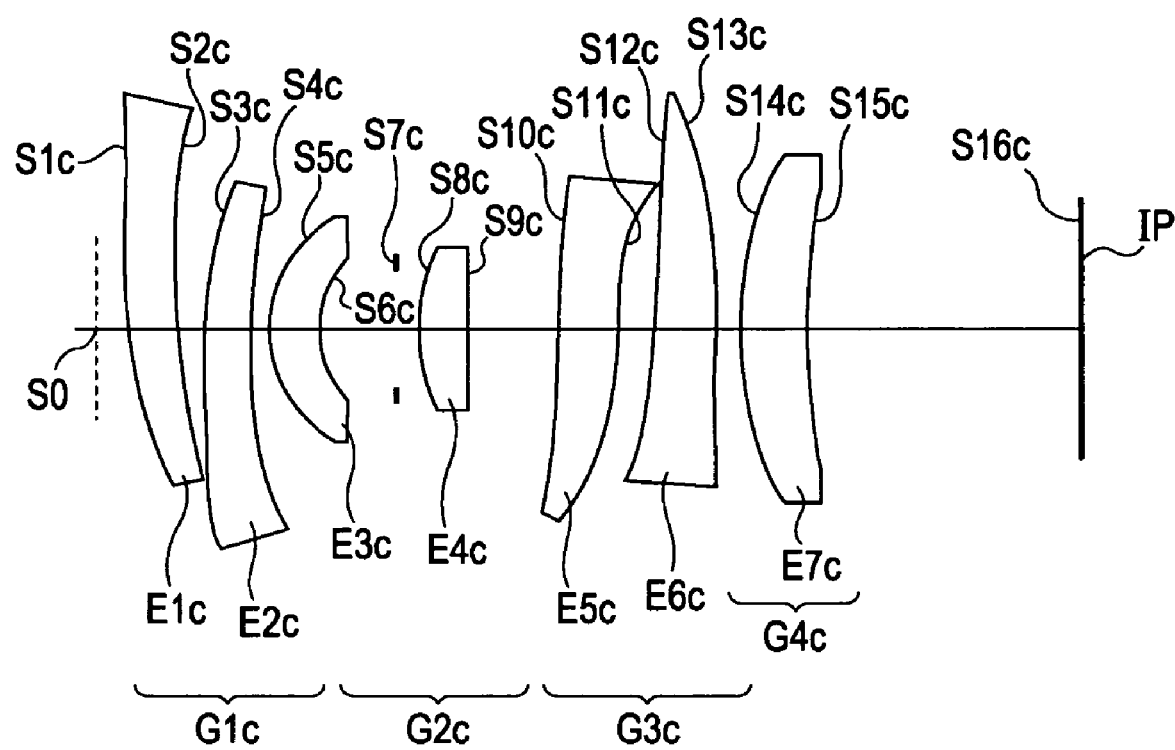
FIG. 21 is a lens cross-sectional view according to an example 3 of at least one exemplary embodiment.

FIG. 21 is a lens cross-sectional view according to an example 3 of at least one exemplary embodiment.

The specifications of the present example are substantially similar to example 1. Seven optical elements (lenses) are employed in total. In order from the object side, the optical elements E1c, E2c, E5c, and E6c have a rotational asymmetric shape, these optical elements are decentered in the Y-axis direction, and the amount of decentering thereof continuously varies. Also, the absolute value of the amount thereof is set so as to be equal with mutually positive/negative reverse. The optical elements E3c and E4c have a rotational symmetric spherical surface. In the event that an asymmetric aberration remains on the optical axis, the optical elements E3c and E4c can have a rotational asymmetric shape to reduce this. The optical element E7c also has a rotational symmetric shape. This reduces the on-axis coma aberration which may not have been reduced in the optical elements E1c and E2c by shifting this aberration. Also, the first group G1c comprises the optical elements E1c and E2c. Similarly, the second group G2c comprises the optical elements E3c and E4c, and the third group G3c comprises the optical elements E5c and E6c. As for surface numbers, the reference plane serving as the origin of the absolute coordinates system is determined as a surface S0, the first surface of the optical element E1c is determined as S1c, and in order, the corresponding surfaces are S2c, S3c, S4c, and so on, and following the surface S6c (backward of the optical element E3c) a diaphragm S7c (SP) is disposed. The first surface of the optical element E4 is determined as S8c, and the subsequent numbers are assigned in order, and the image plane IP is S16c. Hereinafter, decentering continues in the Y-axis direction, and let us say that the rotational asymmetric groups (G1c and G3c), which contribute to change in power, the rotational symmetric group (G2c), and the optical element (E7c) configured to suppress the above residual aberrations by decentering are referred to as decentering movable blocks, auxiliary block, and auxiliary movable block, respectively. Disposing the decentering movable blocks G1c and G3c alone makes the power thereof too strong, and can make it difficult to perform correction of an aberration, and accordingly, the auxiliary blocks G2c and E7c are disposed.

Figure 22:
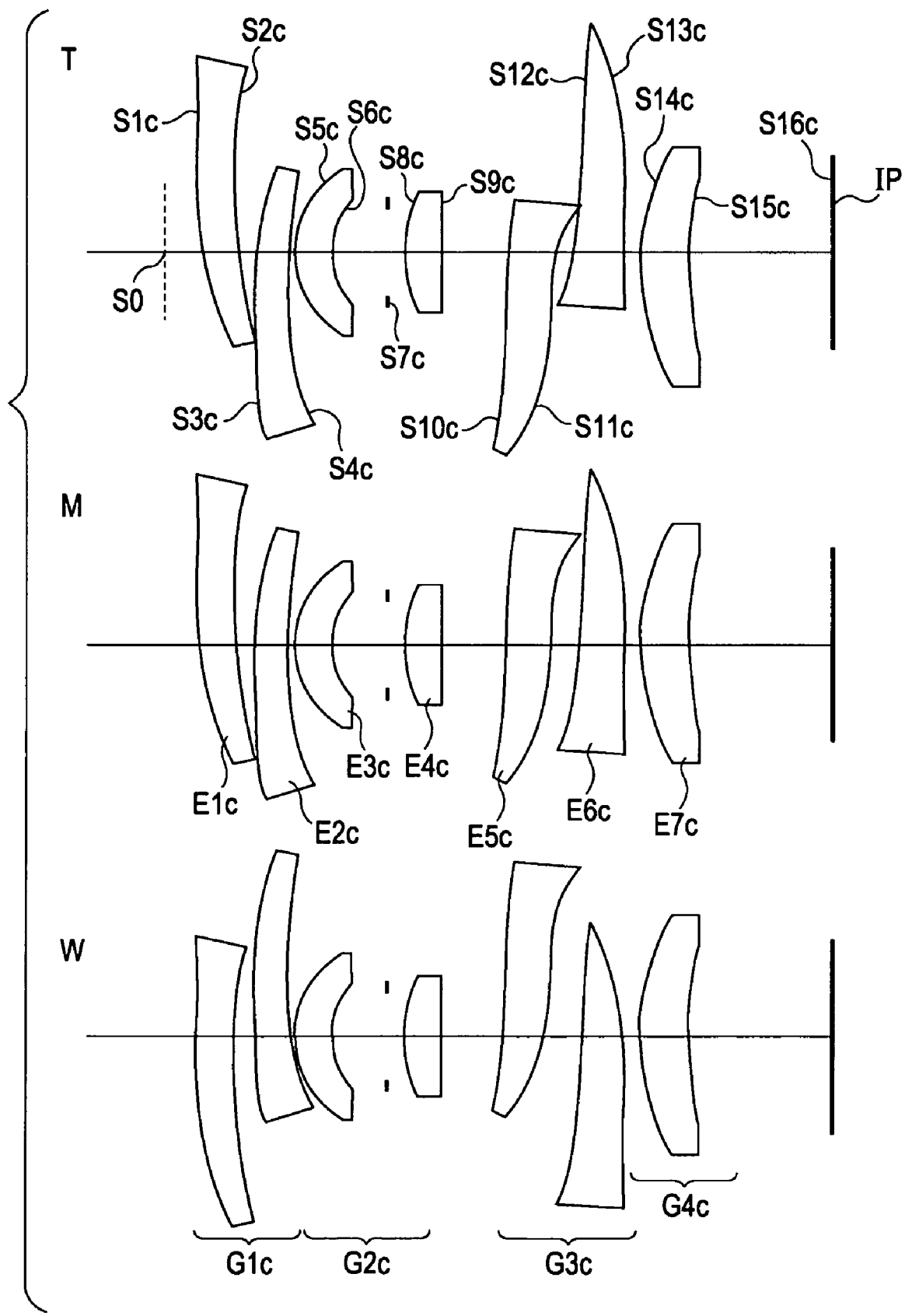
FIG. 22 is a lens cross-sectional view of the telephoto end, middle, and wide-angle end according to the example 3 of at least one exemplary embodiment.

The lens data of the example 3 is shown in Table 16. The amount of shift from the Z axis of the respective optical elements is such as shown in Table 17, and the amount of shift of the optical element E7 is such as shown in Table 18. The values of the respective coefficients of the polynomial surfaces represented with Equation 1 are shown in Table 19. FIG. 22 illustrates the optical path diagrams at this time in order of a telephoto end T, middle zoom position M, and wide-angle end W. The lenses of the optical elements E1$c$ and E2$c$ are decentered in the Y-axis direction, and the absolute value of the amount thereof is so as to be equal with mutually positive/negative reverse, as shown in Table 17. Thus, the power of the first group G1$c$ is changed from positive to negative between the telephoto end and the wide-angle end. The ray emitted from the first group G1$c$ passes through the optical element E3$c$, diaphragm S7$c$ (SP), and optical element E4$c$, and illuminates the optical elements E5$c$ and E6$c$. The optical elements E5$c$ and E6$c$ are decentered in the Y-axis direction, and the absolute value of the amount thereof is so as to be equal with mutually positive/negative reverse, as shown in Table 17. Thus, the power of the third group G3$c$ is changed from negative to positive between the telephoto end and the wide-angle end. The ray passed through these decentering movable blocks illuminates the next auxiliary block E7$c$. The auxiliary block E7$c$ compensates the power necessary for the decentering movable blocks G1$c$ and G3$c$. The ray passed through these optical elements forms an image without changing the image plane IP.

Figure 23A:
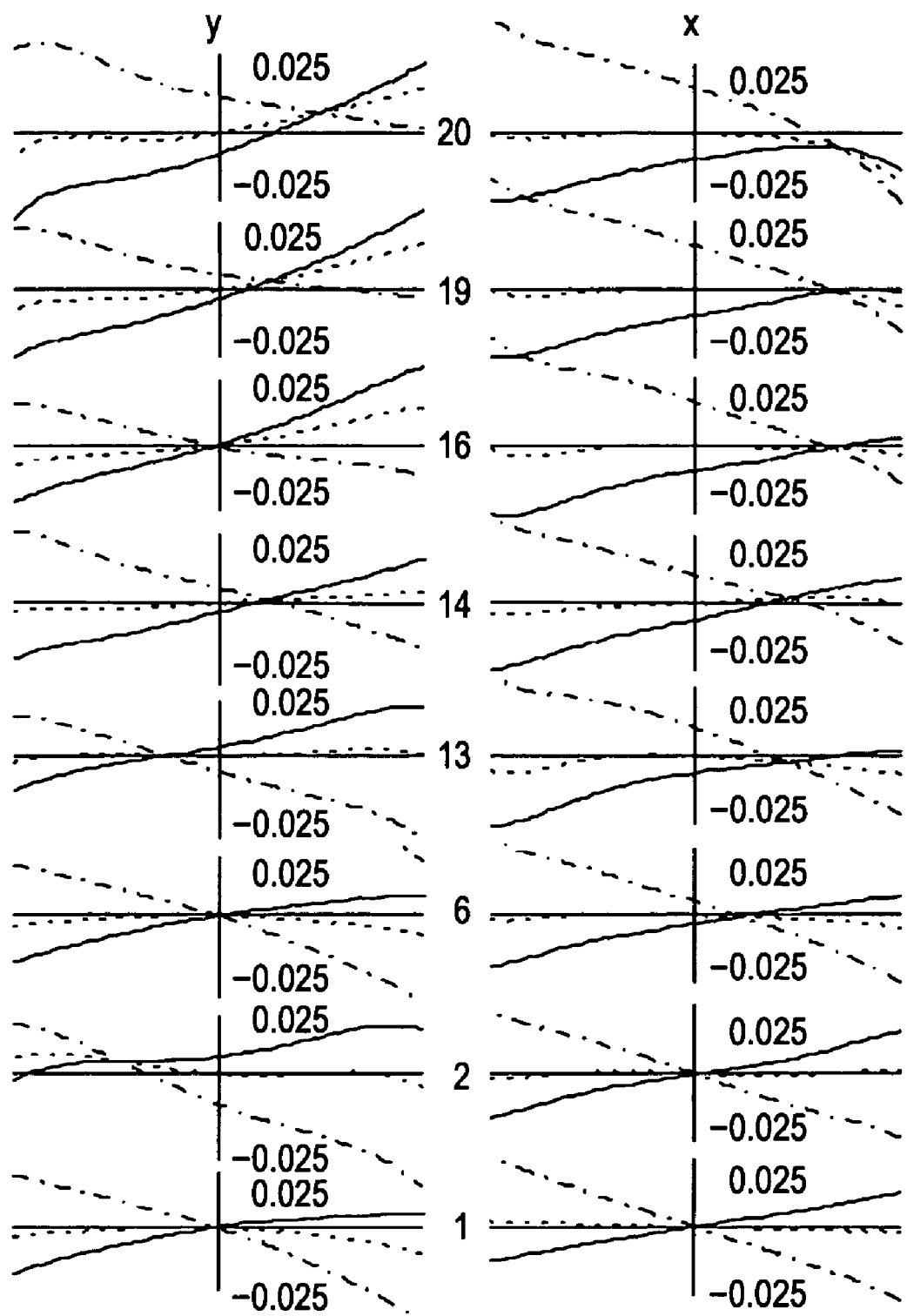
FIG. 23A is an aberration chart of the example 3 of at least one exemplary embodiment.
Figure 23B:
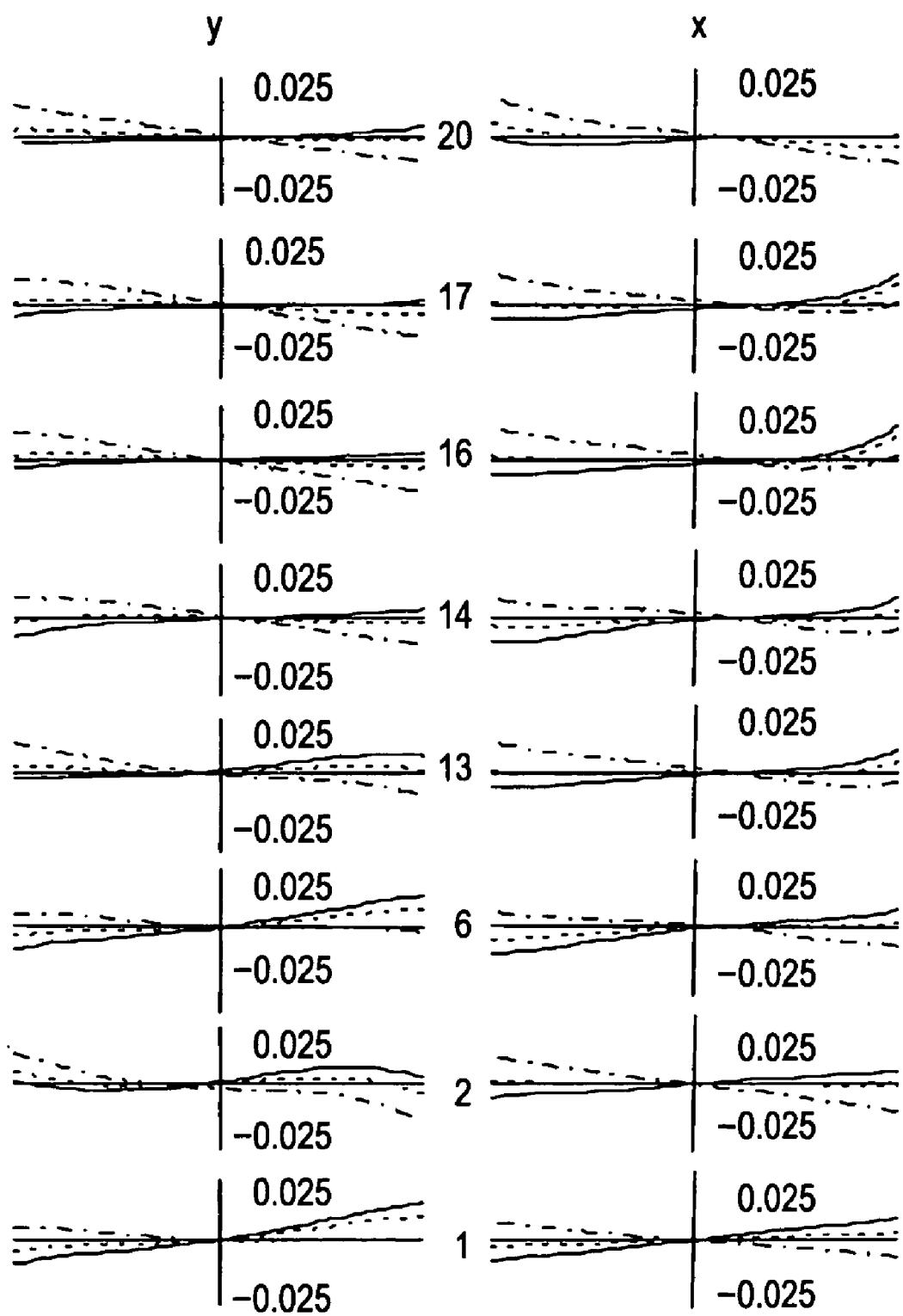
FIG. 23B is an aberration chart of the example 3 of at least one exemplary embodiment.
Figure 23C:
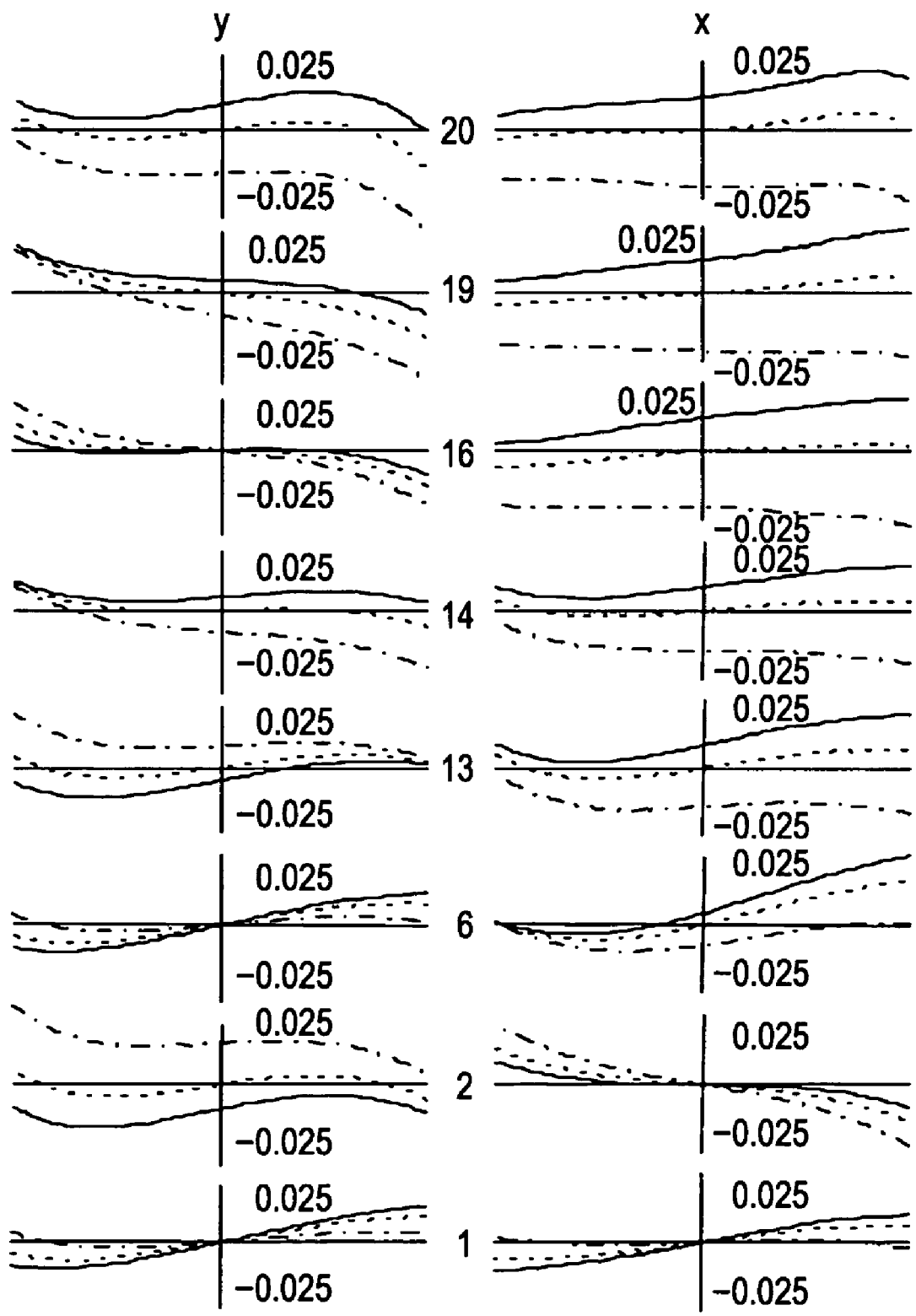
FIG. 23C is an aberration chart of the example 3 of at least one exemplary embodiment.
Figure 24:
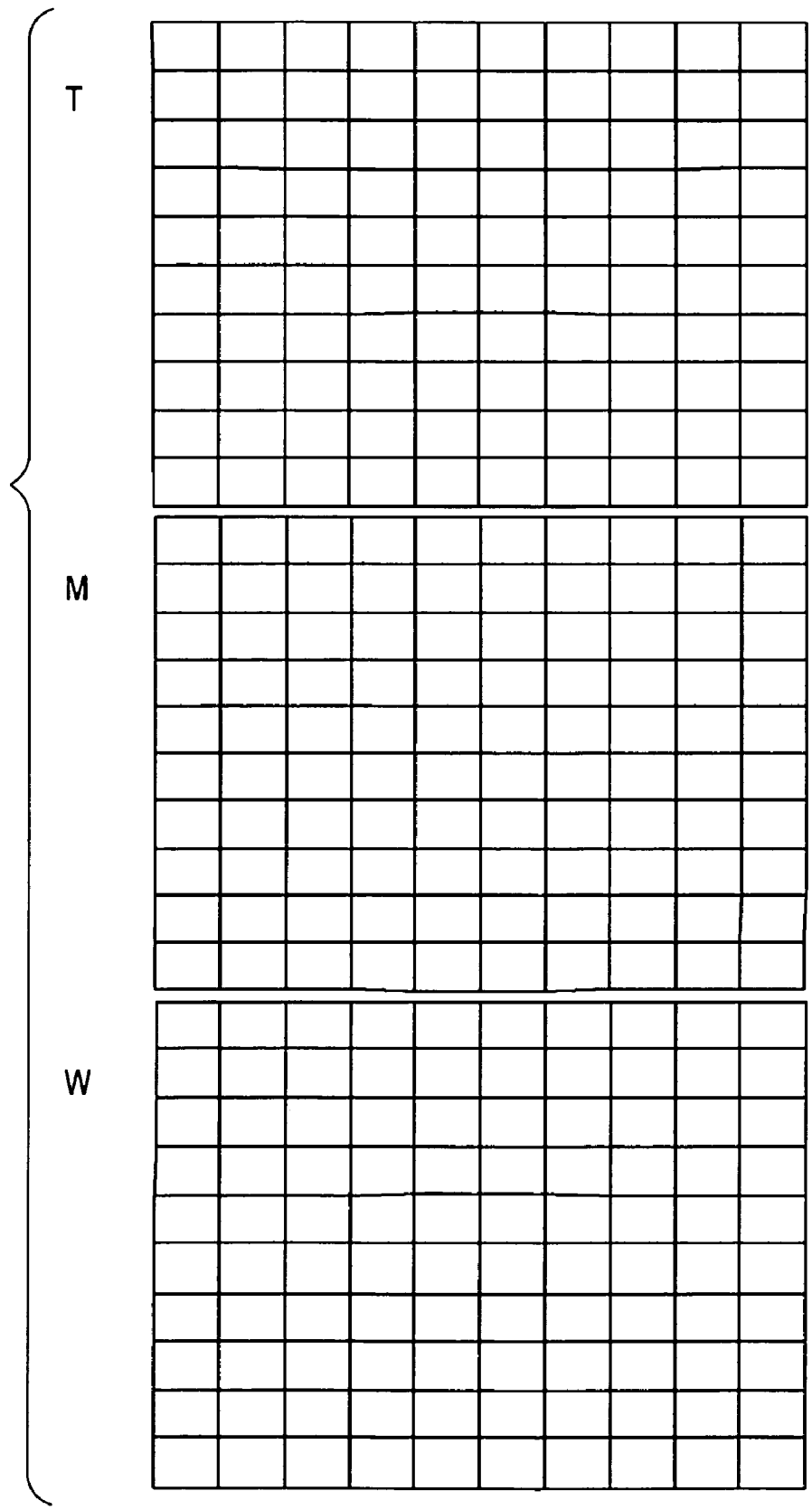
FIG. 24 is a diagram showing the distortion reactor lattices at the telephoto end, middle, and wide-angle end according to the example 3 of at least one exemplary embodiment.

Next, the aberration charts at the telephoto end, middle zoom position, and wide-angle end are shown in FIG. 23A through FIG. 23C, respectively. The horizontal axis represents the position of a ray on the pupil, and the vertical axis represents the shift from the chief ray on the image plane. The range of the vertical axis is about ±20 μm. The numbers within FIG. 23A through FIG. 23C are angle-of-view numbers, which on the image plane are such as illustrated in FIG. 8. The shapes of the optical elements are symmetric as to the X axis, so only the positive case should be taken into consideration regarding the X direction. When viewing the ray at an angle of view of 0°, it can be understood that a coma aberration can be reduced from the telephoto end to the wide-angle end. Also, FIG. 24 illustrates the distortion reactor lattices at a telephoto end T, middle zoom position M, and wide-angle end W. The lengthwise and crosswise size of the lattices is about ¼ inch (vertically 2.7 mm×horizontally 3.6 mm). When viewing this figure, it can be understood that distortion can be suppressed, but when viewing the ray at an angle of view of 0°, it can be understood that some amount of a coma aberration can remain.

Figure 25:
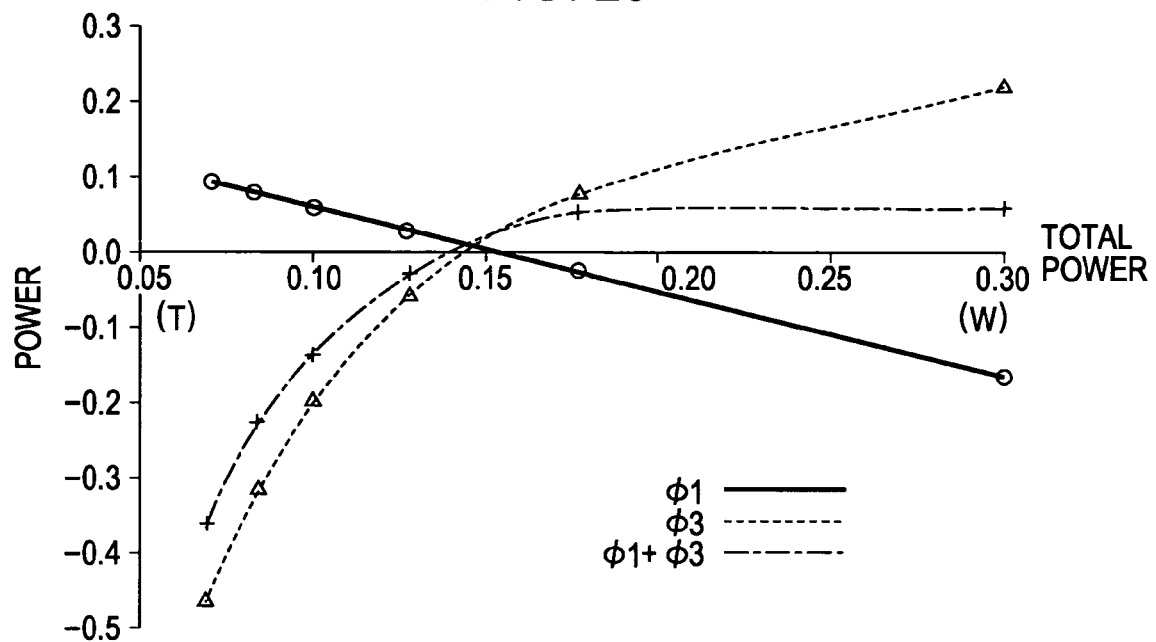
FIG. 25 is a chart illustrating change in power of an optical group G1 and an optical group G3 according to the example 3 of at least one exemplary embodiment.

FIG. 25 is a chart plotting change in power Φ1 and Φ33 of the first group G1$c$ and the third group G3$c$, and the sum thereof Φ13 as to the power of the entire system.

At this time, when assuming that the maximum value of the absolute value of the power in the first group G1$c$ and the third group G3$c$ is Φ10, max, and the power of the sum of the first group G1$c$ and the third group G3$c$ is (Φ13, the following condition $$-|\Phi|max \leq \Phi13 \leq |\Phi|max$$

can be satisfied.

Figure 26:
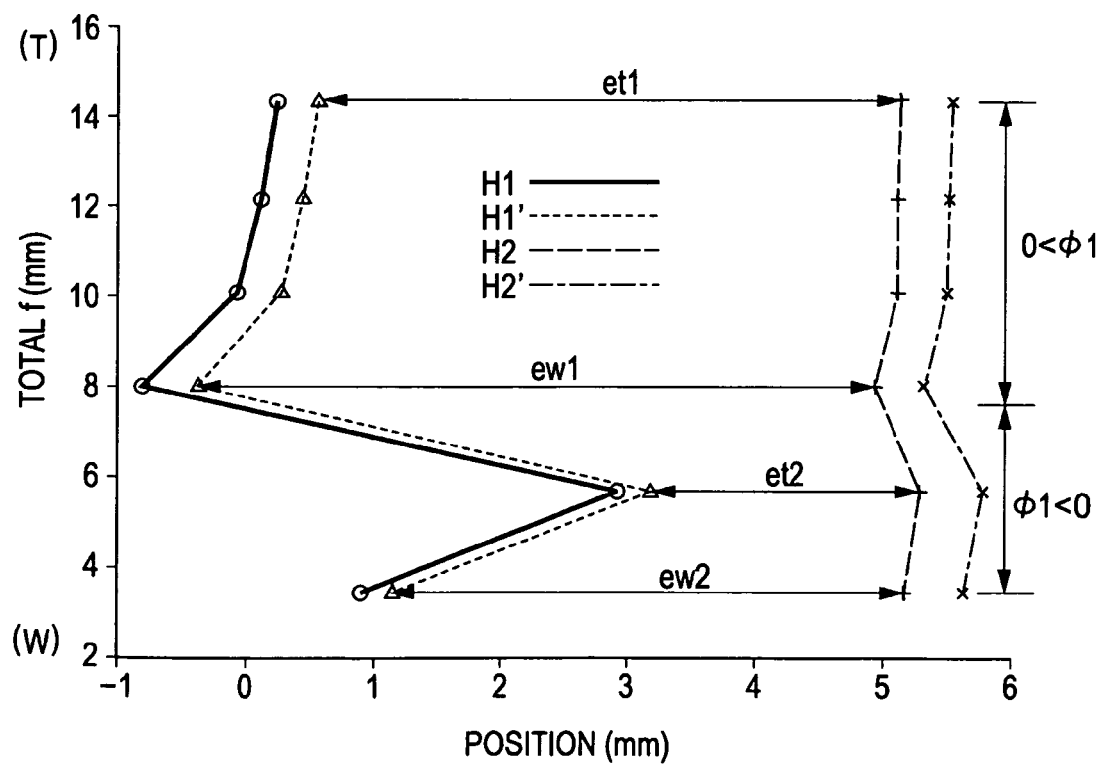
FIG. 26 is a chart illustrating change in power of an optical group G1 and an optical group G3 according to the example 3 of at least one exemplary embodiment.

FIG. 26 illustrates change in the principal-point positions before and after the first group G1$c$ and the third group G3$c$ (H1 is the forward principal-point position of the first group G1$c$, H1' is the backward principal-point position of the first group G1$c$, H2 is the forward principal-point position of the third group G3$c$, and H2' is the backward principal-point position of the third group G3$c$). The first group G1$c$ is made up of meniscus lenses, so the principal-point position thereof greatly moves. Also, when viewing the change thereof, it can be understood that the power of the first group G1$c$ moves in the object direction in the positive range as the power of the entire system increases, and expands the interval of the H1 and H2. Also, it can be understood that the power of the first group G1$c$ moves in the object direction even in the negative range as the power of the entire system increases, and expands the interval of the H1 and H2. Also, when assuming that the forward principal-point position and the backward principal-point position of the first group G1$c$ are H1 and H1' respectively, the forward principal-point position and the backward principal-point position of the third group G3$c$ are H2 and H2' respectively, the distance between the object point and the H1 is eo, the distance between the H1' and H2 is e, the distance between the H2' and the image point is ei, and smaller distance between the eo and ei is e', the relationships between e and e' and the relationships of e/e' are shown in Table 20. When viewing this, the following condition $$0.7 < e/e' < 1.4$$

can be satisfied except for a zoom state 5.

Further, when assuming that the backward principal-point position of the first group G1$c$ is H1', the forward principal-point position of the third group G3$c$ is H2, the distance between the H1' and H2 in a case in which the power of the entire system is the smallest in the positive range of the power of the first group G1$c$ is et1, the distance between the H1' and H2 in a case in which the power of the entire system is the greatest is ew1, the distance between the H1' and H2 in a case in which the power of the entire system is the smallest in the negative range of the power of the first group G1$c$ is et2, and the distance between the H1' and H2 in a case in which the power of the entire system is the greatest is ew2, it can be understood from FIG. 26 that $$et1 < ew1$$

$$et2 < ew2$$

can be satisfied.

The features other than this are substantially similar to example 1.

EXAMPLE 4

Figure 27:
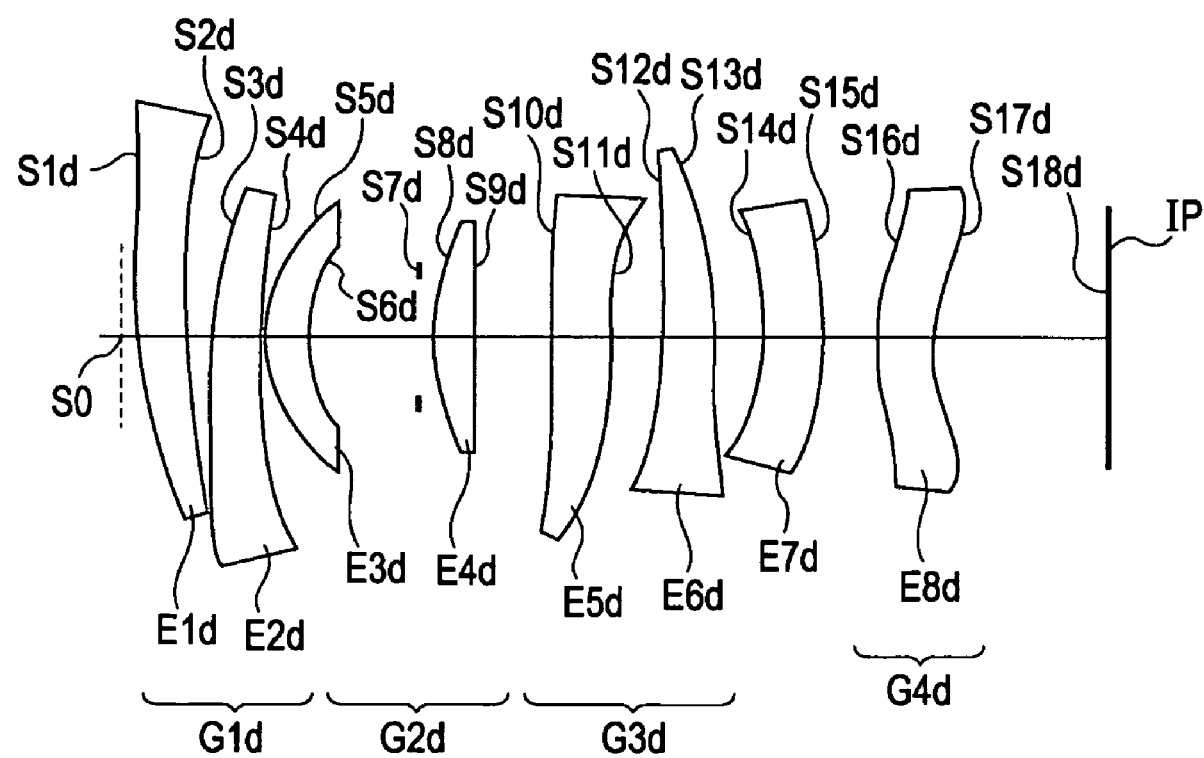
FIG. 27 is a lens cross-sectional view according to an example 4 of at least one exemplary embodiment.

FIG. 27 is a lens cross-sectional view according to an example 4 of at least one exemplary embodiment.

The specifications are substantially similar to example 1. Seven optical elements (lenses) are employed in total. In order from the object side, the optical elements E1$d$, E2$d$, E5$d$, and E6$d$ have a rotational asymmetric shape, these optical elements are decentered in the Y-axis direction, and the amount of decentering thereof continuously varies. Also, the absolute value of the amount thereof is set so as to be equal with mutually positive/negative reverse. The optical elements E3$d$ and E4$d$ have a rotational symmetric spherical surface. In the event that an asymmetric aberration remains on the optical axis, the optical elements E3$d$ and E4$d$ can have a rotational asymmetric shape to reduce this. The optical elements E7$d$ and E8$d$ have a rotational asymmetric shape symmetric as to at least one surface. This reduces the on-axis coma aberration which has not been able to be reduced in the optical elements E1$d$ and E2$d$ by tilting this aberration. Also, the first group G1$d$ comprises the optical elements E1$d$ and E2$d$. Similarly, the second group G2$d$ comprises the optical elements E3$d$ and E4$d$, the third group G3$d$ comprises the optical elements E5$d$ and E6$d$, and the fourth group G4$d$ comprises the optical elements E7$d$ and E8$d$. As for surface numbers, the reference plane serving as the origin of the absolute coordinates system is determined as a surface S0, the first surface of the optical element E1d is determined as S1d, and in order, the corresponding surfaces are S2d, S3d, S4d, and so on, and following the surface S6d (backward of the optical element E3d) a diaphragm S7d (SP) is disposed. The first surface of the optical element E4d is determined as S8d, and the subsequent numbers are assigned in order, and the image plane IP is S18d. Hereinafter, decentering continues in the Y-axis direction, and let us say that the rotational asymmetric groups (G1d and G3d), which contribute to change in power, the rotational symmetric group (G2d), and the group (G4d) configured to suppress the above residual aberrations by decentering are referred to as decentering movable blocks, auxiliary block, and auxiliary movable block, respectively. Disposing the decentering movable blocks G1d and G3d alone makes the power thereof too strong, and can make it difficult to perform correction of aberrations, and accordingly, the auxiliary block G2d is disposed.

Figure 28:
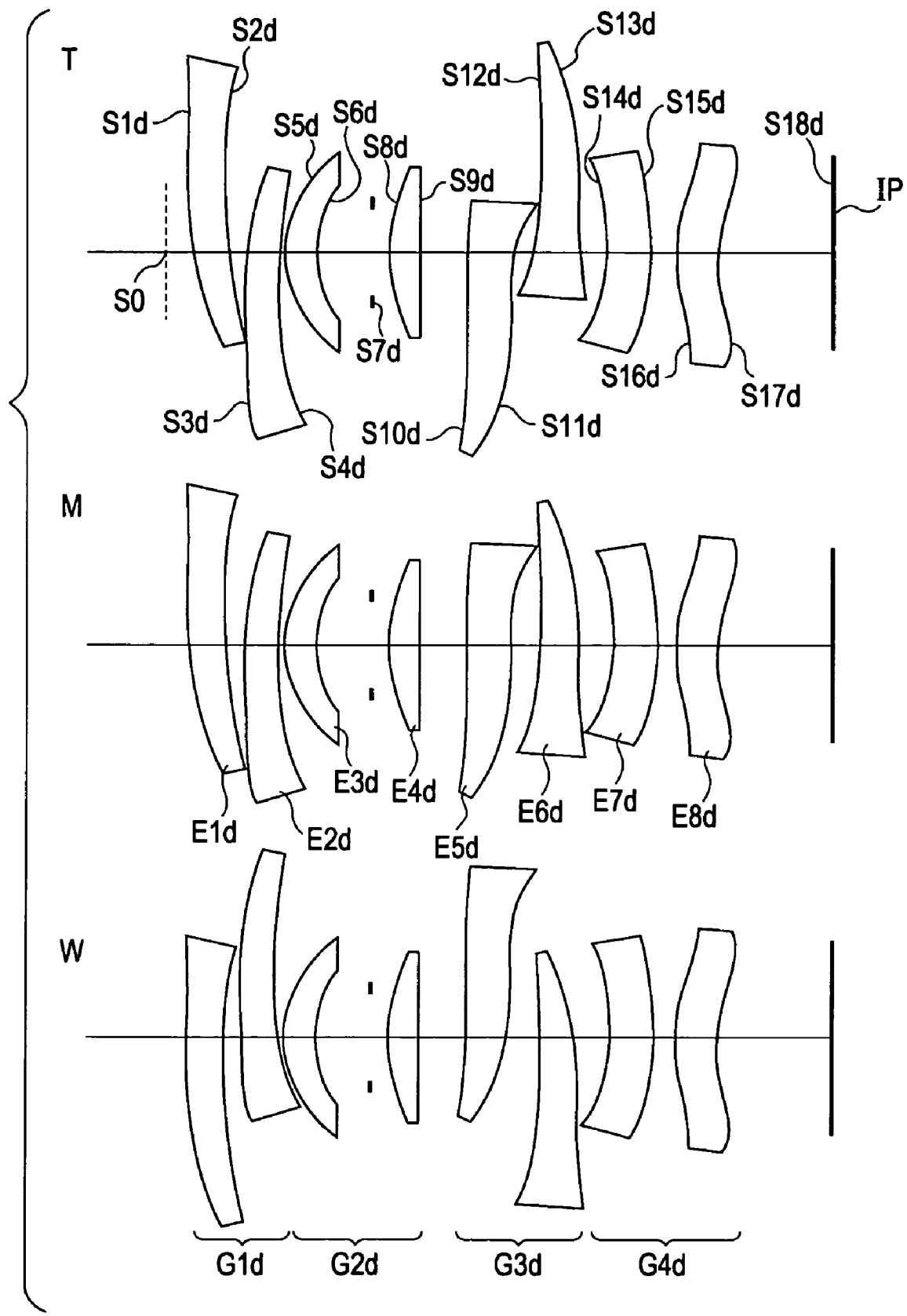
FIG. 28 is a lens cross-sectional view of the telephoto end, middle, and wide-angle end according to the example 4 of at least one exemplary embodiment.

The lens data of the example 4 is shown in Table 21. Table 22 shows the amount of shift from the Z axis of the respective optical elements, and Table 23 shows the amount of tilt in the optical elements E7d and E8d. The values of the respective coefficients of the polynomial surfaces represented with Equation 1 are shown in Table 24. FIG. 28 illustrates the optical path diagrams at this time in order of a telephoto end T, middle zoom position M, and wide-angle end W. The optical elements E1d and E2d are decentered in the Y-axis direction, and the absolute value of the amount thereof is so as to be equal with mutually positive/negative reverse, as shown in Table 22. Thus, the power of the first group G1d is changed from positive to negative between the telephoto end and the wide-angle end. The ray emitted from the first group G1d passes through the optical element E3d, diaphragm S7 (SP), and optical element E4d, and illuminates the optical elements E5d and E6d. The optical elements E5d and E6d are decentered in the Y-axis direction, and the absolute value of the amount thereof is so as to be equal with mutually positive/negative reverse, as shown in Table 22. Thus, the power of the third group G3d is changed from negative to positive between the telephoto end and the wide-angle end. The ray passed through these decentering movable blocks illuminates the next auxiliary block G4d. The auxiliary block G4d compensates the power necessary for the decentering movable blocks. The ray passed through these optical elements forms an image without changing the image plane.

Figure 29A:
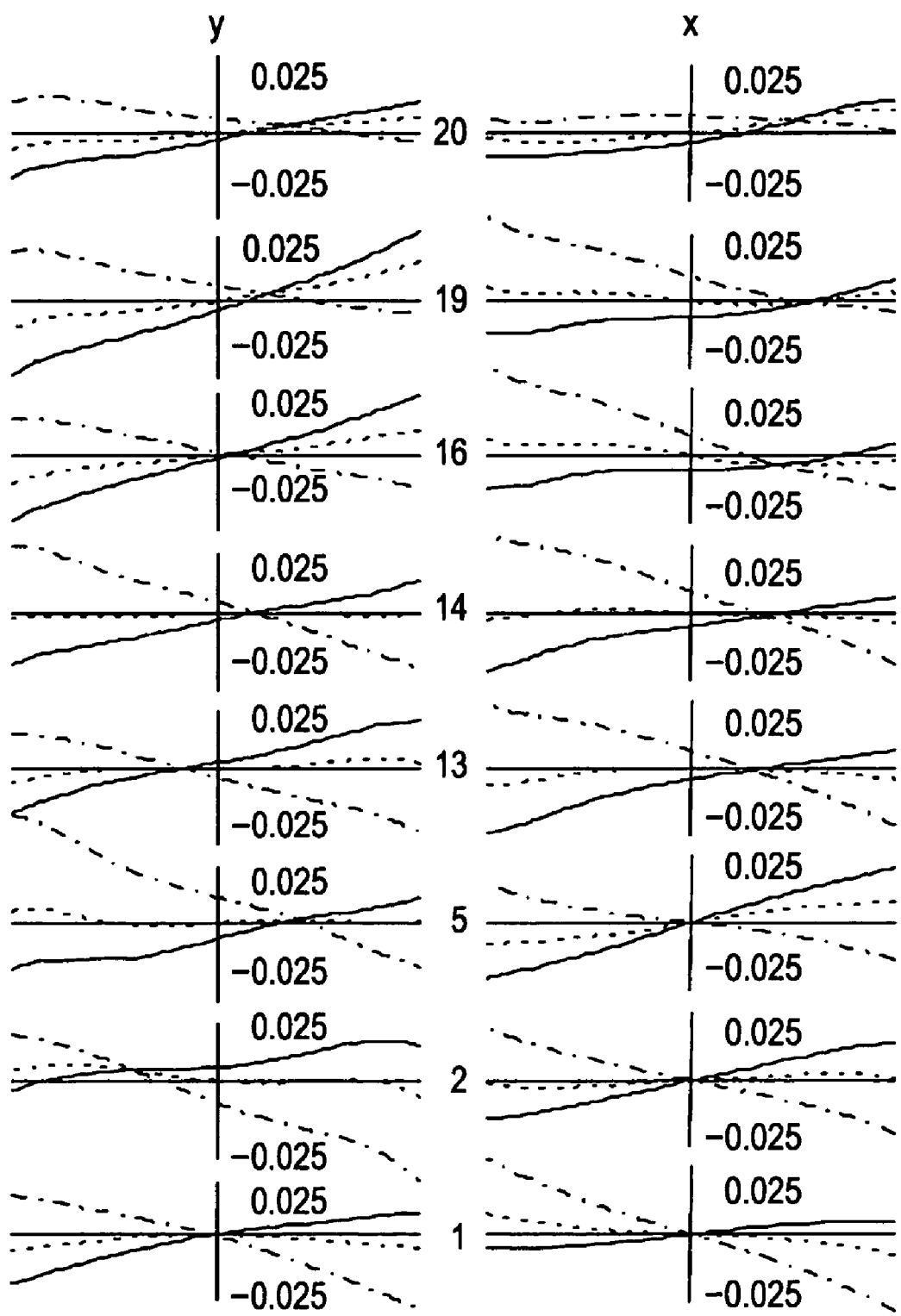
FIG. 29A is an aberration chart of the example 4 of at least one exemplary embodiment.
Figure 29B:
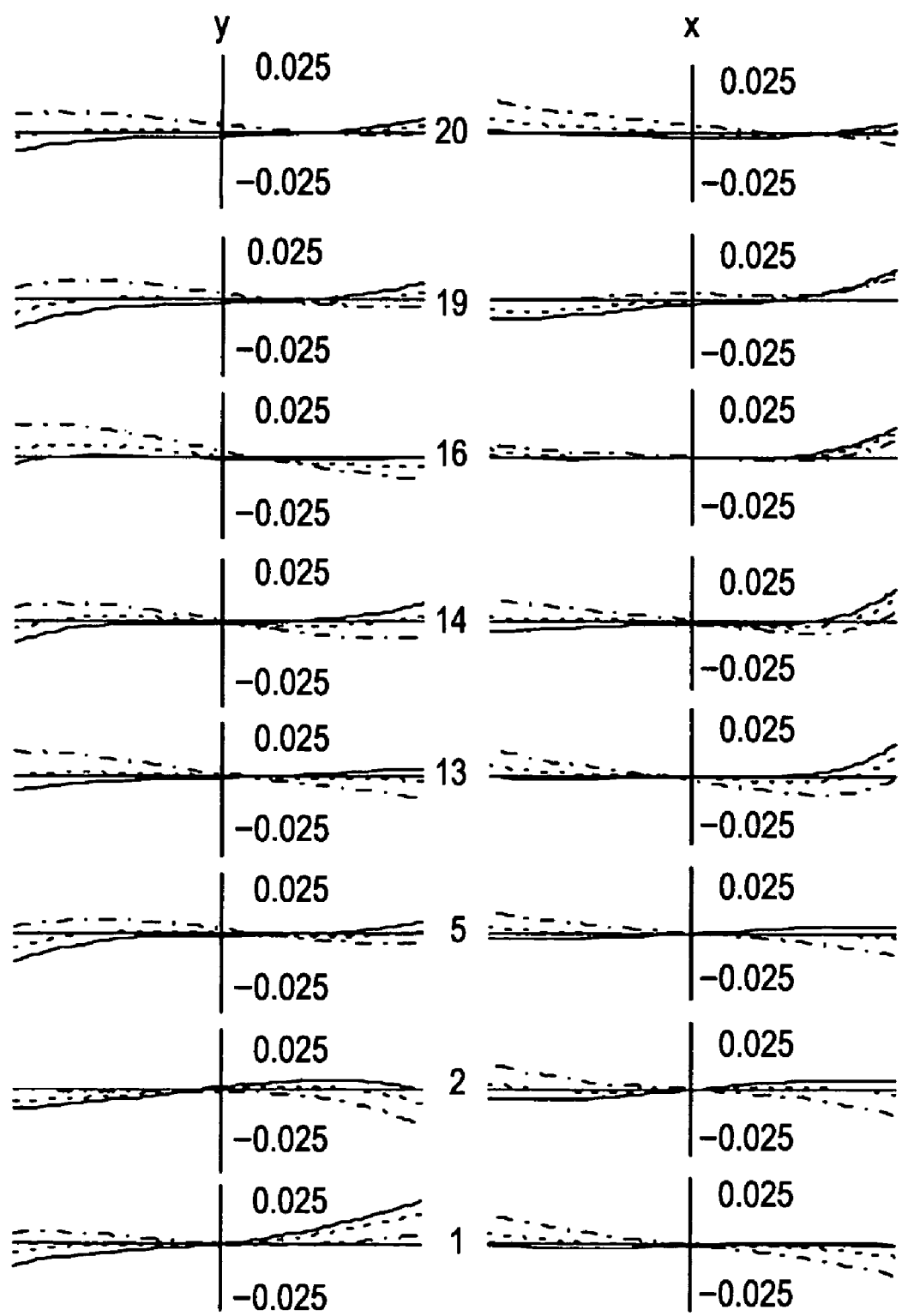
FIG. 29B is an aberration chart of the example 4 of at least one exemplary embodiment.
Figure 29C:
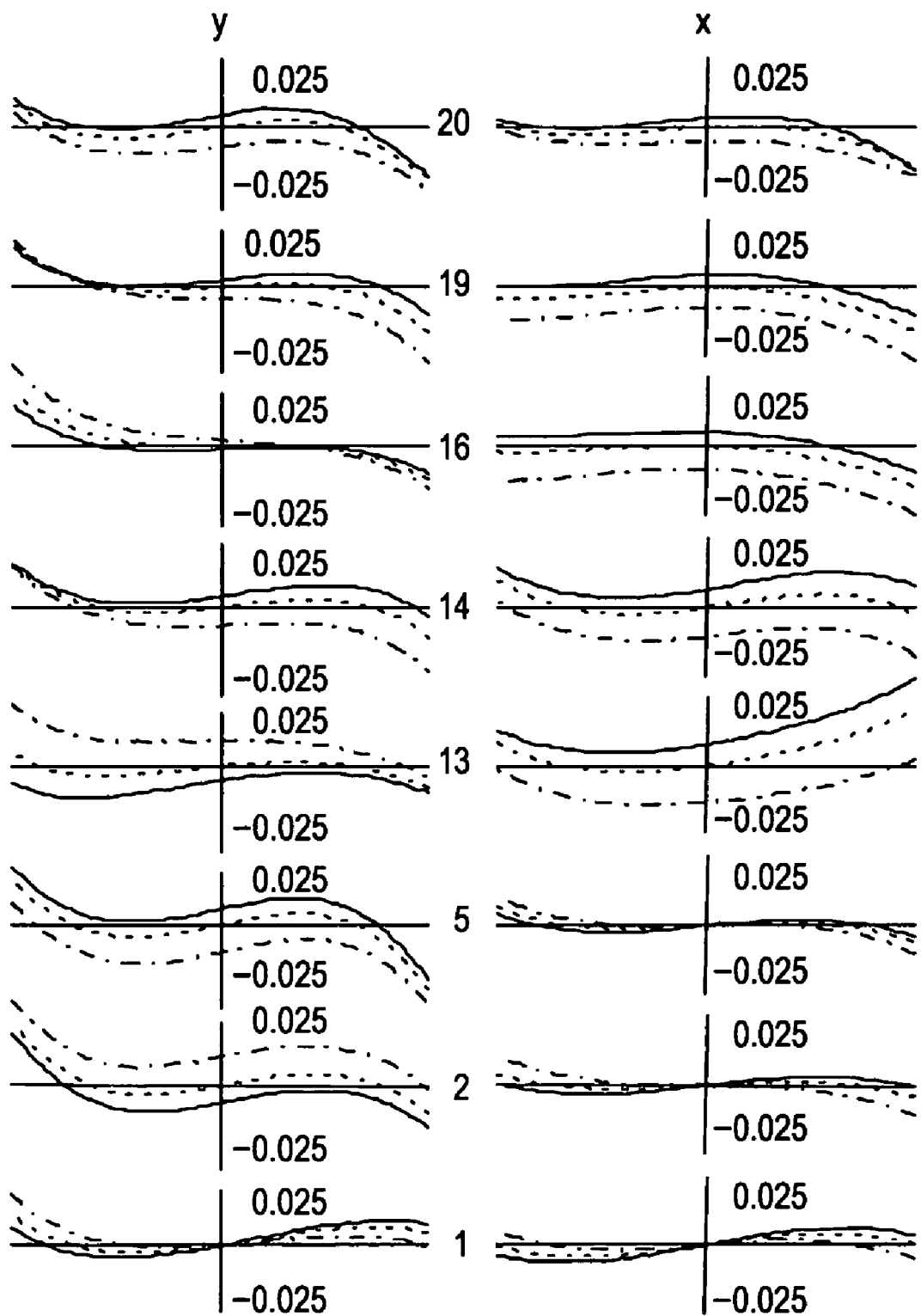
FIG. 29C is an aberration chart of the example 4 of at least one exemplary embodiment.
Figure 30:
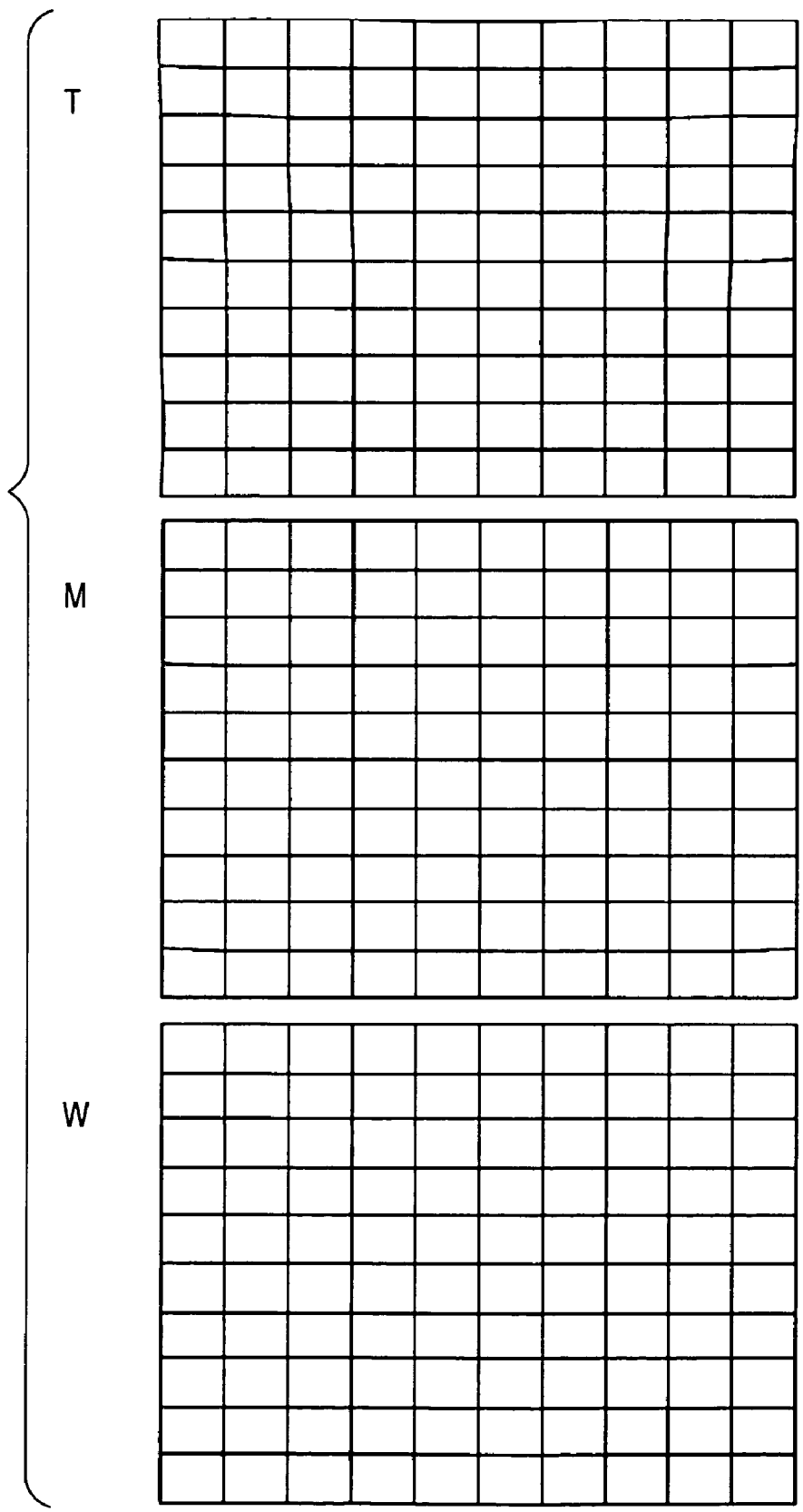
FIG. 30 is a diagram showing the distortion reactor lattices at the telephoto end, middle, and wide-angle end according to the example 4 of at least one exemplary embodiment.

Next, the aberration charts at the telephoto end, middle zoom position, and wide-angle end are shown in FIG. 29A through FIG. 29C, respectively. The horizontal axis represents the position of a ray on the pupil, and the vertical axis represents the shift from the chief ray on the image plane. The range of the vertical axis is about ±20 µm. The numbers within FIG. 29A through FIG. 29C are angle-of-view numbers, which on the image plane are such as illustrated in FIG. 8. The shapes of the optical elements can be symmetric as to the X axis, so the positive case should be taken into consideration regarding the X direction. When viewing the ray at an angle of view of 0°, it can be understood that a coma aberration can be reduced from the telephoto end to the wide-angle end. Also, FIG. 30 illustrates the distortion reactor lattices at a telephoto end T, middle zoom position M, and wide-angle end W. The lengthwise and crosswise size of the lattices is about ¼ inch (vertically 2.7 mm×horizontally 3.6 mm). When viewing this figure, it can be understood that distortion can be suppressed, but when viewing the ray at an angle of view of 0°, it can be understood that some amount of a coma aberration can remain.

Figure 31:
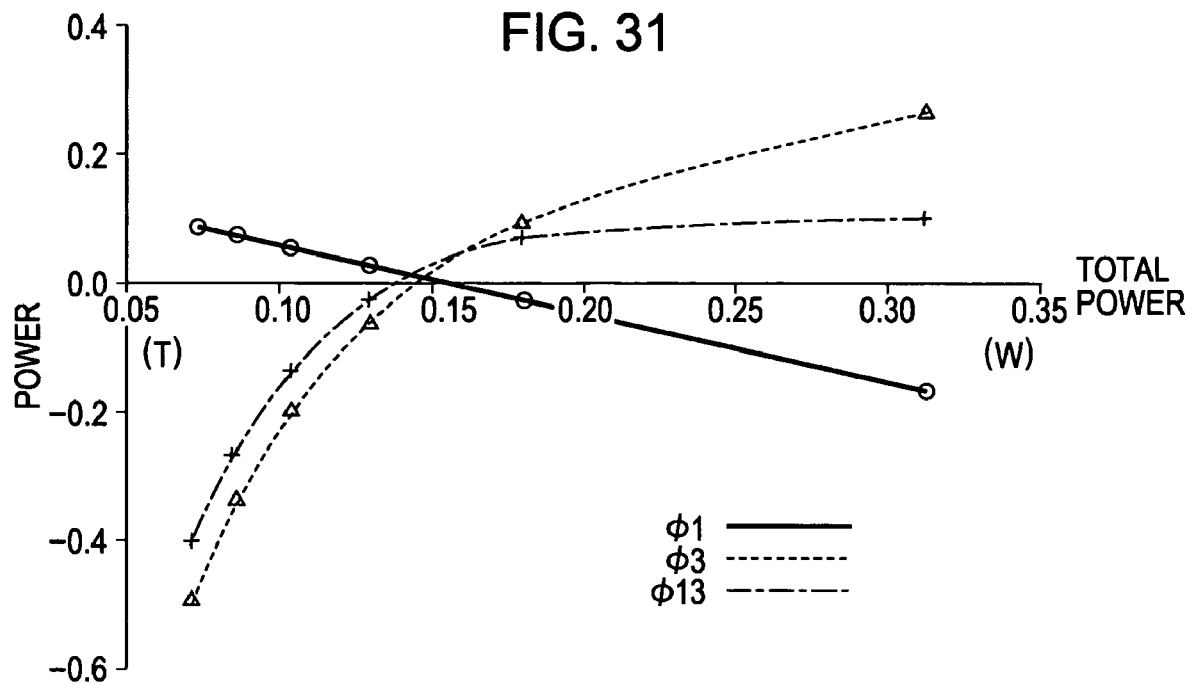
FIG. 31 is a chart illustrating change in power of an optical group G1 and an optical group G3 according to the example 4 of at least one exemplary embodiment.

FIG. 31 is a chart plotting change in power Φ1 and Φ3 of the first group G1d and the third group G3d, and the sum thereof Φ13 as to the power of the entire system.

At this time, when assuming that the maximum value of the absolute value of the power in the first group G1d and the third group G3d is |Φ|max, and the power of the sum of the first group G1d and the third group G3d is Φ13, the following condition $$-|\Phi|max \leq \Phi 13 \leq |\Phi|max$$

can be satisfied.

Figure 32:
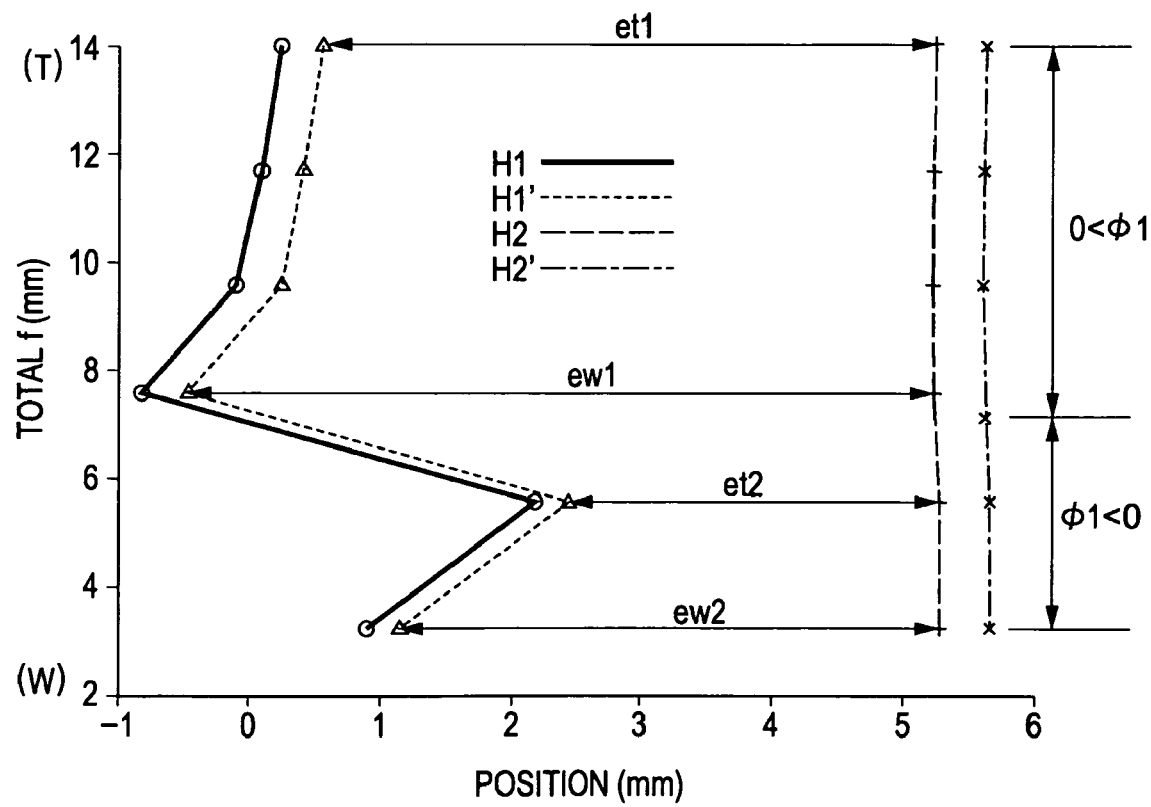
FIG. 32 is a chart illustrating change in power of an optical group G1 and an optical group G3 according to the example 4 of at least one exemplary embodiment.

FIG. 32 illustrates change in the principal-point positions before and after the first group G1d and the third group G3d (H1 is the forward principal-point position of the first group G1d, H1' is the backward principal-point position of the first group G1d, H2 is the forward principal-point position of the third group G3d, and H2' is the backward principal-point position of the third group G3d). The first group G1d is made up of meniscus lenses, so the principal-point position thereof greatly moves. Also, when viewing the change thereof, it can be understood that the power of the first group G1d moves in the object direction in the positive range as the power of the entire system increases, and expands the interval of the H1 and H2. Also, it can be understood that the power of the first group G1d moves in the object direction even in the negative range as the power of the entire system increases, and expands the interval of the H1 and H2. Also, when assuming that the forward principal-point position and the backward principal-point position of the first group G1d are H1 and H1' respectively, the forward principal-point position and the backward principal-point position of the third group G3d are H2 and H2' respectively, the distance between the object point and the H1 is eo, the distance between the H1' and H2 is e, the distance between the H2' and the image point is ei, and smaller distance between the eo and ei is e', the relationships between e and e' and the relationships of e/e' are shown in Table 25. When viewing this, the following condition $$0.7 < e/e' < 1.4$$

can be satisfied except for a zoom state 5.

Further, when assuming that the backward principal-point position of the first group G1d is H1', the forward principal-point position of the third group G3d is H2, the distance between the H1' and H2 in a case in which the power of the entire system is the smallest in the positive range of the power of the first group G1d is et1, the distance between the H1' and H2 in a case in which the power of the entire system is the greatest is ew1, the distance between the H1' and H2 in a case in which the power of the entire system is the smallest in the negative range of the power of the first group G1d is et2, and the distance between the H1' and H2 in a case in which the power of the entire system is the greatest is ew2, it can be understood from FIG. 32 that $$et1 < ew1$$

$$et2 < ew2$$

can be satisfied.

The features other than this are substantially similar to example 1.

As described above, according to the respective examples, zooming can be performed while preferably eliminating an aberration by moving the rotational asymmetric optical elements in the direction different from the optical axis, and also a compact optical system having excellent optical capabilities can be obtained.

EXAMPLE 5

Figure 33:
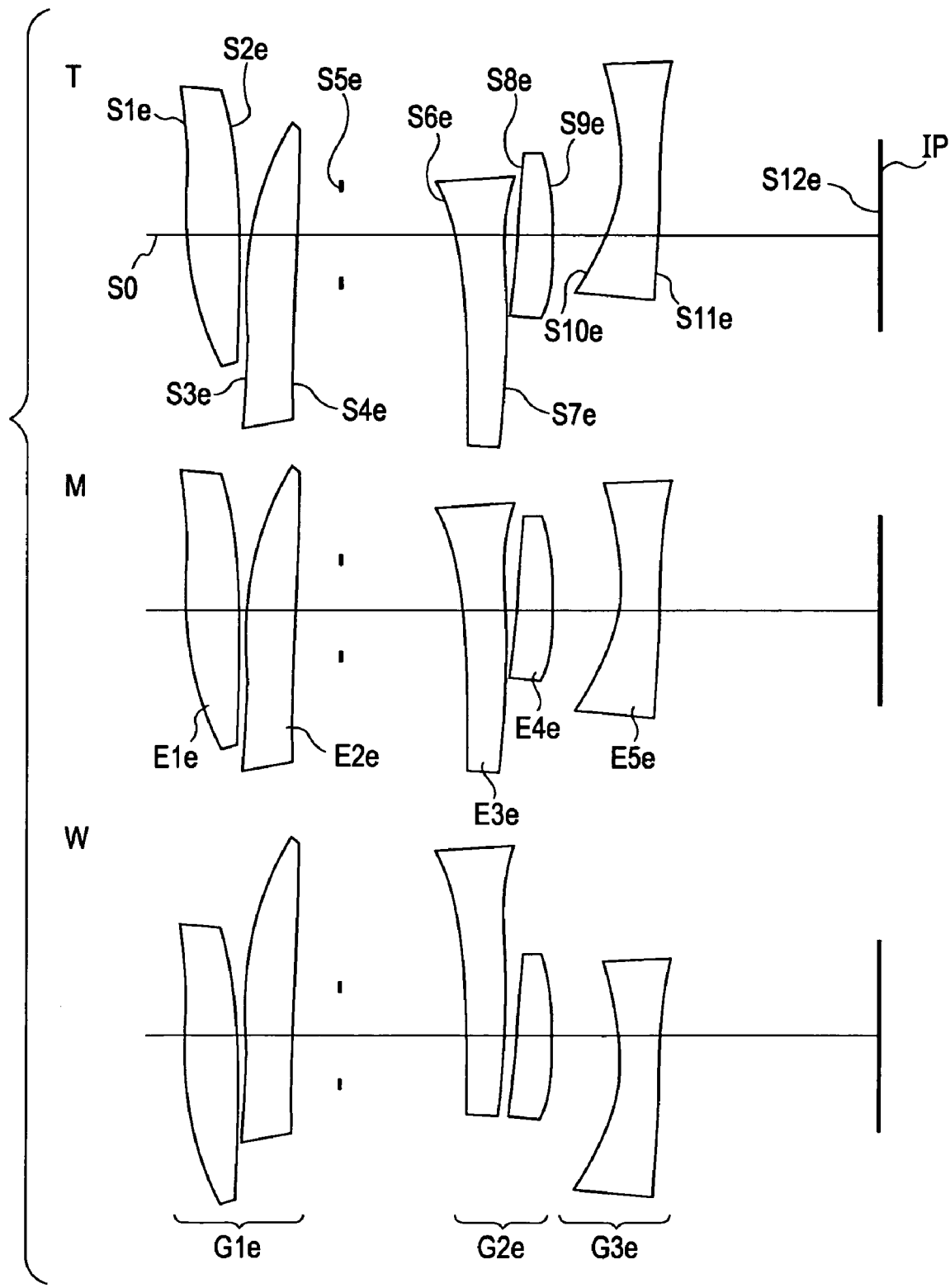
FIG. 33 is a lens cross-sectional view according to an example 5 of at least one exemplary embodiment.

FIG. 33 is a lens cross-sectional view according to an example 5 of at least one exemplary embodiment.

In FIG. 33, T, M, and W are lens cross-sectional views at the telephoto end (the zoom position where the power of the entire system is the minimum), at a middle zoom position, and at the wide-angle end (the zoom position where the power of the entire system is the maximum) respectively.

Figure 34:
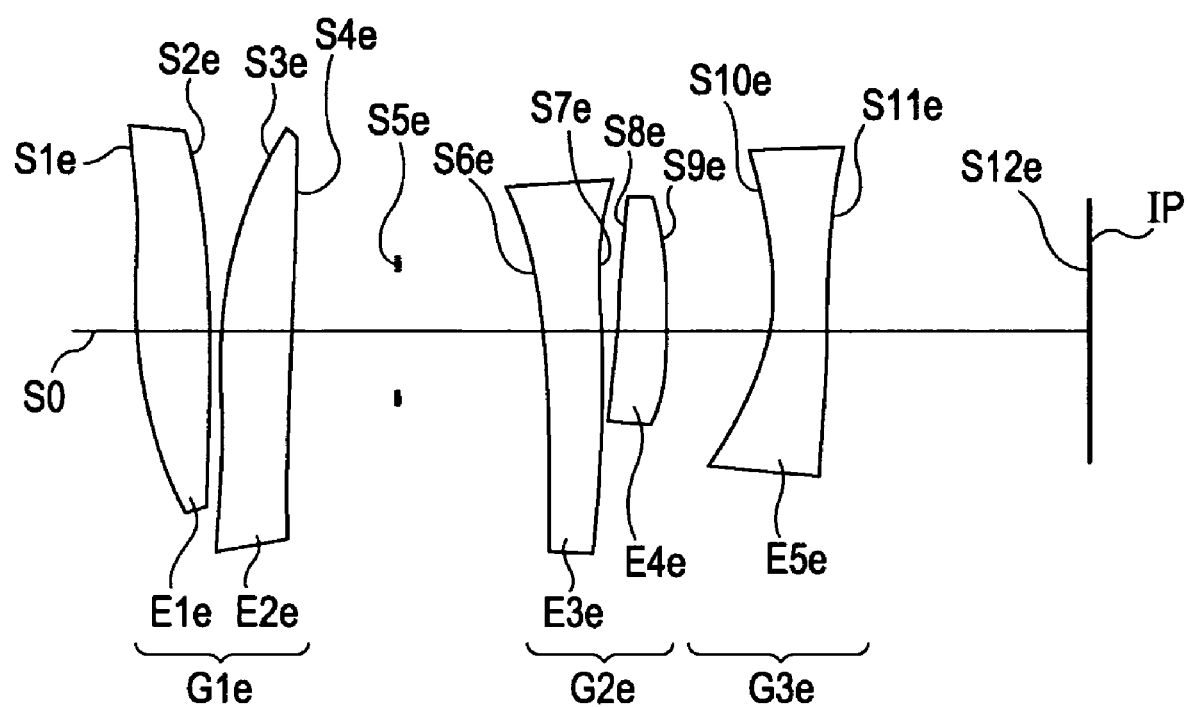
FIG. 34 is a lens cross-sectional view of the telephoto end, middle, and wide-angle end according to the example 5 of at least one exemplary embodiment.

FIG. 34 is a lens cross-sectional view for selecting the middle zoom position of the example 5 in FIG. 33 (M in FIG. 33) as an example and describing respective factors.

A zoom optical system according to the example 5 is a photography lens system employed for an imaging apparatus, and the left hand is the object side, and the right hand is the image side in the lens cross-sectional view.

Note that the zoom optical system according to the example 5 can be employed as a projector, and in this case, the left hand is a screen, and the right hand is a projection surface.

In FIG. 33 and FIG. 34, G1e and G2e are optical groups of which optical power is variable.

G3e is an optical group having symmetry as to at least one surface, and including one or more optical elements Ls capable of decentering.

Zooming is performed by changing the power in the two optical groups G1e and G2e each of which optical power is variable.

The two optical groups G1e and G2e each of which optical power is variable each include a rotationally asymmetrical surface, move in the direction different from the optical axis, and include two optical elements E1e and E2e which change the power within the optical group G1e, and two optical elements E3e and E4e which change the power within the optical group G2e, respectively.

Note that the term "optical power" refers to the power of a surface positioned on the optical axis, and when the surface on the optical axis varies by the optical element having a rotationally asymmetrical surface being decentered, optical power is also changed in response to that change.

With the example 5 of at least one exemplary embodiment, five optical elements (lenses) are employed in total. In order from the object side, the optical elements E1e, E2e, E3e, and E4e have a rotational asymmetric shape, these optical elements are decentered in the Y-axis direction, and the amount of decentering continuously varies. The optical element E5e has a rotational asymmetric shape symmetric as to at least one surface. This reduces the on-axis coma aberration which may not have been reduced in the optical elements E1e through E4e by shifting or tilting this aberration. Also, the first group G1e comprises the optical elements E1e and E2e. Similarly, the second group G2e comprises the optical elements E3e and E4e, and the third group G3e comprises the optical element E7e. As for surface numbers, the reference plane serving as the origin of the absolute coordinates system is determined as a surface S0, the first surface of the optical element E1e is determined as S1e, and in order, the corresponding surfaces are surfaces S2e, S3e, and S4e, and following the surface S4e (backward of the optical element E2e) a diaphragm S5e (SP) is disposed. The first surface of the optical element E3e is determined as S6e, and the subsequent numbers are assigned in order, and the image plane IP is S12e. Hereinafter, decentering continues in the Y-axis direction, and let us say that the rotational asymmetric groups (G1e and G2e), which contribute to change in power, and the third group G3e made up of the optical element (E5e) configured to suppress the above residual aberrations by decentering are referred to as decentering movable blocks G1e and G2e, and auxiliary movable block G3, respectively.

The lens data of the example 5 is shown in Table 26. The amount of shift from the Z axis of the respective optical elements is shown in Table 27. The values of the respective coefficients of the polynomial surfaces represented with Equation 1 are shown in Tables 28-1 and 28-2. The optical elements E1e and E2e are decentered in the Y-axis direction. Thus, the power of the first group G1e is changed from positive to negative between the telephoto end and the wide-angle end. The ray emitted from the first group G1e passes through the diaphragm SP, and illuminates the optical elements E3e and E4e. The optical elements E3e and E4e are decentered in the Y-axis direction. Thus, the power of the second group G2e is changed from negative to positive between the telephoto end and the wide-angle end. The ray passed through these decentering movable blocks G1e and G2e illuminates the next auxiliary movable block G3e. The auxiliary movable block G3e compensates the power necessary for the decentering movable blocks G1e and G2e. The ray passed through these optical elements forms an image without changing the image plane IP.

Figure 35A:
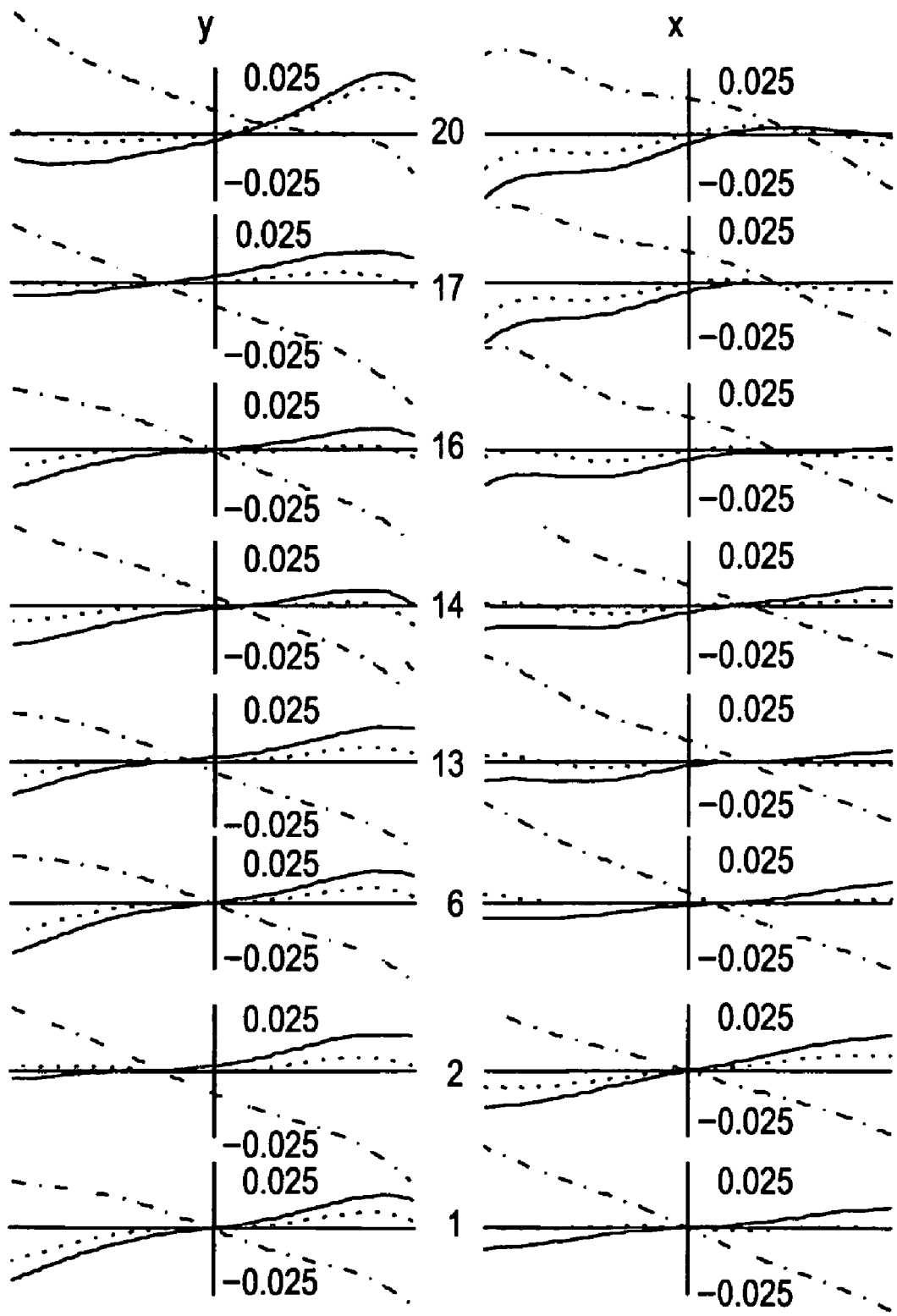
FIG. 35A is an aberration chart of the example 5 of at least one exemplary embodiment.
Figure 35B:
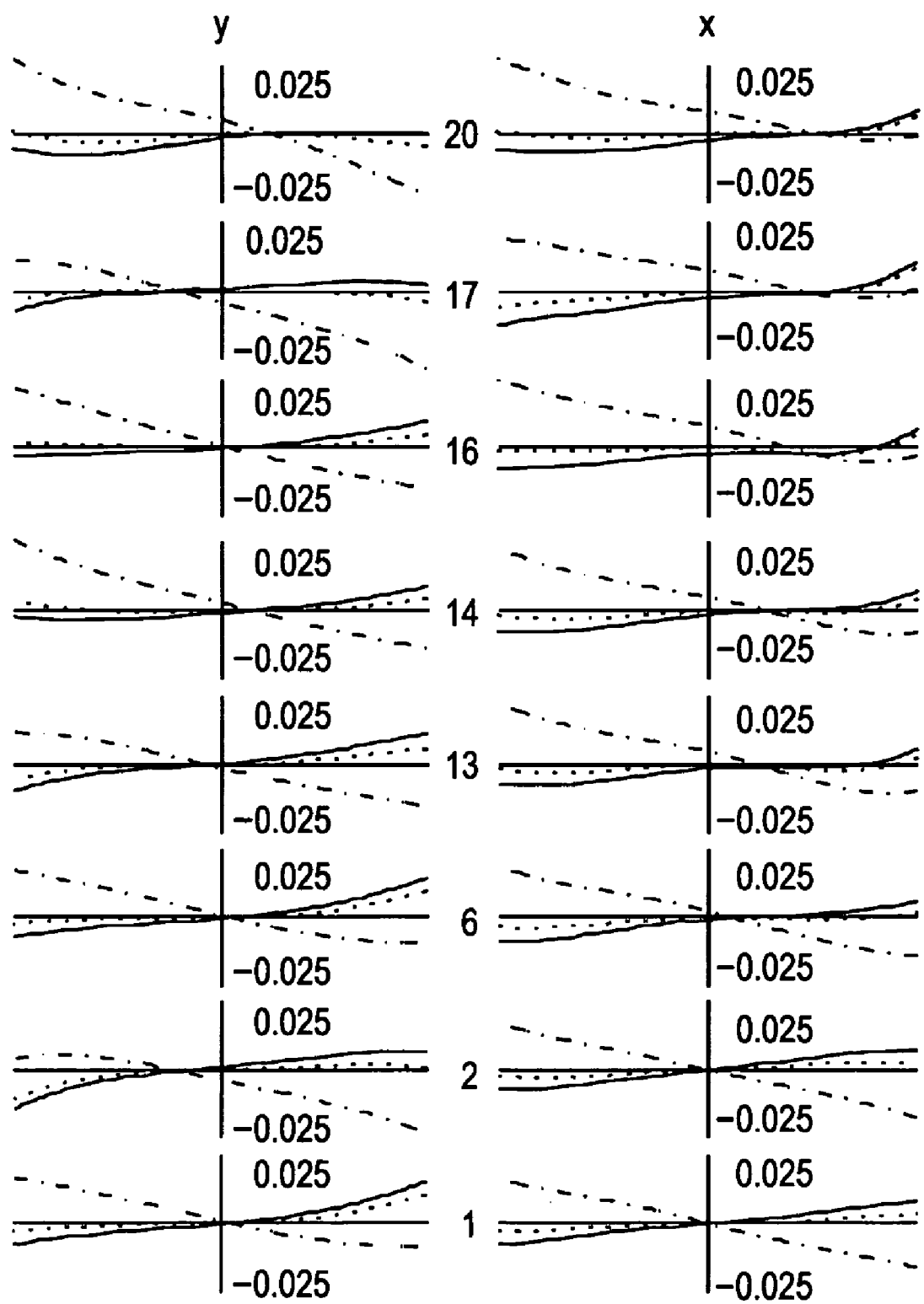
FIG. 35B is an aberration chart of the example 5 of at least one exemplary embodiment.
Figure 35C:
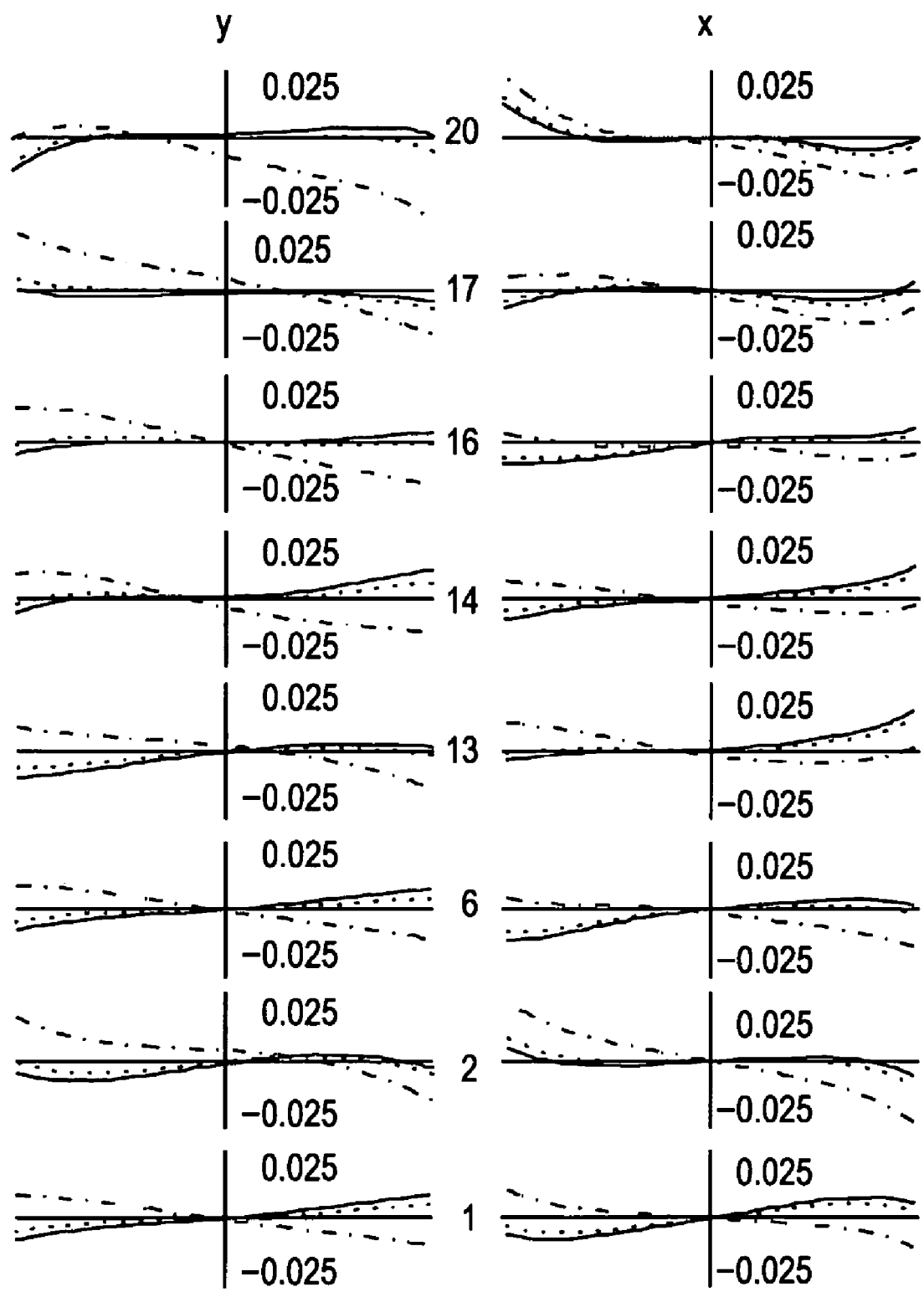
FIG. 35C is an aberration chart of the example 5 of at least one exemplary embodiment.
Figure 36:
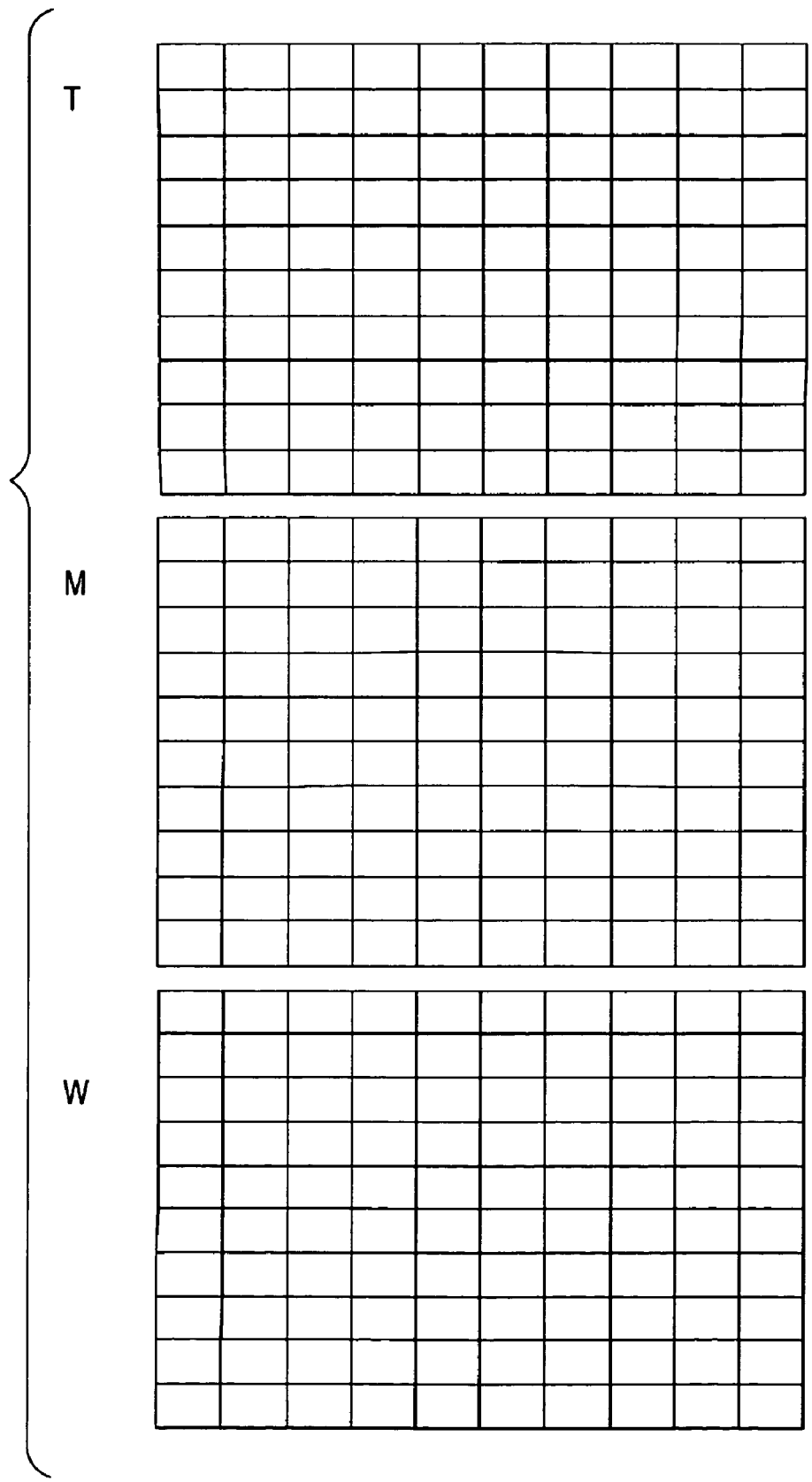
FIG. 36 is a diagram showing the distortion reactor lattices at the telephoto end, middle, and wide-angle end according to the example 5 of at least one exemplary embodiment.

Next, the aberration charts at the telephoto end, middle zoom position, and wide-angle end are shown in FIG. 35A through FIG. 35C, respectively. The horizontal axis represents the position of a ray on the pupil, and the vertical axis represents the shift from the chief ray on the image plane. The range of the vertical axis is about ±20 µm. The numbers within FIG. 35A through FIG. 35C are angle-of-view numbers, which on the image plane are such as illustrated in FIG. 8. The shapes of the optical elements are symmetric as to the X axis, so only the positive case should be taken into consideration regarding the X direction. When viewing the ray at an angle of view of 0°, it can be understood that a coma aberration can be reduced from the telephoto end to the wide-angle end. Also, FIG. 36 illustrates the distortion reactor lattices at a telephoto end T, middle zoom position M, and wide-angle end W. The lengthwise and crosswise size of the lattices is about ¼ inch (vertically 2.7 mm×horizontally 3.6 mm). When viewing this figure, it can be understood that distortion can be suppressed, but when viewing the ray at an angle of view of 0°, it can be understood that some amount of a coma aberration can remain. Table 29 shows comparisons of the power in the first group G1e and third group G3e in the above design example, and the examples 1 through 5 (the first group G1e and second group G2e in the example 5), and the auxiliary movable block (E7a-c in the examples 1 through 3, G4d in the example 4, and E5e in the example 5). The shaded portions show the maximum value of the absolute value of the auxiliary movable block and the decentering movable block ($|\Phi s|$max and $|\Phi d|$max, respectively).

When comparing these, it can be understood that change in power of the auxiliary movable block does not include change in positive/negative, and the absolute value $|\Phi s|$max of the maximum value of the power of the auxiliary movable block is smaller than the $|\Phi d|$max of the decentering movable block in any embodiment. In other words, $|\Phi s|$max<$|\Phi d|$max holds.

Further, when assuming that the absolute value of the value obtained by subtracting the minimum value from the maximum value of the power of the decentering auxiliary block straddle the entire zoom area is $\Delta|\Phi s|$, $\Delta|\Phi s|<0.1$ holds, and when assuming that the absolute value of the value obtained by subtracting the minimum value from the maximum value of the power of the auxiliary movable block straddle the entire zoom area is $\Delta|\Phi d|$, $\Delta|\Phi d|>0.5$ holds. When comparing Δ|Φd| between the G1a-d and G3a-d, and assuming that the smaller one is determined as Δ|Φd|min, Δ|Φd|min/Δ|Φd|>6 holds, and also Δ|Φd|min/Δ|Φd|>25 holds except for the example 5. Accordingly, it can be understood from comparison between aberration charts that the auxiliary movable block does not affect upon the power fluctuation of the entire system, and relates to elimination of a on-axis coma aberration.

Note that with the above respective examples, three or more optical groups of which optical power is variable can be employed. Also, two or more optical groups having symmetry as to at least one surface, and including one or more optical elements capable of decentering can be employed.

Also, optical groups of which optical power is substantially unchangeable can be omitted, or two or more optical groups of which optical power is variable can be employed.

Next, an example of a digital still camera (imaging apparatus) to which a zoom optical system according to at least one exemplary embodiment can be applied as a photographic optical system will be described with reference to FIG. 37.

Figure 37:
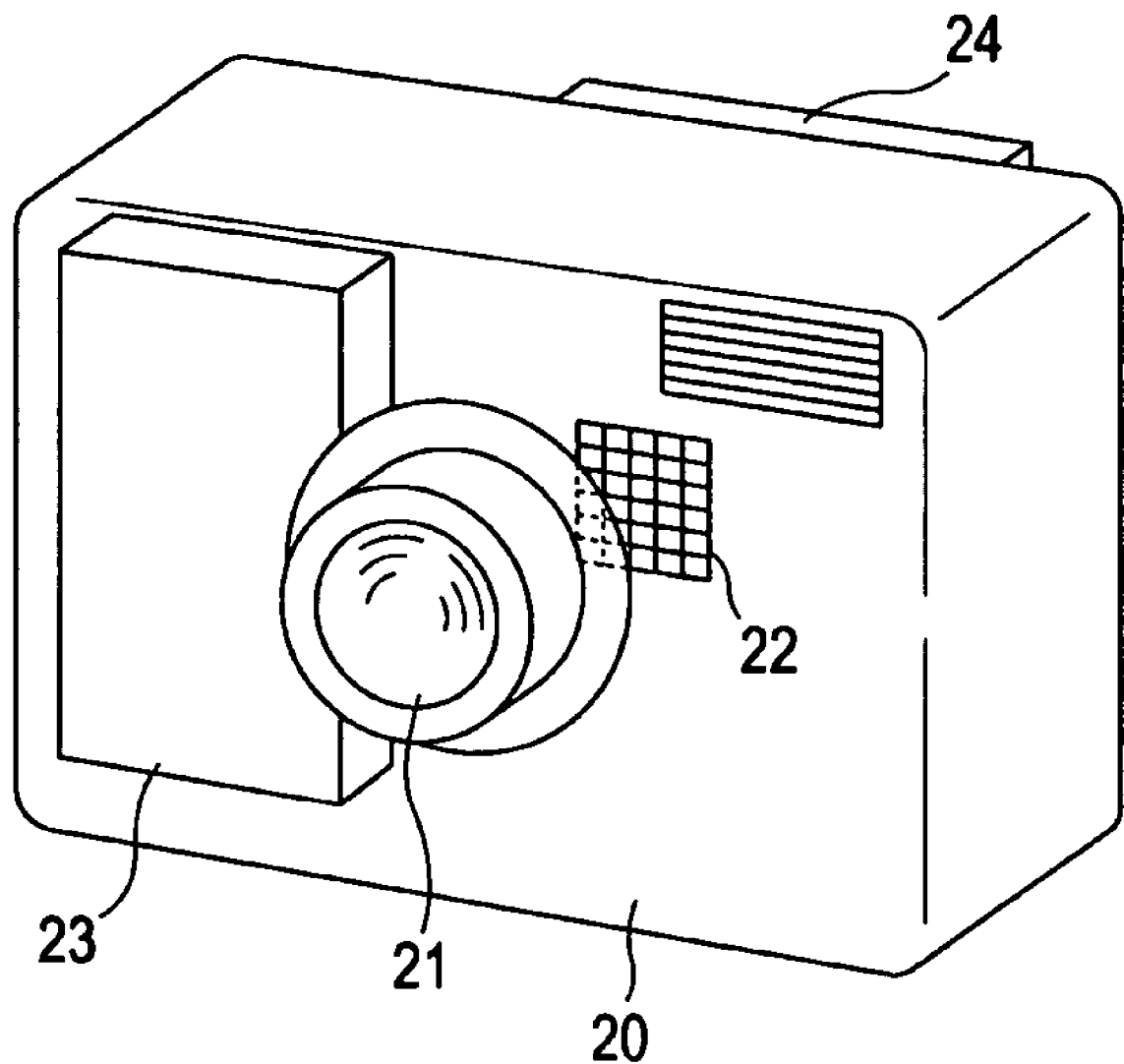
FIG. 37 is an explanatory diagram of an imaging apparatus according to at least one exemplary embodiment.

In FIG. 37, reference numeral 20 denotes a camera body, 21 denotes a photographic optical system made up of a zoom optical system according to at least one exemplary embodiment, 22 denotes a solid-state imaging device (photoelectric conversion element) such as a CCD sensor or CMOS sensor which receives a subject image using the photographic optical system 21, 23 denotes memory for recording the subject image photo-accepted by the imaging device 22, and 24 denotes a finder for observing the subject image displayed on an unshown display element.

The above display element is made up of a liquid crystal panel or other related or equivalent display apparatus as known by one of ordinary skill in the relevant art, on which the subject image formed on the imaging device 22 is displayed.

Thus, the present example realizes an imaging apparatus which is small and has high optical capabilities by applying the zoom optical system according to the present example to the imaging apparatus such as a digital still camera. It is needless to say that as for the zoom optical system to be applied to this imaging apparatus, the zoom optical system according to any one of not the above examples 1 through 5 but also later-described examples 6 and 7 can be employed.

COMPARATIVE EXAMPLE 1

Figure 4:
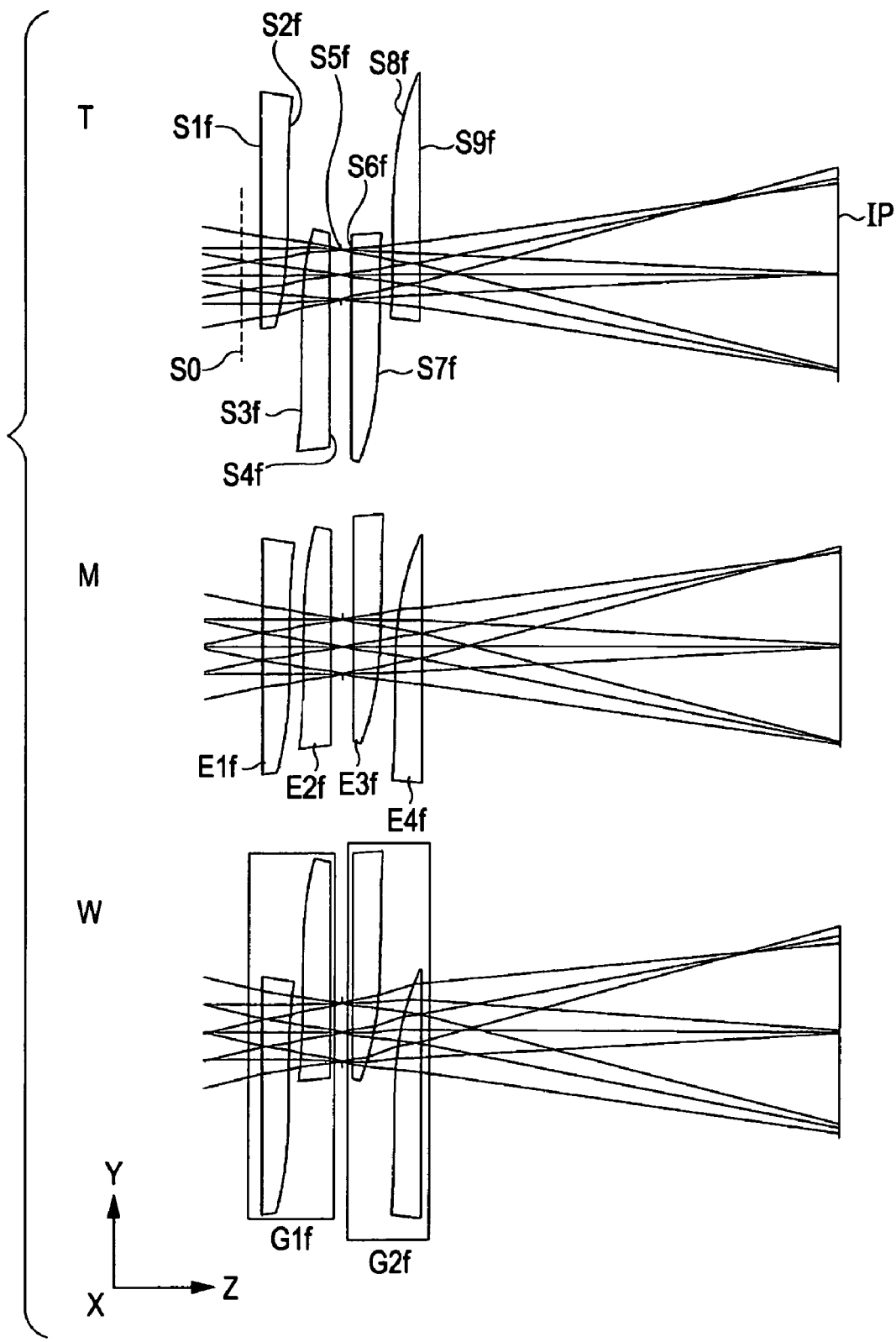
FIG. 4 is a cross-sectional view of the lens designed based on the comparative example 1.

Next, a comparative example 1 of at least one exemplary embodiment will be shown. The comparative example 1 has been designed with reference to Japanese Patent Laid-Open No. 1990-119103. FIG. 4 illustrates a lens cross-sectional view of the comparative example 1.

The zoom optical system according to the comparative example 1 is made up of two optical groups G1f and G2f each including two rotational asymmetric optical elements as illustrated in FIG. 4, which are referred to as the first group G1f, and the second group G2f in order from the object side. This first group G1f comprises optical elements E1f and E2f, and the second group G2f comprises optical elements E3f and E4f. First, a paraxial calculation is performed by approximating these groups using one thin-thickness lens. Next, let us say that the power of the thin-thickness lens of the first group G1f and the power of the thin-thickness lens of the second group G2f are Φ1 and Φ2 respectively, and a principal interval and back focus are e and Sk respectively. Also, when assuming that the power of the entire system is Φ, and the focal distance is f, the following equation holds.

$$\phi = \frac{1}{f} = \phi_1 + \phi_2 - e\phi_1\phi_2 \qquad \text{[Equation 6]}$$

Also, as for the back focus Sk, the following equation holds from the paraxial calculation.

$$S_k = \frac{1 - e\phi_1}{\phi} \qquad \text{[Equation 7]}$$

Here, if the principal-point interval e and the back focus Sk are determined, the power Φ1 and Φ2 are represented as the function of the power Φ of the entire system from Equations 6 and 7. That is to say, the track of change in power in the first group G1f and second group G2f according to change in power of the entire system can be represented. Accordingly, when assuming that the principal-point interval e=3, and the back focus Sk=15, the power Φ1 and Φ2 are as follows:

$$\phi_1 = -5\varphi + \frac{1}{3} \qquad \text{[Equation 8]}$$

$$\phi_2 = \frac{1}{45\varphi} - \frac{2}{5} \qquad \text{[Equation 9]}$$

Figure 3:
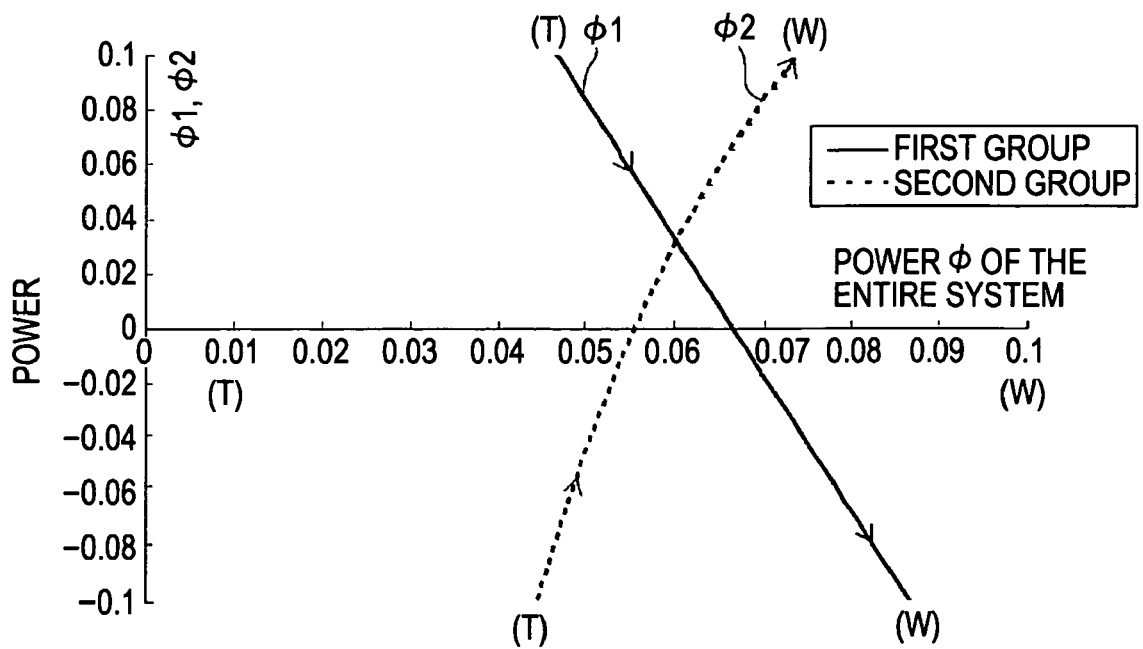
FIG. 3 is a plot of the power allocation of the lens designed based on the comparative example 1.

Upon the relationships of the power Φ1 and Φ2 as to the power Φ of the entire system being represented with a graph, the graph such as illustrated in FIG. 3 will be obtained. When viewing this, it can be understood that as the power Φ of the entire system increases, the power of the first group G1f changes to negative from positive, and inversely, the power of the second group G2f changes to positive from negative. Here, a rotational asymmetric curved surface is represented with Equation 10, and the relationships between the coefficient thereof "a" and the power results in Equation 11.

$$z = ay^3 + 3ax^2 y \qquad \text{[Equation 10]}$$

$$\Phi = 12a\delta(n-1) \qquad \text{[Equation 11]}$$

Here, x, y, and z are the above axes. δ is the amount of shift toward the Y-axis direction from the Z axis of the two rotational asymmetric optical elements E1f and E2f (E3f and E4f), and n is the refractive index of the lens. The coefficients a and n of the rotational asymmetric optical elements E1f through E4f are shown in Table 1, in which the amount of shift δ from the z axis is also shown in order of the telephoto end, middle zoom position, and wide-angle end. Also, Table 2 shows the surface-types of the respective surfaces S0 through S9f, and surface intervals.

In FIG. 4, the ray illuminated a reference plane S0 first illuminates the first group G1f. Let us say that the first group G1f is made up of the two optical elements (lenses) E1f and E2f, and the surface numbers are S1f through S4f in order. The optical elements E1f and E2f are decentered in the Y-axis direction, and the amount of decentering continuously varies. Also, the absolute value of the amount thereof is set so as to be equal with mutually positive/negative reverse. This causes the power Φ1 of the first group G1f to be changed from positive to negative at the time of zooming from the telephoto end to the wide-angle end (hereinafter, the zoom direction is the same) such as illustrated in FIG. 3. The ray emitted from the first group G1f next passes through the diaphragm S5f, and illuminates the second group G2f. Let us say that the second group G2f, as with the first group G1f, comprises two optical elements E3f and E4f, and the surface numbers thereof are S6f through S9f. The optical elements E3f and E4f are decentered in the Y-axis direction, and the amount of decentering continuously varies. Also, the absolute value of the amount thereof is set so as to be equal with mutually positive/negative reverse. This causes the power Φ2 of the second group G2f to be changed from negative to positive such as illustrated in FIG. 3.

The ray passed through these groups G1f and G2f forms an image without changing the image plane IP. However, when viewing the image plane, it can be understood that the image is formed, but an aberration greatly occurs. This occurs regardless of the paraxial allocations determined with Equations 8 and 9. For example, a coma aberration which occurs on the axis cannot be reduced with paraxial allocations alone anyway. As the above result, it can be understood that with the comparative example, an aberration cannot be completely corrected in the following points. This is caused by (a) an optical system having rotational asymmetric optical elements is asymmetric as to the optical axis, so shift is caused upon the upper line and underline, and consequently, a coma aberration occurs event on the marginal ray, and (b) curvature of field occurs.

Accordingly, with the examples of at least one exemplary embodiment, a zoom optical system capable of sufficiently eliminating an aberration is realized by moving the optical element (lens) in the direction different from the optical axis to perform zooming.

COMPARATIVE EXAMPLE 2

Next, a comparative example 2 of at least one exemplary embodiment will be described.

Generally, if eliminating a coma aberration on the marginal ray and increasing the power of a decentering movable block (also referred to as optical power which is the inverse number of a focal distance) can be achieved contemporaneously, a zoom optical system with high precision and a high zoom ratio can be achieved. However, generally, upon increasing the power of a decentering movable block, the tilt of each surface is also increased, and consequently, it becomes difficult to suppress on-axis coma aberration. Accordingly, with at least one exemplary embodiment, correction of power is performed by disposing a coaxial lens (coaxial optical element) within an optical path to suppress the power of the decentering movable block, thereby suppressing an on-axis coma aberration.

With the comparative example 2 of at least one exemplary embodiment, the optical element E7a-d of the fourth group G4a-d according to the examples 1 through 4 comprises one optical element made up of a rotational symmetric sphere, which is fixed at the time of zooming (not decentered in the optical-axis direction).

Next, description will be made regarding the optical capabilities of the comparative example 2 at this time.

FIG. 2 is a lens cross-sectional view at the middle zoom position of the comparative example 2. FIG. 5 is an optical-path diagram according to a comparative example 2 of at least one exemplary embodiment. With the comparative example 2, let us say that a CCD is employed as an imaging surface, and the size thereof is about ¼ inch (vertically 2.7 mm×horizontally 3.6 mm). Also, the incident pupil diameter is assumed to be about 0.8. The number of optical elements (lenses) are seven in total, in order from the object side to the image side, the optical elements E1g, E2g, E5g, and E6g have a rotational asymmetric shape, these optical elements are decentered in the Y-axis direction, and the amount of decentering thereof continuously varies. Also, the absolute value of the amount thereof is set so as to be equal with mutually positive/negative reverse. The optical elements E3g, E4g, and E7g have a rotational symmetric spherical shape, but in the event that an asymmetric aberration remains on the optical axis, optical elements having a rotational asymmetric shape can be disposed to reduce this. Also, the first group G1g comprises the optical elements E1g and E2g.

Similarly, the second group G2g comprises the optical elements E3g and E4g, and the third group G3g comprises the optical elements E5g and E6g. As for surface numbers, the reference plane serving as the origin of the absolute coordinates system is determined as a reference plane S0, the first surface of the optical element E1g is determined as S1g, and in order, the corresponding surfaces are S2g, S3g, S4g and so on, and following the surface S6g (backward of the optical element E3g) a diaphragm SP is disposed, which is determined as S7g. The first surface of the optical element E4g is determined as S8g, and the subsequent numbers are assigned in order, and the image plane IP is S16g. Hereinafter, let us say that the rotational asymmetric groups (group G1g and group G3g), which are continuously decentered in the Y-axis direction, and the rotational symmetric groups (group G2g and optical element E7g) are referred to as decentering movable blocks and auxiliary blocks. Disposing the decentering movable blocks G1g and G3g alone makes the power thereof too strong, and can make it difficult to perform correction of an aberration, and accordingly, the auxiliary blocks G2g and E7g are disposed.

Figure 6:
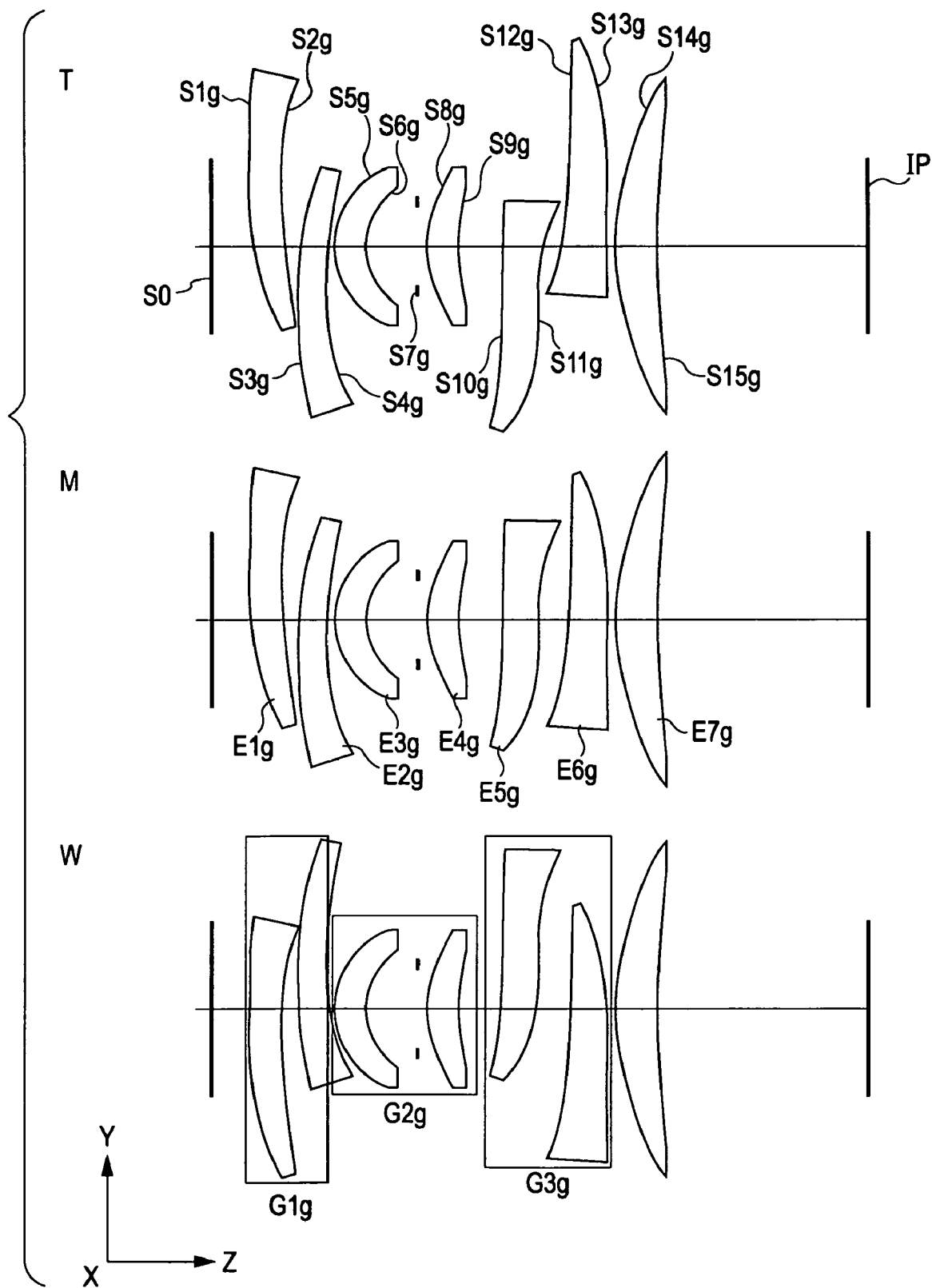
FIG. 6 is a lens cross-sectional view of the telephoto end, middle, and wide-angle end according to the comparative example 2.

The lens data of the comparative example 2 is shown in Table 3. The amount of shift from the Z axis (optical axis) of the respective optical elements (lenses) is such as shown in Table 4, and the values of the respective coefficients of the polynomial surfaces represented with Equation 1 is shown in Table 5. The optical-path diagram at this time is shown in FIG. 6 in order of the telephoto end, middle, and wide-angle end. The optical elements E1g and E2g are decentered in the Y-axis direction, and the absolute value of the amount thereof is so as to be equal with mutually positive/negative reverse, as shown in Table 4. This causes the power of the first group G1g to be changed from positive to negative. The ray emitted from the first group G1g passes through the optical element E3g, diaphragm S7g, and optical element E4g, and illuminates the optical elements E5g and E6g. The optical elements E5g and E6g are decentered in the Y-axis direction, and the absolute value of the amount thereof is so as to be equal with mutually positive/negative reverse, as shown in Table 4. This causes the power of the G3g to be changed from negative to positive. The ray passed through these decentering movable blocks G1g and G3g illuminates the next auxiliary block E7g. The auxiliary block E7g compensates the power necessary for the decentering movable blocks G1g and G3g. The ray passed through these optical elements forms an image without changing the image plane at the time of zooming.

Figure 7A:
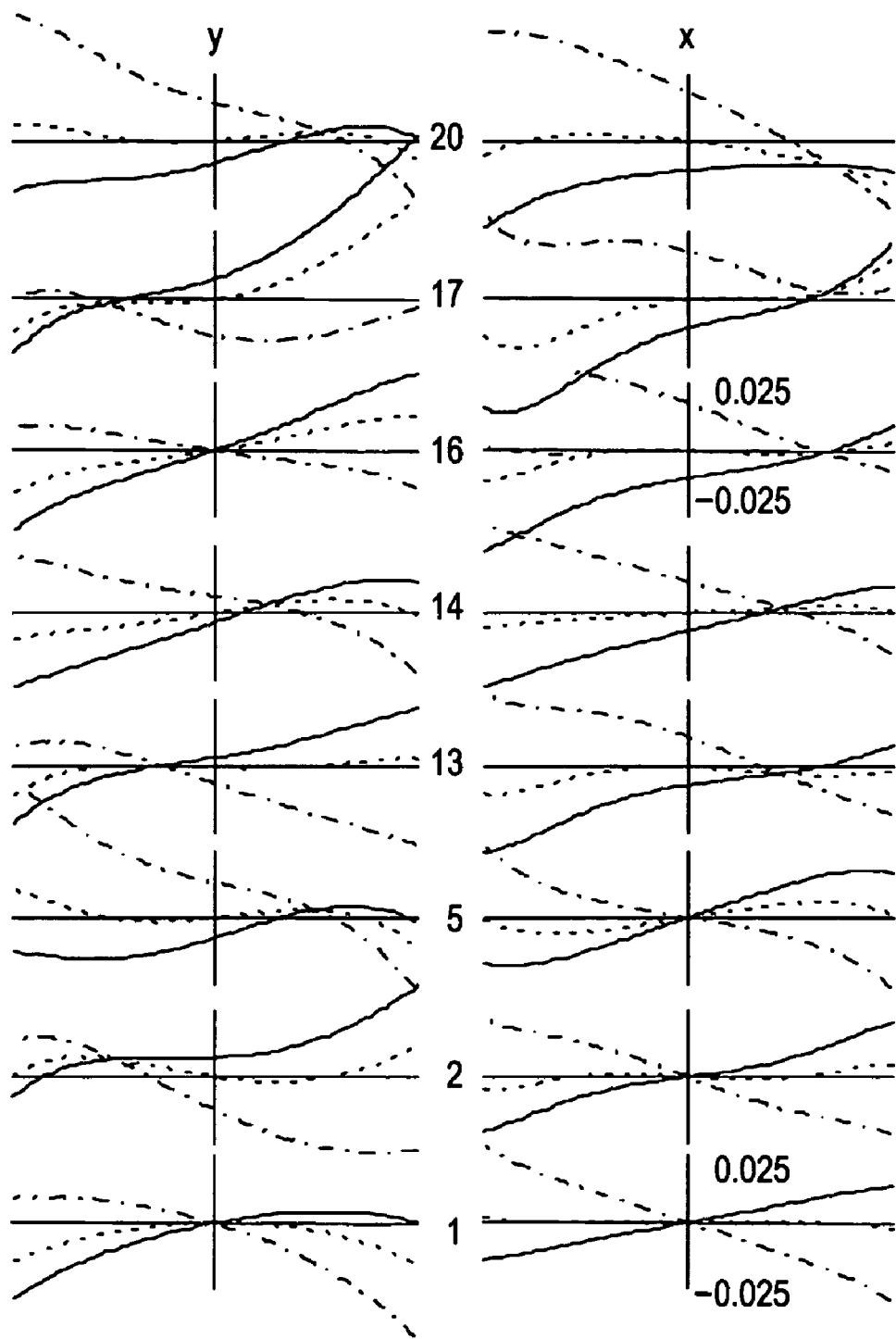
FIG. 7A is an aberration chart according to the comparative example 2.
Figure 7B:
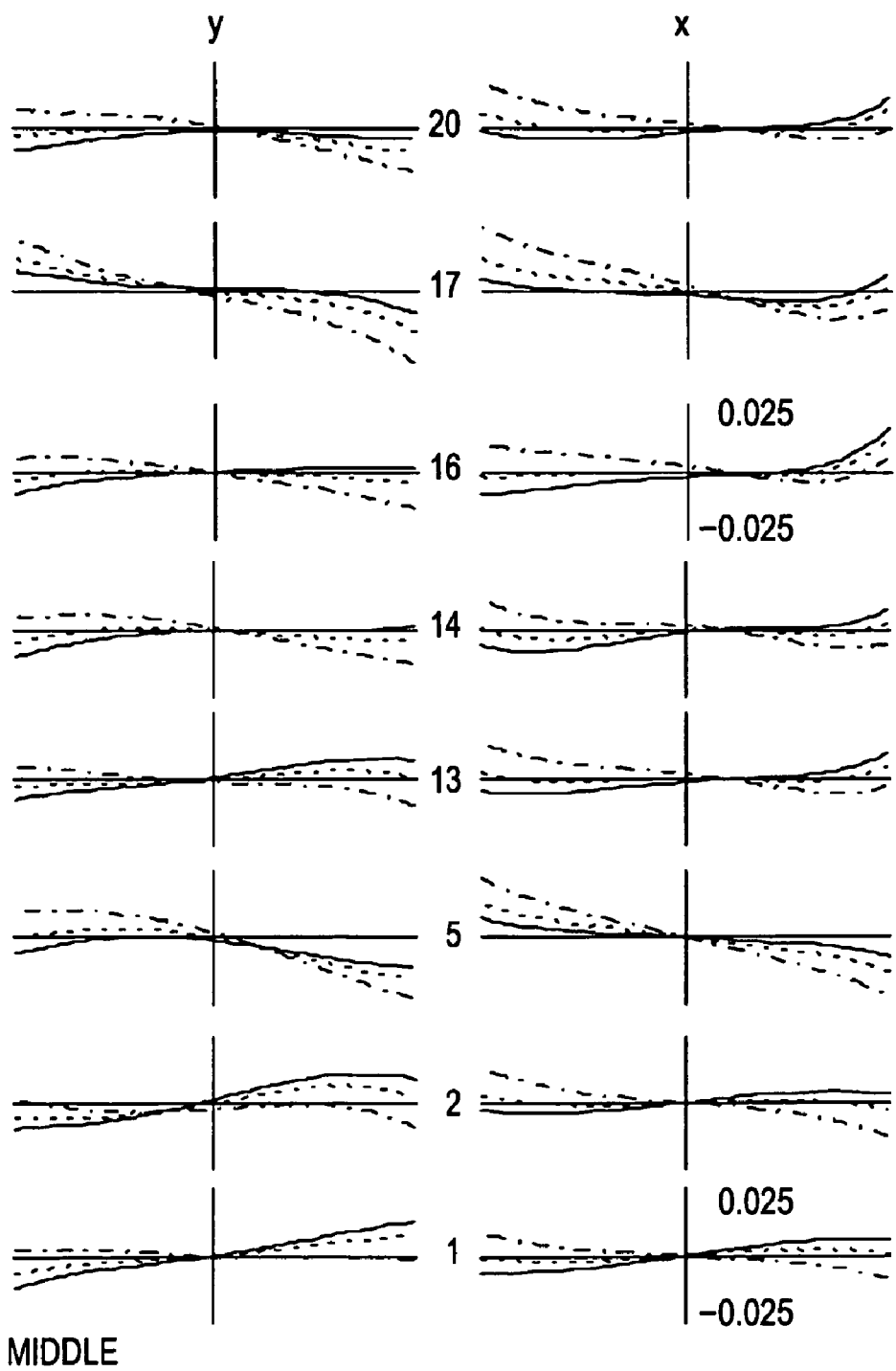
FIG. 7B is an aberration chart according to the comparative example 2.
Figure 7C:
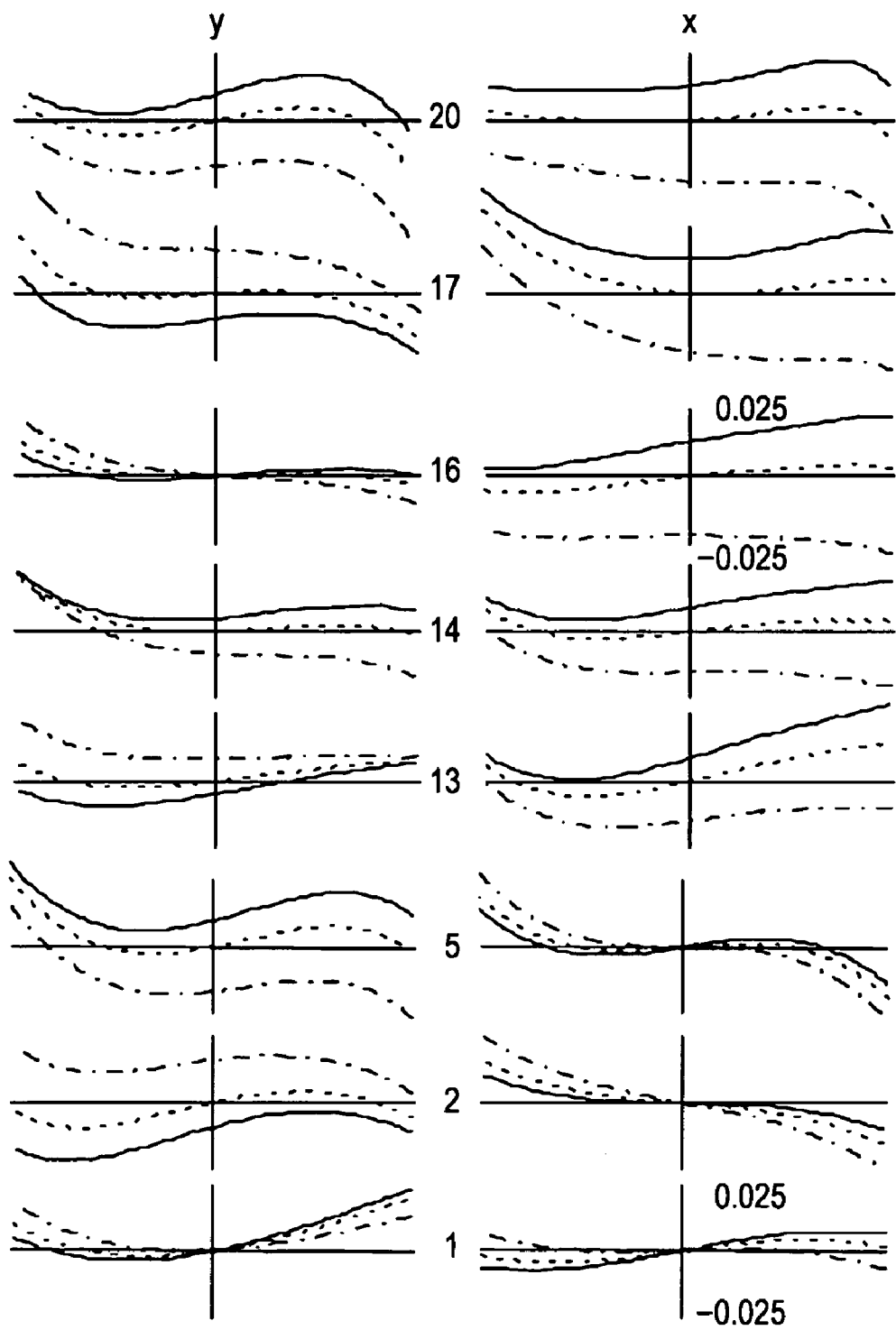
FIG. 7C is an aberration chart according to the comparative example 2.
Figure 9:
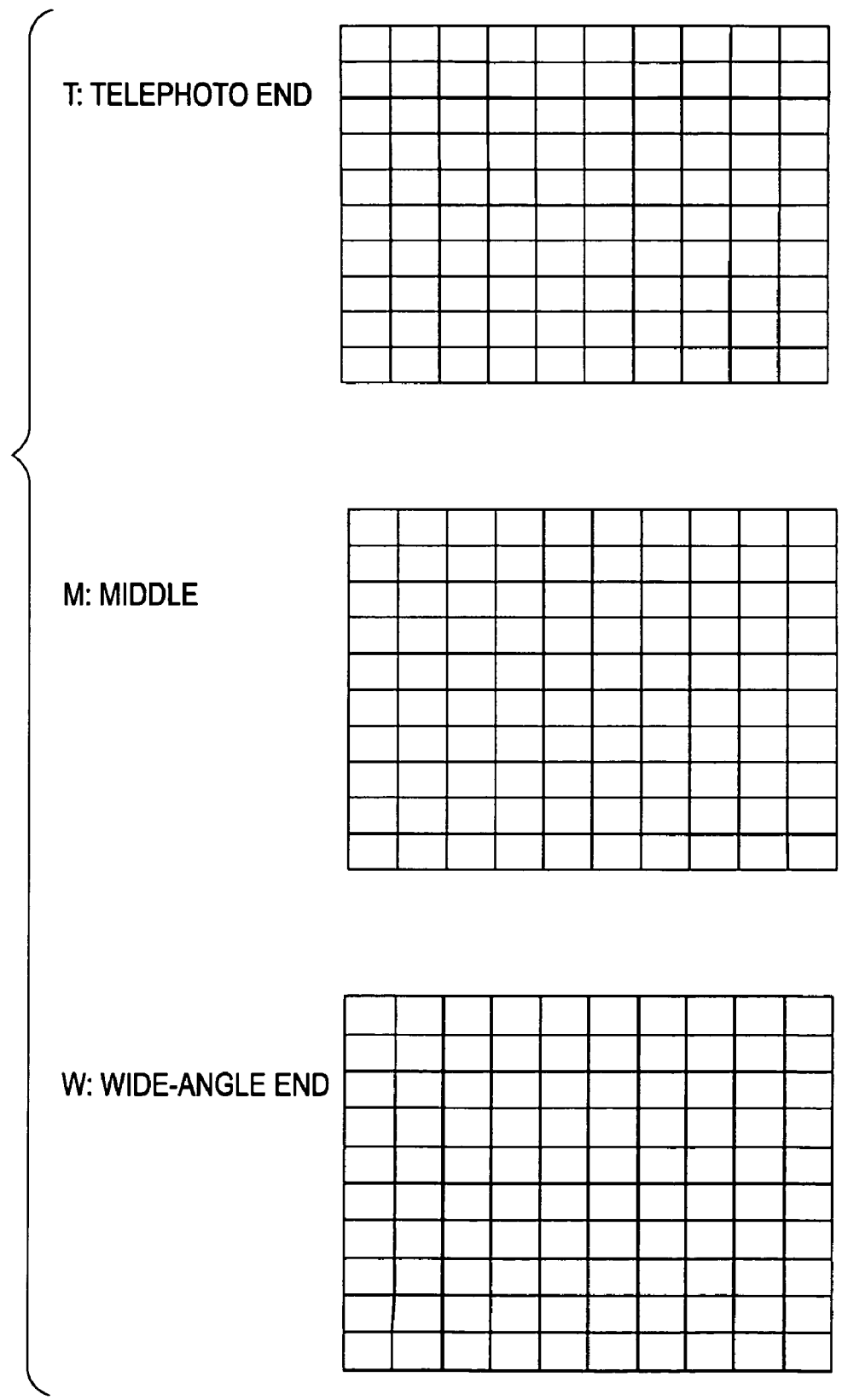
FIG. 9 is a diagram showing the distortion reactor lattices at the telephoto end, middle, and wide-angle end according to the comparative example 2.

Next, the aberration charts at the telephoto end, middle zoom position, and wide-angle end are shown in FIG. 7A through FIG. 7C, respectively. The horizontal axis represents the position of a ray on the pupil, and the vertical axis represents the shift from the chief ray on the image plane. The range of the vertical axis is about ±20 μm. The numbers within FIG. 7A through FIG. 7C are angle-of-view numbers, which on the image plane are such as illustrated in FIG. 8. The shapes of the optical elements are symmetric as to the X-axis direction, so only the positive case should be taken into consideration regarding the X direction. When viewing the ray at an angle of view of 0°, it can be understood that a coma aberration can be reduced from the telephoto end to the wide-angle end. Also, FIG. 9 illustrates the distortion reactor lattices at a telephoto end T, middle zoom position M, and wide-angle end W. The lengthwise and crosswise size of the lattices is about ¼ inch (vertically 2.7 mm×horizontally 3.6 mm). When viewing this figure, it can be understood that distortion can be suppressed, but when viewing the ray at an angle of view of 0°, it can be understood that some amount of a coma aberration can remain.

This is because when moving the decentering movable blocks G1g and G3g, the angle as to the ray of the surface varies as the optical power of the entire system varies, so the aberration has not been completely corrected. Accordingly, in order to reduce this, at least one exemplary embodiment is directed to another correction block for correcting and/or reducing angle of a marginal ray to be changed along with the movement of the decentering movable blocks G1g and G3g.

That is to say, with at least one exemplary embodiment, a zoom optical system comprising multiple optical groups G1g and G3g made up of multiple optical elements each having a rotationally asymmetrical surface, and changing optical power by the optical elements E1g and E2g (E5g and E6g) within the respective groups G1g (G3g) of the multiple optical groups moving mutually in the direction different from the optical axis, which provides at least one optical element (auxiliary movable block) E7g having symmetry as to at least one surface for decentering to reduce the residual aberration of the zoom optical system. Further, the auxiliary movable block E7g is disposed to reduce the residual aberration, so the power and the amount of decentering are less than those in the decentering movable blocks G1g and G3g. Accordingly, the auxiliary movable block E7g has no change in positive/negative refracting power, and further, is arranged so as to satisfy the following conditions when assuming that the maximum value of the absolute value of the optical power in the decentering movable blocks G1g and G3g is $|\Phi d|max$, and the maximum value of the absolute value of the optical power in the auxiliary movable block is $|\Phi s|max$.

$|\Phi s|max < |\Phi d|max$ [Equation 12]

Further, when assuming that the absolute value of the value obtained by subtracting the minimum value from the maximum value of the power of the decentering auxiliary block straddle the entire zoom area is $\Delta|\Phi s|$, the following range can be satisfied.

$\Delta|\Phi s| < 0.2$

Or in at least one exemplary embodiment, $\Delta|\Phi s| < 0.1$

Upon exceeding this range, the asymmetric aberration, i.e., the features of the decentering auxiliary block are reduced, and this block results in being classified as a decentering movable block.

Also, when assuming that the absolute value of the value obtained by subtracting the minimum value from the maximum value of the power in the auxiliary movable block straddle the entire zoom area is $\Delta|\Phi d|$, the following range can be satisfied.

$\Delta|\Phi d| < 0.2$

Or in at least one exemplary embodiment, $\Delta|\Phi d| < 0.5$

Upon exceeding this range, the asymmetric aberration, i.e., the features of the decentering movable block are reduced, and this block results in being classified as a decentering auxiliary block.

Further, when assuming that $\Delta|\Phi d|$ is compared with the G1g and G3g, and the smaller one is taken as $\Delta|\Phi d|min$, the following range can be satisfied.

$\Delta|\Phi d|min/\Delta|\Phi d| > 6$ or in at least one exemplary embodiment, $\Delta|\Phi d|min/\Delta|\Phi d| > 25$ This is caused by the same reason as the above. Also, in the event of the auxiliary movable block E7g performing aid with shift, when assuming that the maximum value of the absolute value of the amount of shift (amount of movement) thereof is $|Ds|max$, and the maximum value of the absolute value of the amount of shift of the decentering movable block is $|Dd|max$, the following condition can be satisfied.

$|Ds|max < |Dd|max$ [Equation 13]

Further, it has been known that if the Petzval is great, the curvature of field also becomes great, and if the Petzval is small, the curvature of field also becomes small. Accordingly, at least one exemplary embodiment suppresses the curvature of field to small by reducing the Petzval. When the power at lenses Ei (i=1 through n) is $\Phi Ei$, and the refractive index of a material is nEi, the Petzval is obtained with the following equation.

$PEi = \Phi Ei/nEi$ [Equation 14]

With a normal zoom optical system using a coaxial optical element, this value can be constant. However, with an optical system such as in at least one exemplary embodiment where an optical element is continuously decentered, and power varies, this value is not constant. Also, the refractive index of a nitrifying material is around 1.45 through 1.9, so change thereof is small, and accordingly, change in the Petzval can be referred to change in power. Accordingly, in order to suppress this Petzval, when assuming that the maximum value of the absolute value of the power in the first group G1g and the third group G3g is $|\Phi|max$, and the power in total of the first group G1g and the third group G3g is $\Phi 13$, the range of change in power is determined so as to satisfy the following equation.

$-|\Phi|max \leq \Phi 13 \leq |\Phi|max$ [Equation 15]

Next, description will be made from the perspective of a principal-point position.

In order to perform zooming while maintaining compactness, it can be necessary in some circumstances to move a principal-point position greatly from a certain position of each group. With the conventional optical system in which a tertiary curve is simply given to a single surface, a principal-point position exists only upon the surface with the tertiary coefficient thereof, and does not fluctuate greatly. As for a method for fluctuating a principal-point position greatly, for example, an arrangement can be made where curvature is given to a single surface, and the shape of a rotational asymmetric lens is changed into a meniscus shape. The lens which can have a meniscus shape, which is different from a positive lens and a negative lens, is a lens capable of disposing a principal point outside of the lens, and employing this shape for the rotational asymmetric lens enables a principal point to be greatly fluctuated outside of the group. However, when making the rotational asymmetric lens into a meniscus shape, shifting occurs upon the upper line and underline of the marginal ray at the telephoto end or the wide-angle end (when the ray passes through the end of the lens). Accordingly, it is useful for another lens to correct this. With a method for solving this, the lens for correction is changed into a meniscus shape having a reverse tilt to cancel out the shift of the upper line and underline. A coefficient is determined by focusing attention on this at the time of introducing a higher order coefficient than a tertiary coefficient. Also, a meniscus shape can be shaped in the direction for reducing the mutual distance. This is because reducing the distance between the lenses enables a on-axis coma aberration to be reduced while suppressing this to the minimum upon each surface. Thus, on-axis coma aberration can be reduced.

With the comparative example 2, elimination of a on-axis coma aberration is performed by obtaining Equations 6 through 9, and obtaining change in power of each group as to the focal distance as illustrated in FIG. 3. Upon increasing the power of each group, an aberration occurs, so in order to increase a variable power ratio without increasing the power of each group, it can be necessary in some circumstances to reduce the tilt of change in power of each group as to the power of the entire system shown in FIG. 3. Thus, the range of change in power of the entire system can be expanded while maintaining the range of change in power of each group in a steady manner. Here, in order to realize the above, paraxial allocations for performing thin-thickness approximation will be reconsidered. The following equations can be derived from Equations 6 and 7 with the back focus Sk and the principal-point interval e serving as variables. However, the respective paraxial values of the focal distance, forward principal-point position, and backward principal-point position can be defined as values derived from Optics Vol. 29, No. 3 (2000). Deriving these values is performed by calculating 4×4 determinants based on the curvature of each surface and each surface interval.

$$\phi_1 = \frac{-S_k}{e}\phi + \frac{1}{e}$$
$$\phi_2 = \frac{-1}{eS_k}\frac{1}{\phi} + \frac{e+S_k}{eS_k}$$
[Equations 16 and 17]

It can be understood from the above equations that the tilts of the two can be determined by the principal-point interval e and the back focus Sk. Consequently, the following equations are derived by differentiating the two with the power Φ.

$$\frac{d\phi_1}{d\phi} = \frac{-S_k}{e}$$
$$\frac{d\phi_2}{d\phi} = \frac{1}{eS_k\phi^2}$$
[Equations 18 and 19]

The power Φ1 varies in a linear curve, so the tilt thereof is constant. On the other hand, the tilt of the power Φ1 varies depending on the power Φ of the entire system. Also, if the principal-point interval e increases, the tilts of the power Φ1 and Φ2 decrease to realize large magnification, but if the back focus Sk increases, the power Φ1 increases, on the other hand the power Φ2 decreases, and consequently, the direction of change in the back focus Sk as to large magnification cannot be determined.

Here, the tilts of the power Φ1 and Φ2 as to change in the power Φ of the entire system are compared. At a point of $$\phi = \frac{1}{e+S_k}$$
[Equation 20]

in which Φ2=0 holds, $$\left|\frac{d\phi_1}{d\phi}\right| = \left|\frac{d\phi_2}{d\phi}\right| = \frac{(e+S_k)^2}{eS_k}$$
[Equation 21]

holds, in the range of $$\phi < \frac{1}{e+S_k}$$
[Equation 22]

$$\left|\frac{d\phi_1}{d\phi}\right| < \left|\frac{d\phi_2}{d\phi}\right|$$
[Equation 23]

holds, in the range of $$\phi > \frac{1}{e+S_k}$$
[Equation 24]

$$\left|\frac{d\phi_1}{d\phi}\right| > \left|\frac{d\phi_2}{d\phi}\right|$$
[Equation 25]

holds.

A table in which these were compared is shown in Table 6. It can be understood from this table that in a wide range $$\left|\frac{d\phi_1}{d\phi}\right| < \left|\frac{d\phi_2}{d\phi}\right|$$
[Equation 26]

holds. Accordingly, large magnification can be achieved if the tilt of the power Φ2 of which tilt is great in a wide range can be reduced. Accordingly, it can be understood that upon increasing both the principal-point interval e and the back focus Sk, the tilt can be reduced when focusing attention on the tilt of the power Φ2 within Equation 20.

$$\frac{d\phi_2}{d\phi}$$
[Equation 27]

Also, the distance (the entire length in thin-thickness approximation) from the principal-point position of the first group which is the sum of the principal-point interval e and the back focus Sk is constant, the tilt of the power Φ12 at the time of e=Sk becomes minimal. Thus, the zoom ratio becomes maximal.

With at least one exemplary embodiment, the above principal-point interval e is substituted with the distance between the H1' and H2 as thickness increases from approximation at thin thickness, and thin principal-point interval e is shifted. At least one exemplary embodiment takes this point into consideration, and makes the following arrangement.

$$0.7 < \frac{e}{e'} < 1.4$$
[Equation 28]

However, when assuming that the distance between the object point and the H1 is $e_o$, the distance between the H1' and H2 is e, and the distance between the H2' and the image point is $e_i$, e' is a smaller distance between the $e_o$ and $e_i$. Also, if the back focus Sk is constant, and a principal point can be moved, the tilts of the power Φ1 and Φ2 can be reduced to realize large magnification by increasing the principal-point interval e. Accordingly, employing an optical element where a principal-point interval is increased by the shape of the surface of an optical element making up a group as a rotational asymmetric lens enables the principal-point interval to be increased while keeping the surface interval as is, and further, enables large magnification to be achieved.

If a curved surface with a single surface alone such as described with Equation 10 as described above is employed, both forward and backward principal-points simply move upon the same surface. Simply employing this optical element cannot move a principal-point position greatly. Accordingly, the zoom ratio cannot be increased as well. If a principal-point interval can be increased by moving this principal point forward or backward of the optical element, large magnification can be achieved without increasing the surface interval. Here, consideration is made regarding the principal-point positions of three lenses of a positive lens of which both lens surfaces have a convex shape (biconvex lens) as a coaxial lens, a negative lens of which both lens surfaces have a concave shape (biconcave lens), and a meniscus-shaped lens. The biconvex lens and the biconcave lens both have a principal point within the lens, so it cannot be expected to move a principal point outside of the lens greatly. On the other hand, the meniscus-shaped lens, which is different from the biconvex lens and the biconcave lens, is a lens of which a principal point can be moved outside of the lens. Accordingly, employing this shape even for a rotational asymmetric lens enables a principal point to be moved outside of the lens greatly. If this is employed for a rotational asymmetric lens such as the zoom optical system according to at least one exemplary embodiment, a principal-point interval can be increased to expect large magnification.

If a principal-point interval is set small on the telephoto side, and is set large on the wide-angle side, further large magnification can be realized. It can be understood from Equation 6. When assuming that the power of the entire system on the wide-angle side is $\Phi_w$, the power of the first group and the second group at that time are $\Phi_{1w}$ and $\Phi_{2w}$ respectively, and the principal-point interval thereof is $e_w$, and similarly, the power of the entire system on the telephoto side is $\Phi_t$, the power of the first group and the second group are $\Phi_{1t}$ and $\Phi_{2t}$ respectively, and the principal-point interval thereof is $e_t$, Equation 6 is modified as follows.

$$\Phi_w = \Phi_{1w} + \Phi_{2w} - e_w \Phi_{1w} \Phi_{2w} \quad \text{[Equation 29]}$$

$$\Phi_t = \Phi_{1t} + \Phi_{2t} - e_t \Phi_{1t} \Phi_{2t} \text{ (however, } \Phi_w > \Phi_t) \quad \text{[Equation 30]}$$

Here, the power $\Phi_1$ and power $\Phi_2$ have a different sign, so when assuming that $$\Phi_{1w} + \Phi_{2w} > 0, \Phi_{1t} + \Phi_{2t} > 0, \text{ and} \quad \text{[Equation 31]}$$

$$e_w > e_t, \quad \text{[Equation 32]}$$

it can be understood that the difference between the power $\Phi_w$ and power $\Phi_t$ becomes great, and large magnification is realized.

EXAMPLE 6

Figure 38:
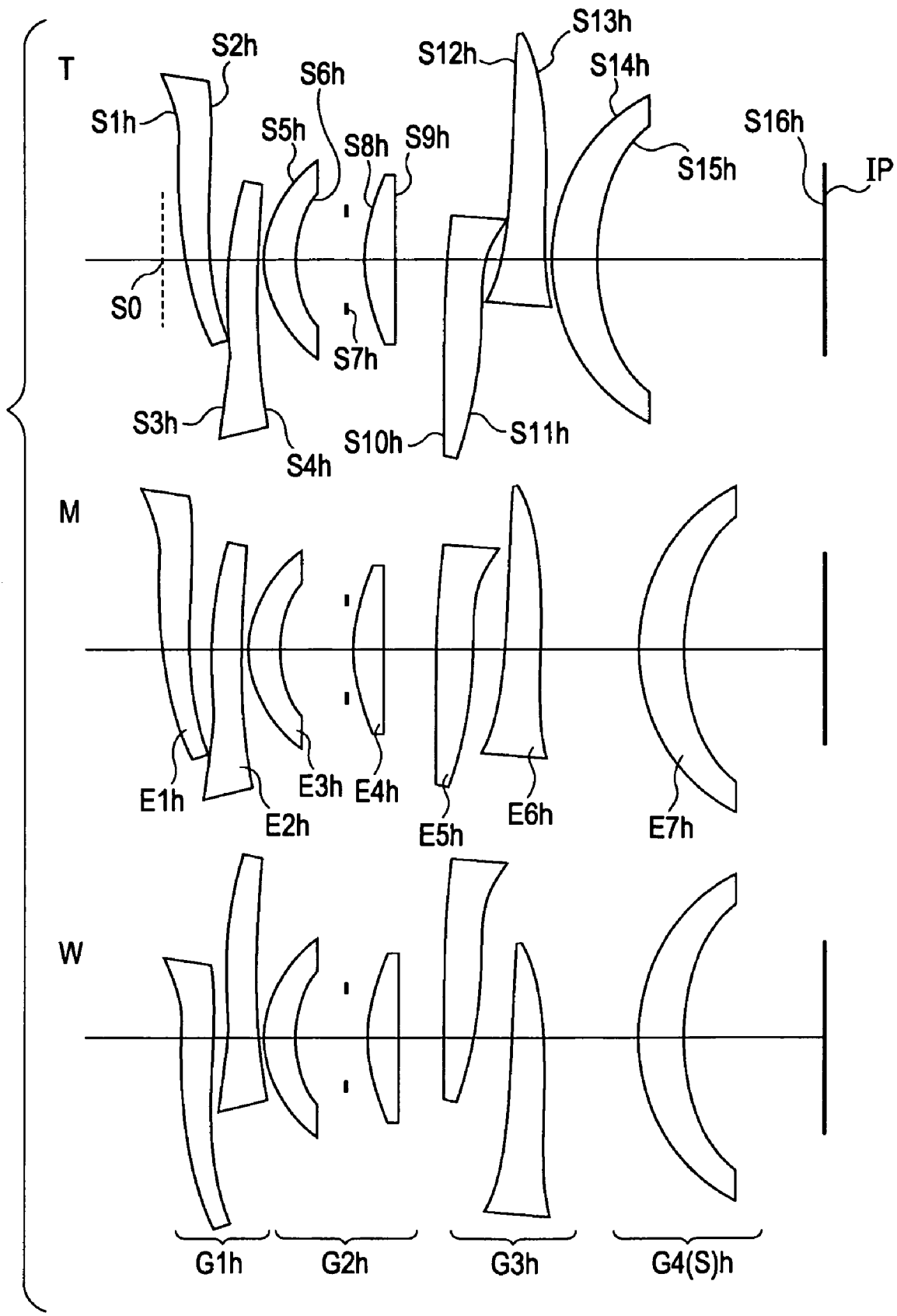
FIG. 38 is a lens cross-sectional view according to an example 6 of at least one exemplary embodiment.

FIG. 38 is a lens cross-sectional view according to an example 6 of at least one exemplary embodiment.

In FIG. 38, T, M, and W are lens cross-sectional views at the telephoto end (the zoom position where the power of the entire system is the minimum), at a middle zoom position, and at the wide-angle end (the zoom position where the power of the entire system is the maximum), respectively.

Figure 39:
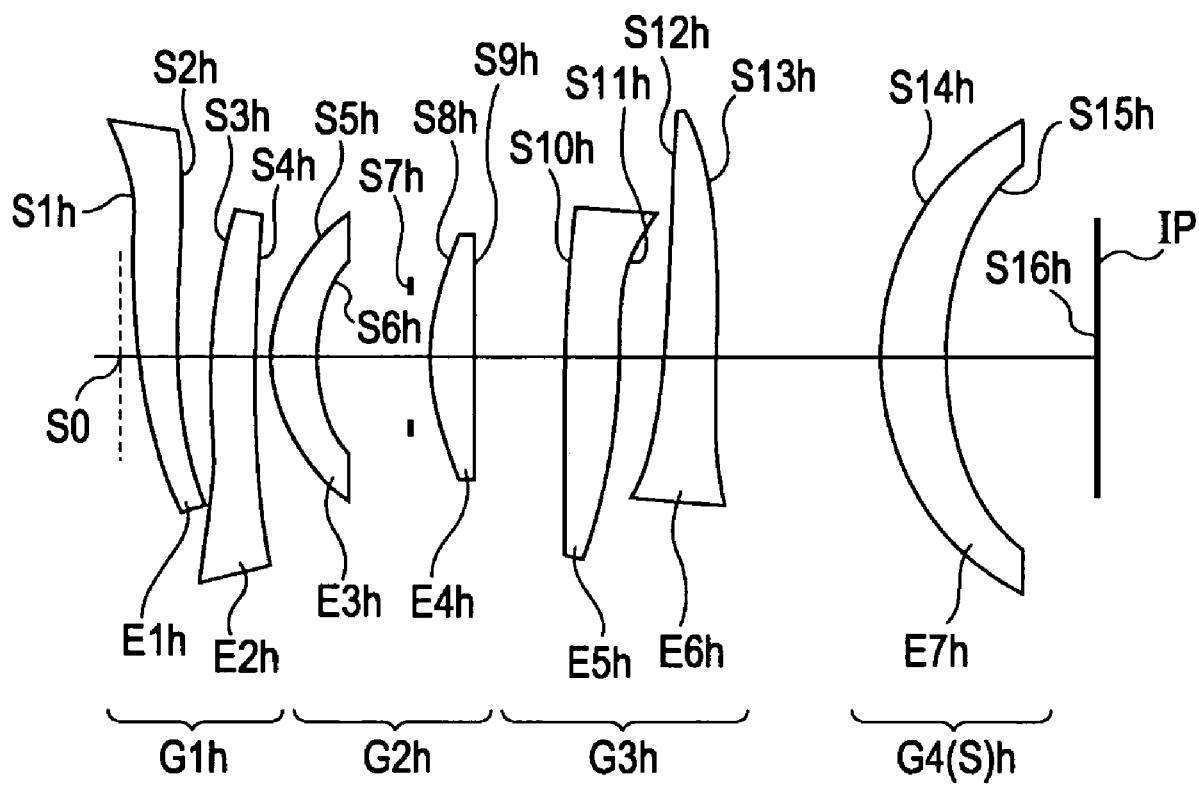
FIG. 39 is a lens cross-sectional view according to the example 6 of at least one exemplary embodiment.

FIG. 39 is a lens cross-sectional view for selecting the middle zoom position of the example 6 in FIG. 38 (M in FIG. 38) as an example and for describing respective factors.

A zoom optical system according to the example 6 is a photography lens system employed for an imaging apparatus, and the left hand is the object side, and the right hand is the image side in the lens cross-sectional view.

Note that the zoom optical system according to the example 6 can be employed as a projector, and in this case, the left hand is a screen, and the right hand is a projection surface.

In FIG. 38 and FIG. 39, G1h and G3h are optical groups of which optical power is variable. G2h is an optical group in which optical power is substantially unchangeable.

G4h is an optical group S having symmetry as to at least one surface, and including one or more optical elements Ls capable of moving in the optical-axis direction.

Zooming is performed while maintaining the image plane IP in a steady manner by changing the power in the two optical groups G1h and G3h each of which optical power is variable.

The two optical groups G1h and G3h each of which optical power is variable each include a rotationally asymmetrical surface, move in the direction different from the optical axis, and include two optical elements E1h and E2h which change the power within the optical group G1h, and two optical elements E5h and E6h which change the power within the optical group G3h, respectively.

Note that the term "optical power" refers to the power of a surface positioned on the optical axis, and when the surface on the optical axis varies by the optical element having a rotationally asymmetrical surface being decentered, optical power is also changed in response to that change.

With the example 6 of at least one exemplary embodiment, seven optical elements (lenses) are employed in total. In order from the object side, the optical elements E1h, E2h, E5h, and E6h have a rotational asymmetric shape, these optical elements are decentered in the Y-axis direction, and the amount of decentering continuously varies. Also, the absolute value of the amount thereof is set so as to be equal with mutually positive/negative reverse. The optical elements E3h and E4h have a rotational symmetric spherical surface. In the event that an asymmetric aberration remains on the optical axis, the optical elements E3h and E4h can have a rotational asymmetric shape to reduce this. An optical element E7h has a rotational asymmetric shape which has symmetry as to at least one surface (one surface is taken as a center of symmetry). In other words, the optical element E7h can have a rotational asymmetric shape symmetric as to multiple surfaces (e.g., toric surfaces), but in at least one exemplary embodiment, which is an optical element which can have a rotational asymmetric shaped surface symmetric as to only one surface (only one surface serving as a symmetric center exists). The same is true of E1h, E2h, E3h, E4h, E5h, and E6h. This is substantially similar in the following respective examples.

This reduces the on-axis coma aberration which may not have been completely reduced in the optical elements E1h through E6h by moving the on-axis coma aberration on the optical axis. Also, the first group G1h comprises the optical elements E1h and E2h.

Similarly, the second group G2h comprises the optical elements E3h and E4h, and the third group G3h comprises the optical elements E5h and E6h. The fourth group G4h comprises the optical element E7h. As for surface numbers, the reference plane serving as the origin of the absolute coordinates system is determined as a surface S0, the first surface of the optical element E1h is determined as S1h, and in order, the corresponding surfaces are surfaces S2h, S3h, S4h, and so on, and following the surface S6h (backward of the optical element E3h) a diaphragm S7h (SP) is disposed.

The first surface of the optical element E4h is determined as S8h, and the subsequent numbers are assigned in order, and the image plane IP is S16h. Hereinafter, decentering continues in the Y-axis direction, and let us say that the rotational asymmetric groups (G1h and G3h), which contribute to change in power, the rotational symmetric group (G2h), and the fourth group G4h made up of the optical element (E7h) configured to suppress the above residual aberration by decentering are referred to as decentering movable blocks G1h and G3h, auxiliary block G2h, and auxiliary movable block G4h, respectively. Disposing the decentering movable blocks G1h and G3h alone makes the power thereof too strong, and can make it difficult to perform correction of aberrations, and accordingly, the auxiliary block G2h is disposed.

The lens data of the example 6 is shown in Table 7. The amount of shift from the Z axis of the respective optical elements is shown in Table 8.

The amount of movement in the optical-axis direction accompanied with zooming of the optical element E7h is shown in Table 9. In Table 9, change in intervals before and after the optical element E7h is shown with S13h and S14h.

The values of the respective coefficients of the polynomial surfaces represented with Equation 1 are shown in Table 10. FIG. 38 is a lens cross-sectional view at the telephoto end (T), middle zoom position (M), and wide-angle end (W) shown in Table 8. The optical elements E1h and E2h are decentered in the Y-axis direction, and the absolute value of the amount thereof is so as to be equal with mutually positive/negative reverse, as shown in Table 8. Thus, the power of the first group G1h is changed from positive to negative between the telephoto end and the wide-angle end. The ray emitted from the first group G1h passes through the optical element E3h, diaphragm SP, and optical element E4h, and illuminates the optical elements E5h and E6h. The optical elements E5h and E6h are decentered in the Y-axis direction, and the absolute value of the amount thereof is so as to be equal with mutually positive/negative reverse, as shown in Table 8. Thus, the power of the third group G3h is changed from negative to positive between the telephoto end and the wide-angle end. The ray passed through these decentering movable blocks G1h and G3h illuminates the next auxiliary movable block G4h. The auxiliary movable block G4h compensates the power necessary for the decentering movable blocks G1h and G3h. The ray passed through these optical elements forms an image without changing the image plane IP.

With the present example, one or more optical elements capable of moving in the optical-axis direction at the time of zooming include an optical element having positive refracting power.

With the present example, when assuming that the amount of movement in the entire zoom range of one optical element (the optical element E7h having positive refracting power in the example 6) of one or more optical elements capable of moving in the optical-axis direction at the time of zooming is d, and the entire length of the entire system is T, the following condition $$d/T<0.6$$

can be satisfied.

Thus, an aberration fluctuation caused by zooming is appropriately corrected while restricting the entire length from being enlarged.

The entire length (the distance between the first surface and the image plane) T of the example 6 is 10 mm, and the movement amount d of the optical element (auxiliary movable block) E7 is 1.34475 mm, and consequently, $$d/T=1.3$$

is obtained.

Figure 40A:
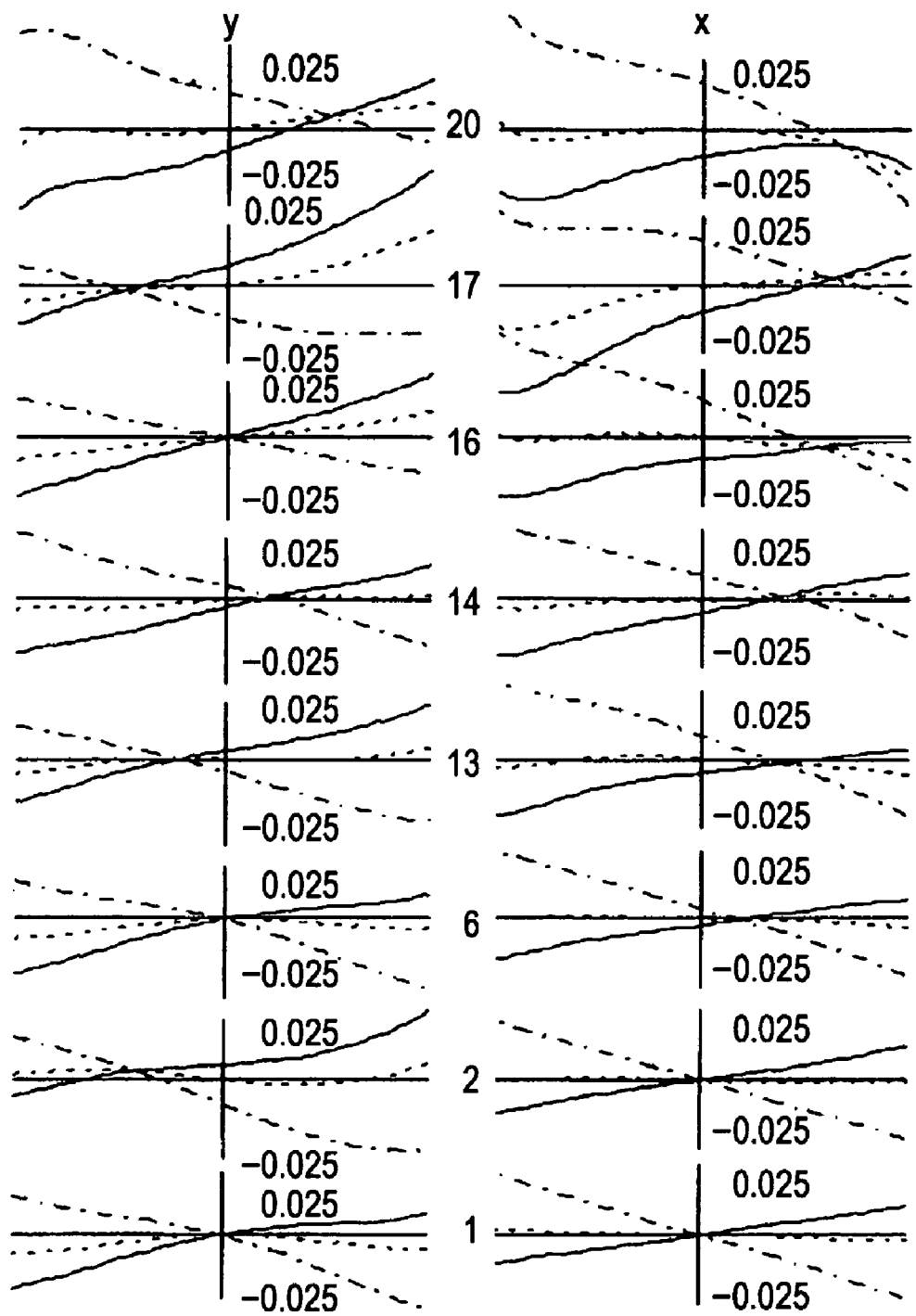
FIG. 40A is an aberration chart of the example 6 of at least one exemplary embodiment.
Figure 40B:
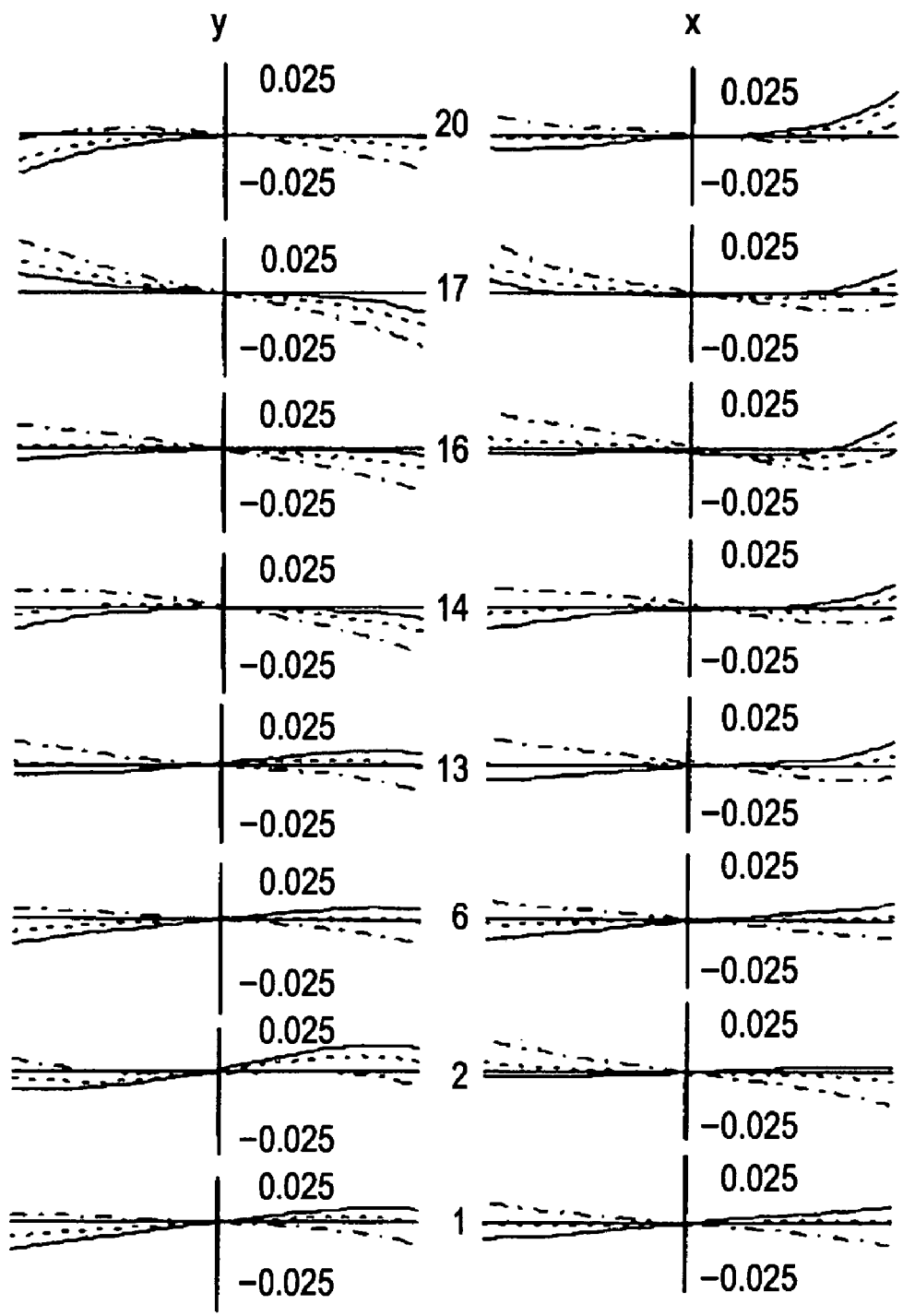
FIG. 40B is an aberration chart of the example 6 of at least one exemplary embodiment.
Figure 40C:
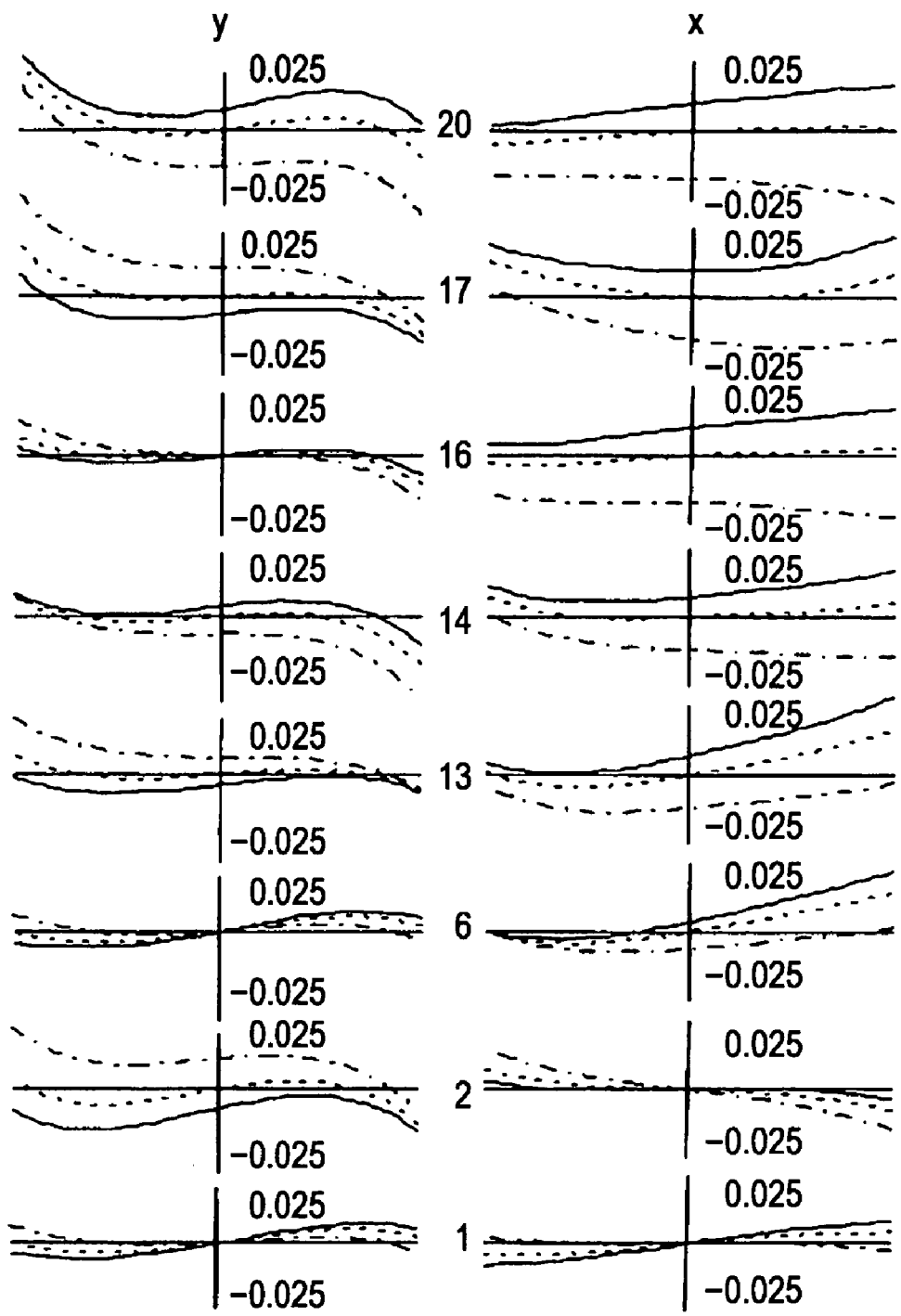
FIG. 40C is an aberration chart of the example 6 of at least one exemplary embodiment.

Next, the aberration charts at the telephoto end, middle zoom position, and wide-angle end are shown in FIG. 40A through FIG. 40C, respectively. The horizontal axis represents the position of a ray on the pupil, and the vertical axis represents the shift from the chief ray on the image plane. The range of the vertical axis is about ±20 μm. The numbers within FIG. 40A through FIG. 40C are angle-of-view numbers, which on the image plane are such as illustrated in FIG. 8. The shapes of the optical elements are symmetric as to the X axis, so only the positive case should be taken into consideration regarding the X direction. When viewing the ray at an angle of view of 0°, it can be understood that a coma aberration can be reduced from the telephoto end to the wide-angle end.

Figure 41:
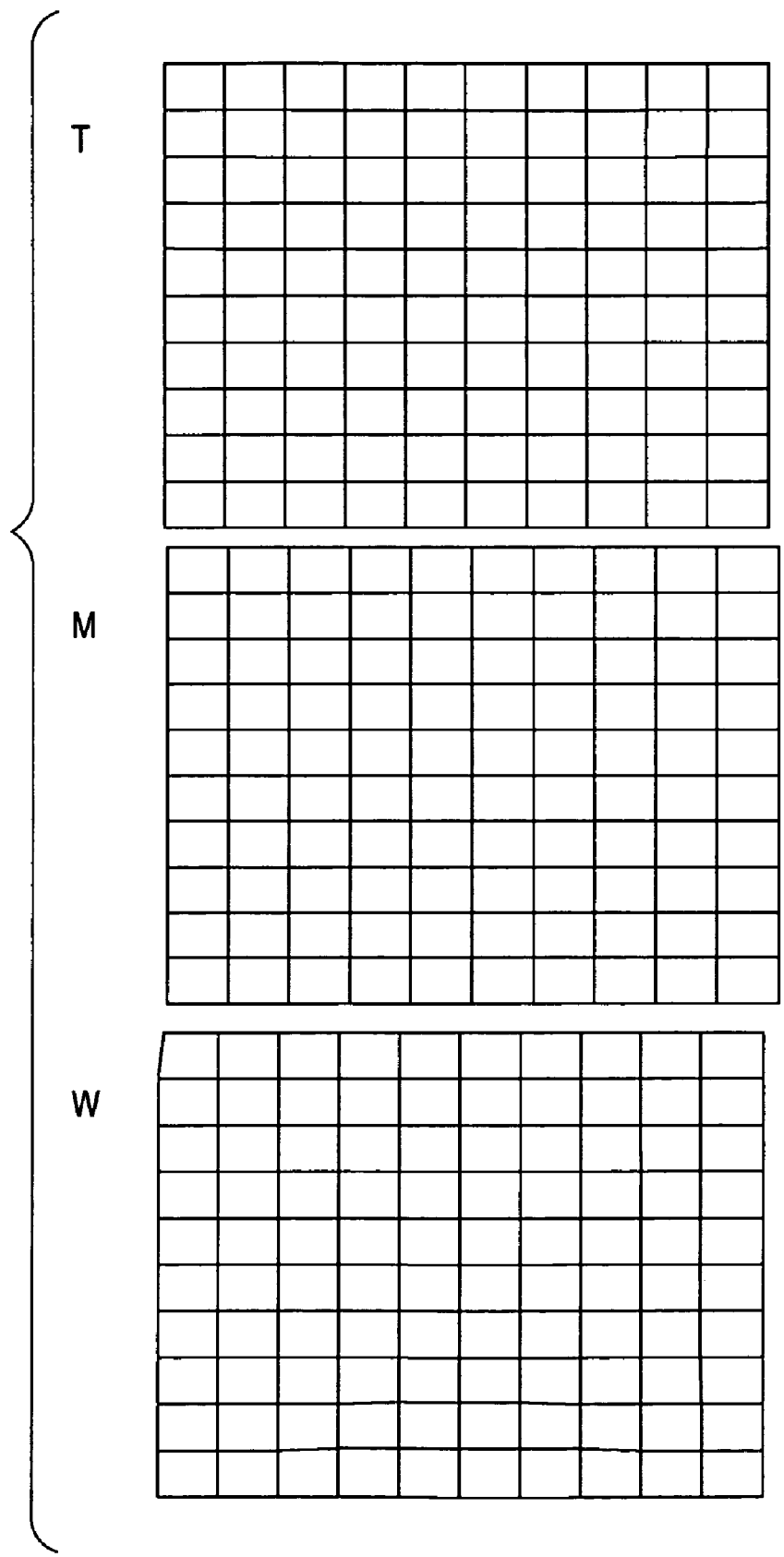
FIG. 41 is a diagram showing the distortion reactor lattices at the telephoto end, middle, and wide-angle end according to the example 6 of at least one exemplary embodiment.

Also, FIG. 41 illustrates the distortion reactor lattices at a telephoto end T, middle zoom position M, and wide-angle end W. The lengthwise and crosswise size of the lattices is about ¼ inch (vertically 2.7 mm×horizontally 3.6 mm). When viewing this figure, it can be understood that distortion can be suppressed, but when viewing the ray at an angle of view of 0°, it can be understood that some amount of the coma aberration can remain.

Figure 42:
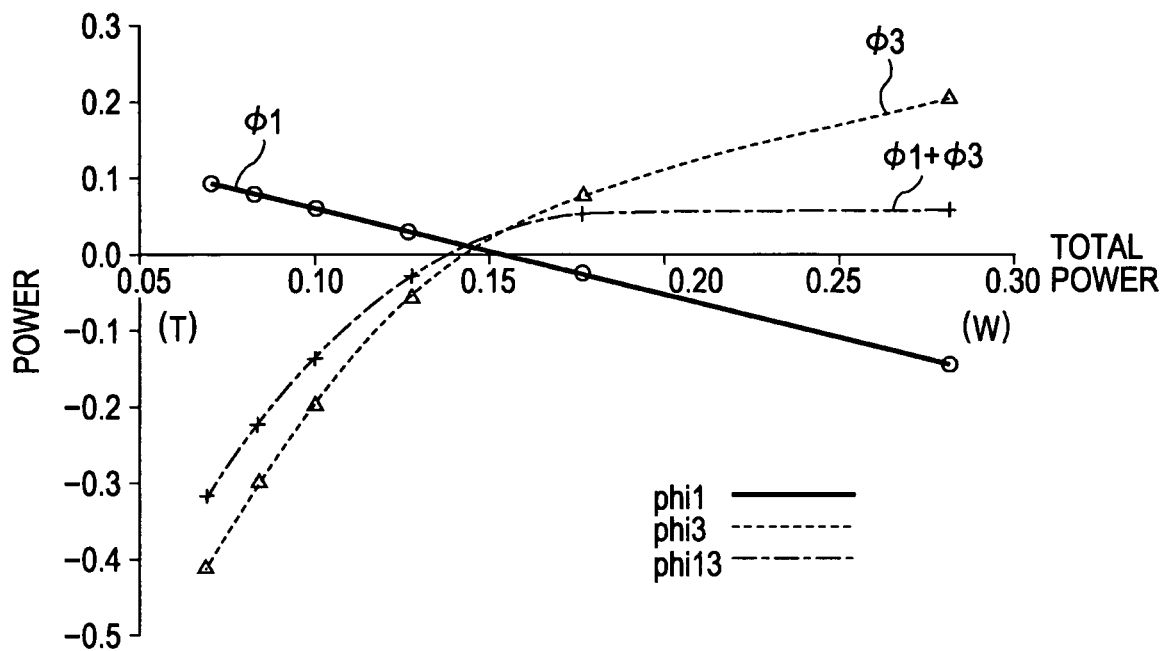
FIG. 42 is a chart illustrating change in power of an optical group G1 and an optical group G3 according to the example 6 of at least one exemplary embodiment.

FIG. 42 is a chart plotting change in power Φ1 and Φ3 of the first group G1h and the third group G3 caused by zooming, and the sum thereof Φ13(Φ1+Φ3) as to the power of the entire system.

At this time, when assuming that the maximum value of the absolute value of the power in the first group G1 and the third group G3h is |Φ|max, and the power of the sum of the first group G1h and the third group G3h is Φ13, $$-|\Phi|max \leq \Phi 13 \leq |\Phi|max$$

can be satisfied.

Satisfying the conditional expression (5) reduces the Petzval sum and the image plane distortion.

Figure 43:
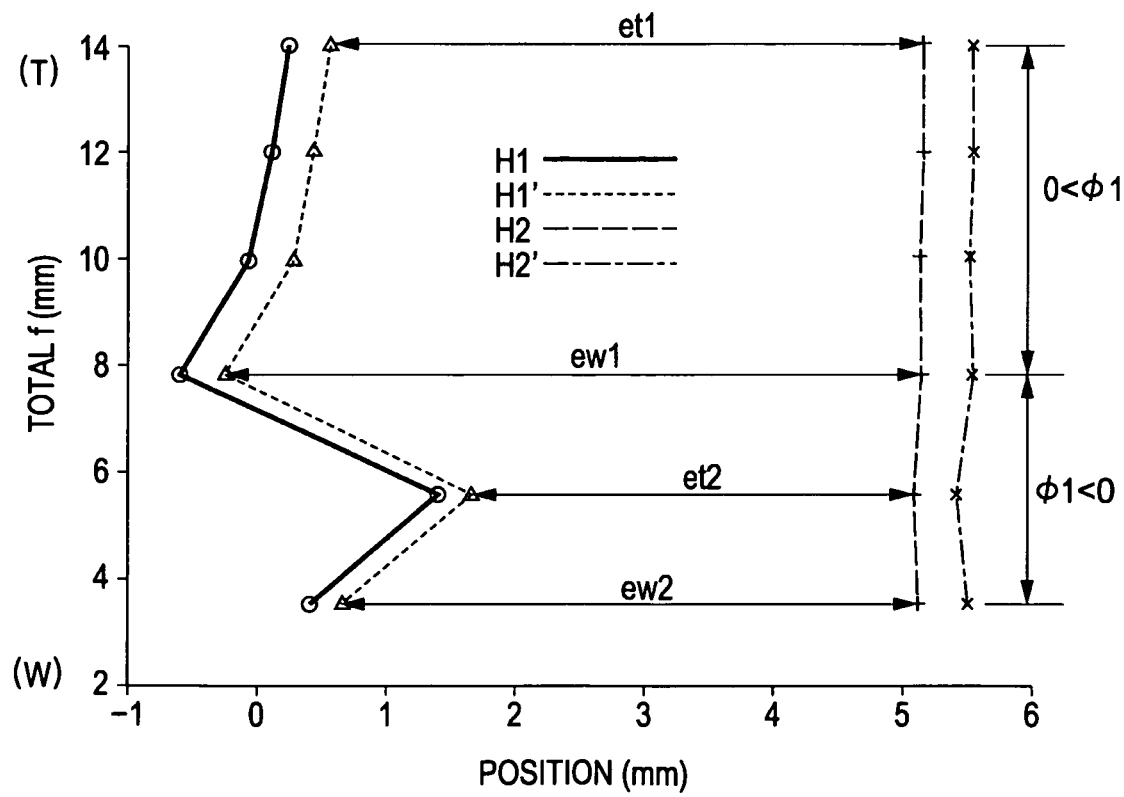
FIG. 43 is a chart illustrating change in the principal-point positions of the G1 and G3 according to the example 6 of at least one exemplary embodiment.

FIG. 43 illustrates change in the principal-point positions before and after the first group G1h and the third group G3h (H1 is the forward principal-point position of the first group G1h, H1' is the backward principal-point position of the first group G1h, H2 is the forward principal-point position of the third group G3h, and H2' is the backward principal-point position of the third group G3h). The first group G1h is made up of meniscus-shaped optical elements, so the principal-point position thereof greatly moves. Also, when comparing the change thereof with FIG. 42, it can be understood that the power of the first group G1h moves in the object direction in the positive range as the power of the entire system increases, and expands the interval of the H1 and H2.

Also, it can be understood that the power of the first group G1h moves in the object direction even in the negative range as the power of the entire system increases, and expands the interval of the H1 and H2. Also, when assuming that the forward principal-point position and the backward principal-point position of the first group G1h are H1 and H1' respectively, the forward principal-point position and the backward principal-point position of the third group G3h are H2 and H2' respectively, the distance between the object point and the H1 is eo, the distance between the H1' and H2 is e, the distance between the H2' and the image point is ei, and smaller distance between the eo and ei is e', the relationships between e and e' and the relationships of e/e' are shown in Table 11. When viewing this, it can be understood that the e and e' are essentially the same at any zoom position.

Particularly, $$0.7 < e/e' < 1.4$$

can be satisfied.

Further, as illustrated in FIG. 43, when assuming that the backward principal-point position of the first group G1h is H1', the forward principal-point position of the third group G3h is H2, the distance between the H1' and H2 in a case in which the power of the entire system is the smallest in the positive range of the power of the first group G1h at zooming (telephoto end) is et1, the distance between the H1' and H2 in a case in which the power of the entire system is the greatest (wide-angle end) is ew1, the distance between the H1' and H2 in a case in which the power of the entire system is the smallest in the negative range of the power of the first group G1h at zooming is et2, and the distance between the H1' and H2 in a case in which the power of the entire system is the greatest is ew2, it can be understood from FIG. 43 that $$et1 < ew1, et2 < ew2$$

can be satisfied.

Also, with the present example, when assuming that within the entire zoom range, the maximum value of the values obtained by dividing the maximum value of the absolute value of each image-forming magnification of the multiple optical elements E1h, E2h, E5h, and E6h of the multiple optical groups G1h and G3h of which optical power is variable by the minimum value is Bd max, and the maximum value of the values obtained by dividing the minimum value of the absolute value of each image-forming magnification of the one or more optical elements (the optical element E7h alone in the present example) E7h capable of moving in the optical-axis direction by the minimum value is Bs min, the following condition $$Bs\ min < Bd\ max$$

can be satisfied.

Also, when assuming that the amount of change in the optical-axis direction caused by zooming from the telephoto end to the wide-angle end of the forward principal-point position $H_A$ of the optical group G1h of the multiple optical groups G1h and G3h of which optical power is variable is $\Delta H_A$, the amount of change in the optical-axis direction caused by zooming from the telephoto end to the wide-angle end of the forward principal-point position $H_B$ of the optical group G3h closer to the image side than the optical group G1h is $\Delta H_B$, greater amount of change between the amount of change $\Delta H_A$ and the amount of change $\Delta H_B$ is $\Delta H_d$ max, and the amount of change of the forward principal-point position of the one or more optical elements E7h is $\Delta H_S$, the following condition $$\Delta H_S < \Delta H_d\ max$$

can be satisfied.

Specifically, as illustrated in FIG. 43, the $\Delta H_d$ max is 2.025 from change in the principal-point interval of the first group G1h, and $\Delta H_S$ is 1.489 by calculating the amount of movement of the S13 from Table 9. That is to say, it can be understood that $\Delta H_d\ max < \Delta H_S$ is satisfied.

Next, Table 12 shows change in image-forming magnification at the telephoto end, middle, and wide-angle end for each of the optical elements E1h, E2h, E5h, E6h, and E7h.

The optical elements E1h, E2h, E5h, and E6h are optical elements Ld which are decentering movable, and the optical element E7h is an optical element Ls which moves in the optical-axis direction. The maximum value Bd max is 263.97 at the optical element E5h, and on the other hand, the minimum value Bs min is 1.0193 at the optical element E7h. That is to say, it can be understood that Bd max>Bs min holds.

Note that with the present example and the following examples, focusing can be performed by moving the entire system, or by moving one optical group in the vertical direction as to the optical axis.

EXAMPLE 7

Figure 44:
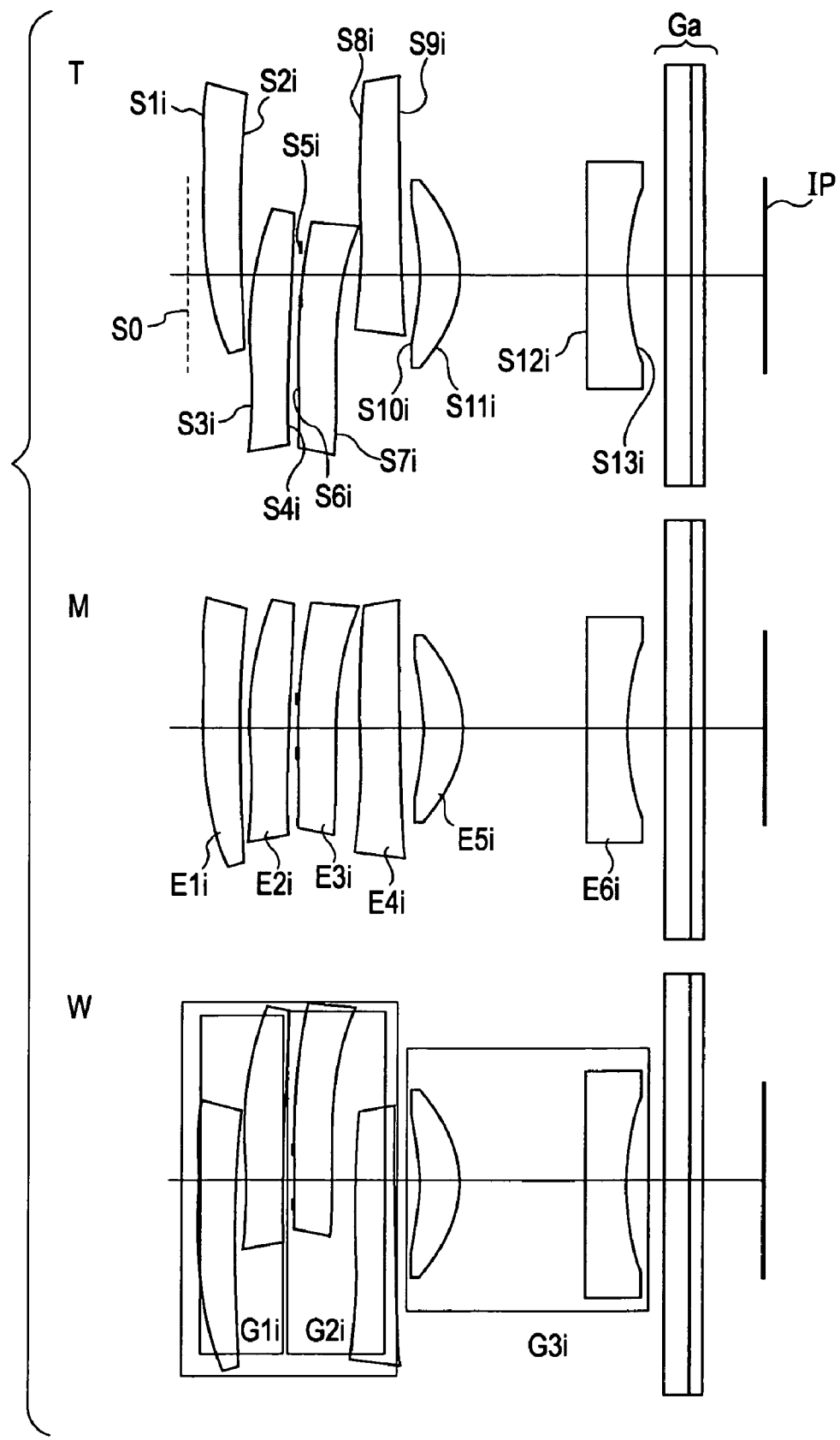
FIG. 44 is a lens cross-sectional view according to the example 6 of at least one exemplary embodiment.

FIG. 44 is a lens cross-sectional view at the telephoto end (T), middle zoom position (M), and wide-angle end (W) according to the example 7 of at least one exemplary embodiment.

Figure 45:
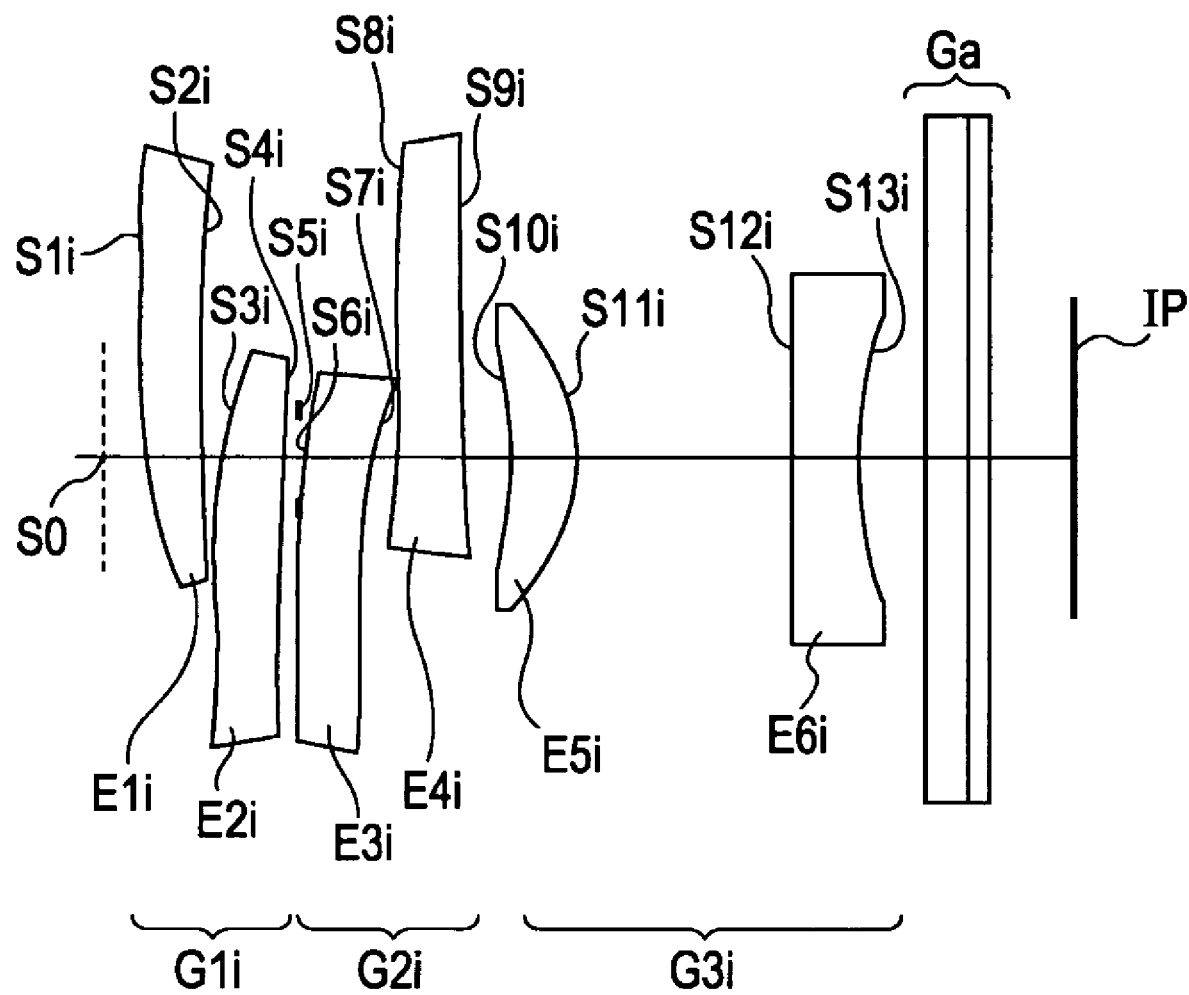
FIG. 45 is a lens cross-sectional view according to an example 7 of at least one exemplary embodiment.

FIG. 45 is a lens cross-sectional view for selecting the middle zoom position of the example 7 in FIG. 44 as an example and for describing respective factors.

With the example 7, six optical elements are employed in total. In order from the object side (forward) to the image side, optical elements E1i, E2i, E3i, and E4i have a rotational asymmetric shape, these optical elements are decentered in the Y-axis direction, and the amount of decentering continuously varies.

Also, the absolute value of the amount thereof is set so as to be equal with mutually positive/negative reverse. The optical elements E5i and E6i have a rotational symmetric aspheric surface. In the event that an asymmetric aberration remains on the optical axis, the optical elements E5i and E6i can have a rotational asymmetric shape to reduce this.

The optical elements E5i and E6i perform aid of movement power integrally in the optical-axis direction at the time of zooming. Also, a first group G1i comprises the optical elements E1i and E2i, and similarly, a second group G2i comprises the optical elements E3i and E4i.

As for surface numbers, the reference plane serving as the origin of the absolute coordinates system is determined as a surface S0, the first surface of the optical element E1i is determined as S1i, and in order, the corresponding surfaces are surfaces S2i, S3i, and S4i, and following the surface S4i (backward of the optical element E2i) a diaphragm S5i (SP) is disposed. The first surface of the optical element E3i is determined as S6i, and the subsequent numbers are assigned in order, and the image plane is S17i.

Hereinafter, let us say that the rotational asymmetric groups (optical elements E1i through E4i), which are continuously decentered in the Y-axis direction, and the rotational symmetric groups (optical elements E5i and E6i) are referred to as decentering movable blocks G1i and G2i, and an auxiliary movable block G3i.

Disposing the decentering movable blocks G1i and G2i alone makes the power thereof too strong, and can make it difficult to perform correction of an aberration, and accordingly, the auxiliary movable block is disposed. Also, both surfaces of the optical elements E1i through E4i having a rotational asymmetric shape have a rotationally asymmetrical surface shape. A flat-plate glass block Ga disposed immediately prior to a CCD surface, a CMOS surface, or other related or equivalent image pickup apparatus as known by one of ordinary skill in the relevant art is an infrared cut filter and the cover glass of a CCD (e.g., or CMOS).

The lens data of the example 7 is shown in Table 13. The amount of shift from the Z axis of each of the optical elements E1$i$ through E4$i$ is shown in Table 14, and the amount of movement in the optical-axis direction of the optical elements E5$i$ and E6$i$ shown in the surface S9$i$ and surface S13$i$ is shown in Table 15. Further, the coefficients of the rotational symmetric aspheric shapes represented with the following equation are shown in Table 16, and the coefficients represented with Equation 33 are shown in Table 17.

$$Z = \frac{ch^2}{1 + \sqrt{1 - c^2 h^2}} + Ah^4 + Bh^6 \qquad [\text{Equation 33}]$$

Here, Z is the displacement in the optical-axis direction at a position of a height h from the optical axis on the basis of a surface peak.

However, with the above equation, $h^2 = X^2 + Y^2$ can be satisfied, c is a curvature radius, and A and B are coefficients.

It can be understood that the entire length is 6.9 mm, so when calculating a ratio between this and 0.06062 mm, 0.00879 is obtained, and this is included in the range of Equation 23.

In FIG. 44, the ray illuminated a reference plane S0 first illuminates the first group G1$i$. The first group G1$i$ is made up of the two optical elements E1$i$ and E2$i$, and the surface numbers are S1$i$ through S4$i$. The optical elements E1$i$ and E2$i$ are decentered in the Y-axis direction, and the absolute value of the amount thereof is so as to be equal with mutually positive/negative reverse, as shown in Table 4. Thus, the power of the first group G1$i$ is changed from positive to negative at the time of zooming from the telephoto end to the wide-angle end.

The ray emitted from the first group G1$i$ next passes through the diaphragm S5$i$, and illuminates the second group G2$i$. The second group G2$i$, as with the first group G1$i$, comprises two optical elements E3$i$ and E4$i$, and the surface numbers thereof are S6$i$ through S9$i$. The optical elements E3$i$ and E4$i$ are decentered in the Y-axis direction, and the absolute value of the amount thereof is so as to be equal with mutually positive/negative reverse, as shown in Table 4.

Thus, the power of the second group G2$i$ is changed from negative to positive at the time of zooming from the telephoto end to the wide-angle end. The ray passed through these decentering movable blocks G1$i$ and G2$i$ illuminates the next auxiliary movable block G3$i$. The auxiliary movable block G3$i$ compensates the power necessary for the decentering movable blocks G1$i$ and G2$i$. The auxiliary movable block G3$i$ comprises the optical elements E5$i$ and E6$i$ made up of surfaces S10$i$ through S13$i$ which are rotational symmetric aspheric surfaces. The ray passed through these optical elements passes through an infrared cut filter and the cover glass of a CCD (e.g., or CMOS), and forms an image without changing the image plane.

Figure 46A:
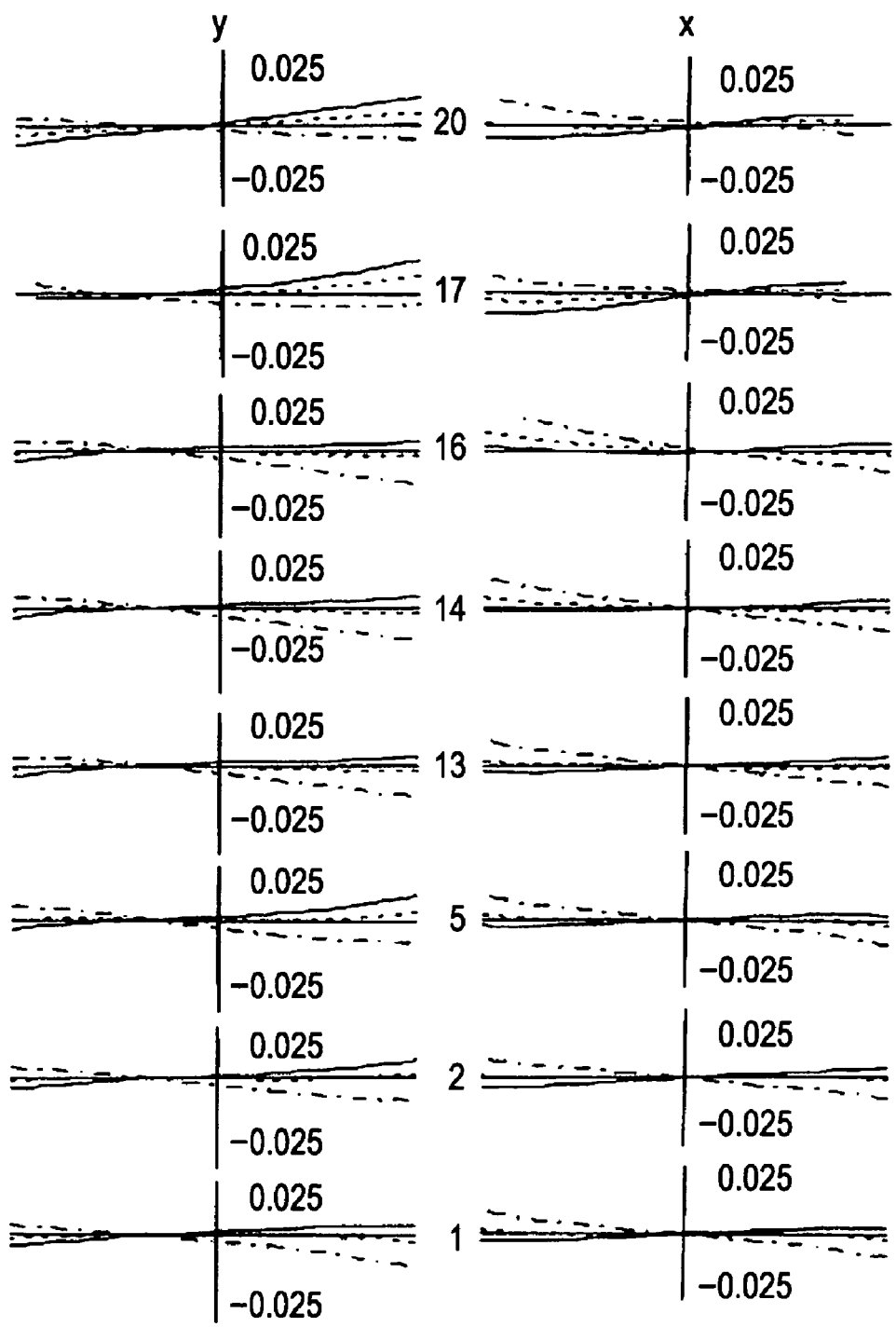
FIG. 46A is an aberration chart of the example 7 of at least one exemplary embodiment.
Figure 46B:
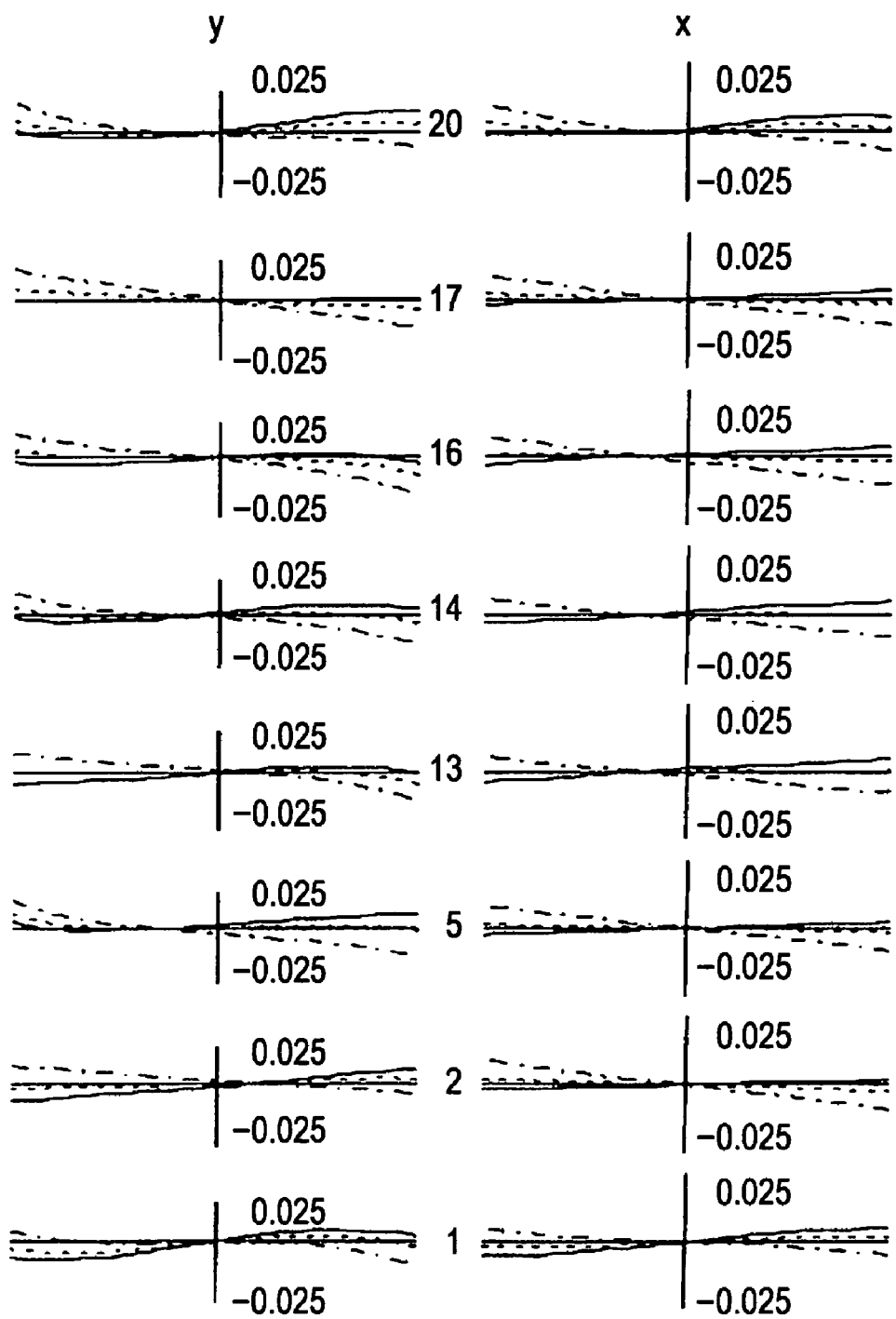
FIG. 46B is an aberration chart of the example 7 of at least one exemplary embodiment.
Figure 46C:
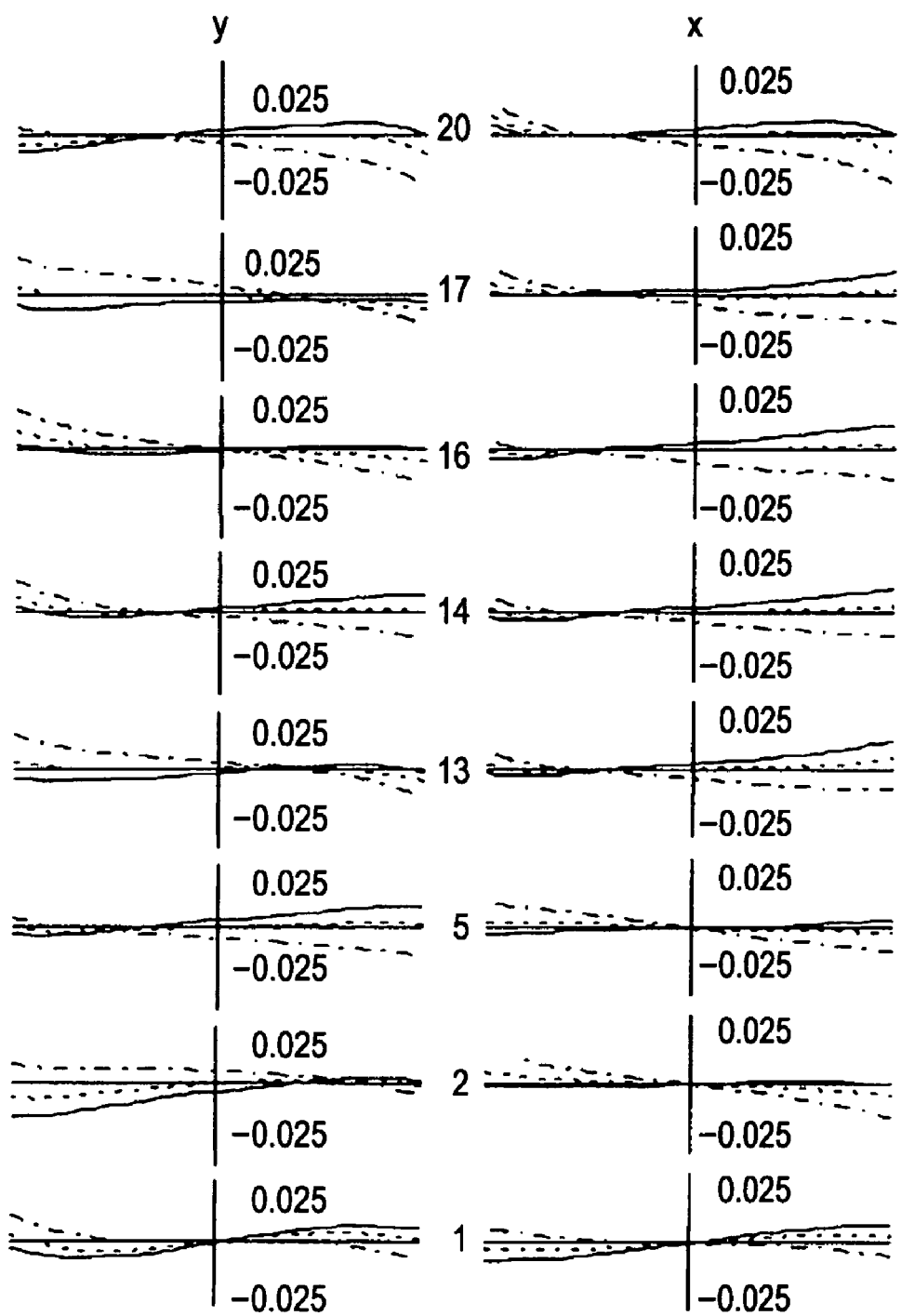
FIG. 46C is an aberration chart of the example 7 of at least one exemplary embodiment.

Next, the aberration charts at the telephoto end, middle zoom position, and wide-angle end are shown in FIG. 46A through FIG. 46C, respectively. The horizontal axis represents the position of a ray on the pupil, and the vertical axis represents the shift from the chief ray on the image plane. The range of the vertical axis is about ±20 µm. The numbers within FIG. 46A through FIG. 46C are angle-of-view numbers, which on the image plane are such as illustrated in FIG. 8. The shapes of the optical elements are symmetric as to the X axis, so only the case of the positive X direction should be taken into consideration.

Figure 47:
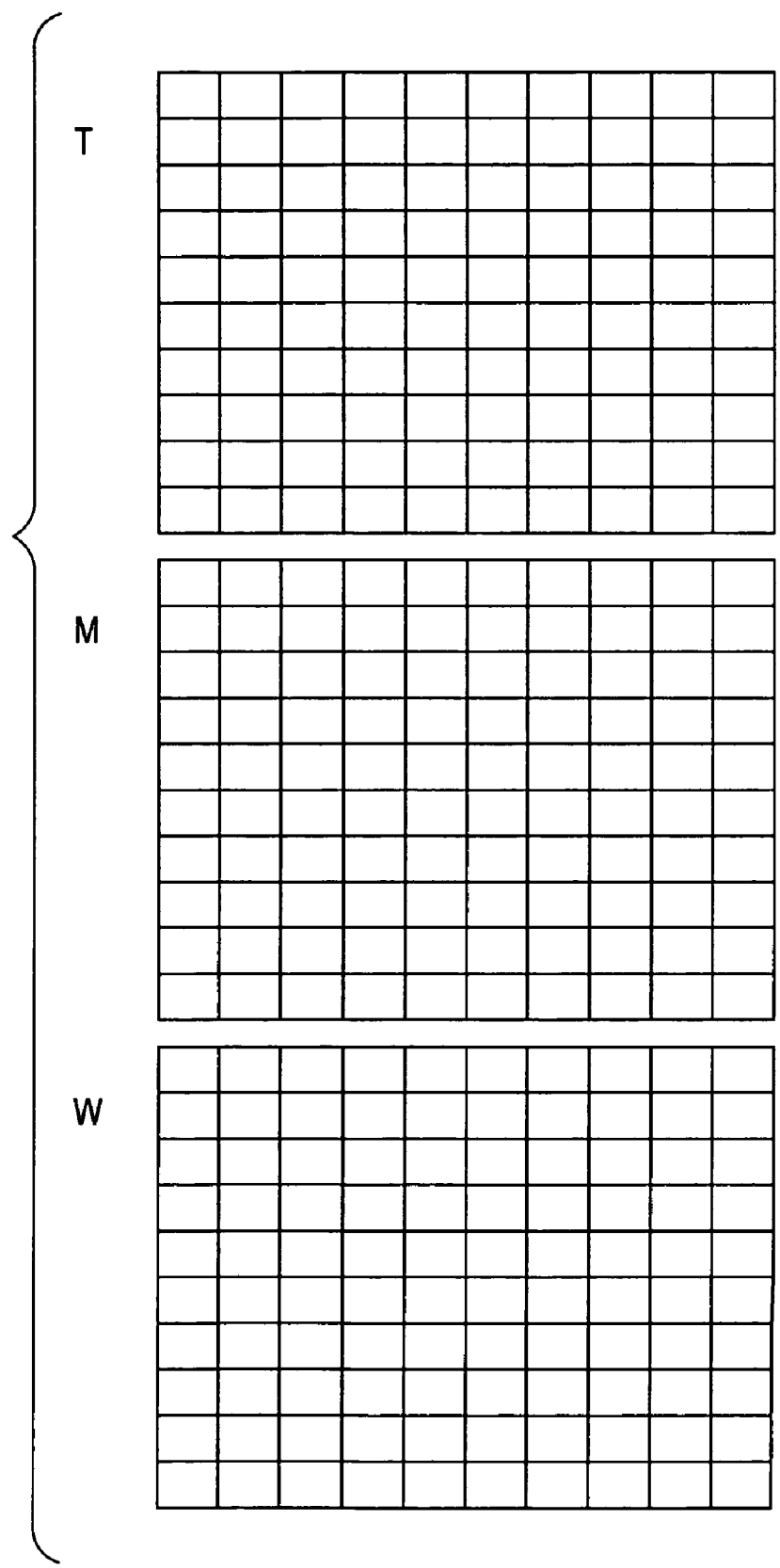
FIG. 47 is a diagram showing the distortion reactor lattices at the telephoto end, middle, and wide-angle end according to the example 7 of at least one exemplary embodiment.

When viewing the ray at an angle of view of 0°, it can be understood that a coma aberration can be reduced from the telephoto end to the wide-angle end. Also, FIG. 47 illustrates distortion lattices. The lengthwise and crosswise size of the lattices is about ¼ inch (vertically 2.7 mm×horizontally 3.6 mm). When viewing this, it can be understood that distortion is appropriately suppressed.

Figure 48:
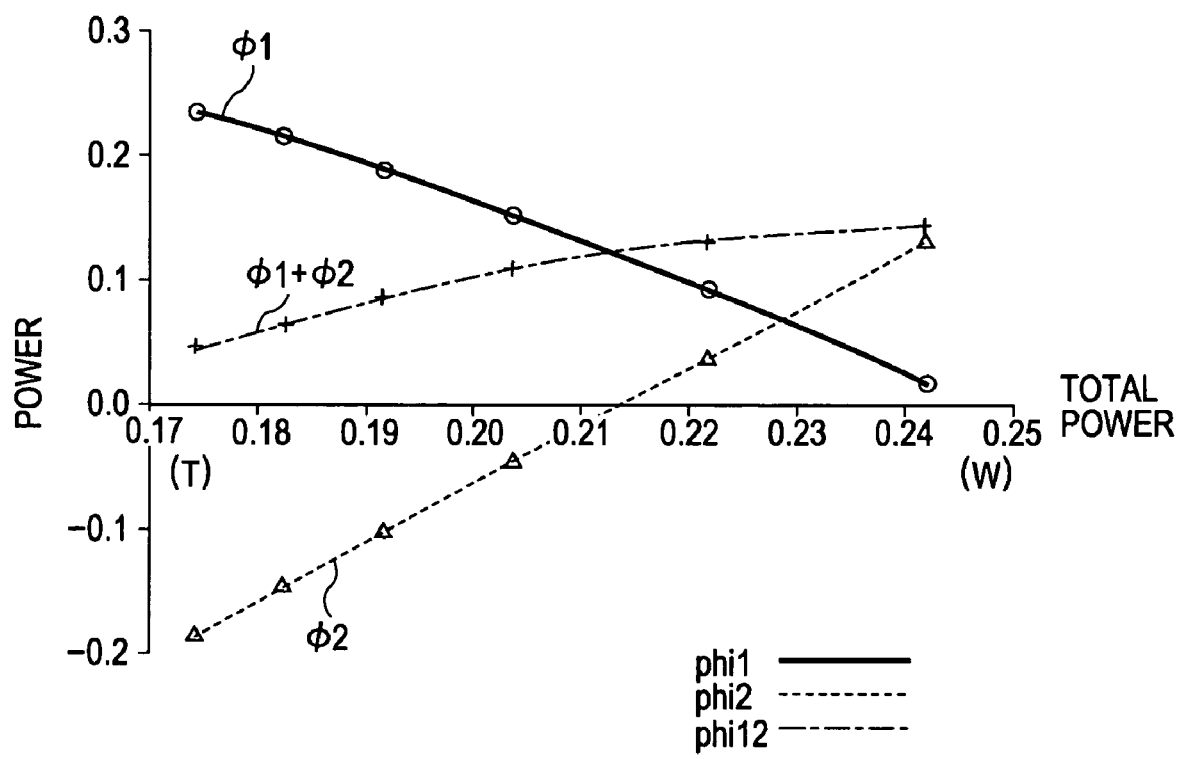
FIG. 48 is a chart illustrating change in power of an optical group G1 and an optical group G2 according to the example 7 of at least one exemplary embodiment.

FIG. 48 is a chart plotting change in power Φ1 and Φ2 of the first group G1$i$ and second group G2$i$, and the sum thereof Φ1+Φ2 as to the power of the entire system.

When assuming that the maximum value of the absolute value of the power in the first group G1$i$ and second group G2$i$ is |Φ|max, the total value of the power in the first group G1$i$ and second group G2$i$ at an arbitrary zoom position is Φ2, a greater value between the absolute value of the power of the first group G1$i$ and the absolute value of the power of the second group G2$i$ at the wide-angle end is |Φgw|max, and a smaller value between the absolute value of the power of the first group G1$i$ and the absolute value of the power of the second group G2$i$ at the telephoto end is |Φgt|min, $$|\Phi gw|\max < |\Phi gt|\min$$

can be satisfied.

Also, $$-|\Phi|\max \leq \Phi 12 \leq |\Phi|\max$$

can be satisfied.

Also, the intersection of change in power Φ1 and Φ2 of the first group G1$i$ and second group G2$i$ is disposed closer to the side having great optical power (wide-angle end) than the zoom middle position. Thus, zooming is effectively performed.

Next, Table 18 shows change in the image-forming magnification of each of the optical elements E1$i$ through E6 at the telephoto end, middle, and wide-angle end. The optical elements E1$i$, E2$i$, E3$i$, and E4$i$ are optical elements Ld which are decentering movable, and the optical elements E5$i$ and E6$i$ are optical elements Ls which move in the optical-axis direction. The maximum value Bd max is 10.384 at the optical element E3$i$, and on the other hand, the minimum value Bs min is 1.00056 at the optical element E6$i$. That is to say, it can be understood that Bd max>Bs min holds.

As described above, according to each of the examples, zooming is performed employing a block including an optical element which moves in the optical-axis direction as well as the decentering movable blocks, thereby performing zooming while appropriately eliminating an aberration, and also obtaining a compact zoom optical system.

Note that with the above respective examples, three or more optical groups of which optical power is variable can be employed. Also, two or more optical groups having symmetry as to at least one surface, and including one or more optical elements capable of moving in the optical-axis direction can be employed. Also, an optical group of which optical power is substantially unchangeable can be omitted, or two or more optical groups of which optical power is substantially unchangeable can be employed.

The above examples 6 and 7 achieve a zoom optical system capable of sufficiently eliminating an aberration even at the time of zooming by adding an optical element capable of moving in the optical-axis direction to solve the problems (a) and (b) in the above comparative example 1.

Also, with the examples 6 and 7, correction of power can be performed by disposing a coaxial lens (coaxial optical element) within an optical path to suppress the power of the decentering movable block, thereby suppressing an on-axis coma aberration.

Also, comparison will be made between the examples 6 and 7 and the comparative example 2. With the above equations, it is a condition for large magnification that the e and e' are essentially equal. Further, when assuming that the entire length is 1, it can be understood that the e or e' is greater than 0.4167 but less than 0.588 from $$e+e'=1$$

$$0.7<e/e'<1.4 \quad \text{[Equation 34]}$$

If we consider inserting an auxiliary movable block therebetween such as in at least one exemplary embodiment, it can be understood that the maximum value of the amount of movement in the optical-axis direction of the auxiliary movable block can be less than 0.588. Further, at least one exemplary embodiment takes the shift of a principal point into consideration, and sets the amount of movement of the auxiliary movable block to the following range.

$$d/T<0.6 \quad \text{[Equation 35]}$$

Further, setting the auxiliary movable block to positive power enables the power of the decentering movable block to be loosed.

Also, the auxiliary movable block is provided for correction of the decentering movable block, so is a block of which change in magnification is loosed as compared with the decentering movable block. That is to say, satisfying the following range enables the power of the decentering movable block to be loosed, and consequently, an aberration is reduced as a whole.

$$\text{Bd max} > \text{Bs min} \quad \text{[Equation 36]}$$

Also, for the same reason as the above, it can be necessary in some circumstances to compare change in the principal-point position of the decentering movable block with that of the auxiliary movable block, and enlarge the former. Accordingly, an aberration is suppressed by satisfying the following range.

$$\Delta \text{Hd max} > \Delta \text{Hs} \quad \text{[Equation 37]}$$

As described above, an asymmetric aberration such as a on-axis coma aberration is suppressed by moving the auxiliary movable block.

Also, the power of the decentering movable block can be set as follows.

When assuming that a greater absolute value between the absolute value of the power of the first group G1 and that of the third group G3 at the wide-angle end is $|\Phi gw|\text{max}$, a smaller absolute value between the power of the respective groups at the telephoto end is $|\Phi gt|\text{min}$, the power at the wide-angle end is earned by satisfying Equation 38.

$$|\Phi gw|\text{max}<|\Phi gt|\text{min} \quad \text{[Equation 38]}$$

Further, it has been known that if the Petzval is great, the curvature of field also becomes great, and if the Petzval is small, the curvature of field also becomes small.

Accordingly, at least one exemplary embodiment suppresses the curvature of field to small by reducing the Petzval. When the power at lenses Ei (i=1 through n) is $\Phi Ei$, and the refractive index of a material is nEi, the Petzval is obtained with the following equation.

$$PEi = \Phi Ei/nEi \quad \text{[Equation 39]}$$

With a normal zoom optical system using a coaxial optical element, this value can be constant. However, this value is not constant with an optical system such as in at least one exemplary embodiment where an optical element is continuously decentered, and power varies. Also, the refractive index of a nitrifying material is around 1.45 through 1.9, so change thereof is small, and accordingly, change in the Petzval can be referred to change in power.

Accordingly, in order to suppress this Petzval, when assuming that the maximum value of the absolute value of the power in the A group and the B group is $|\Phi|\text{max}$, and the power in total of the A group and the third group G3a-i is $\Phi 13$, the range of change in power is determined so as to satisfy the following equation.

$$-|\Phi|\text{max} \leq \Phi 13 \leq |\Phi|\text{max} \quad \text{[Equation 40]}$$

Next, description will be made from the perspective of a principal-point position.

In order to perform zooming while maintaining compactness, it can be necessary in some circumstances to move a principal-point position greatly from a certain position of each group. With the conventional optical system in which a tertiary curve is simply given to a single surface, a principal-point position exists only upon the surface with the tertiary coefficient thereof, and does not fluctuate greatly.

As for a method for fluctuating a principal-point position greatly, for example, an arrangement can be made where curvature is given to a single surface, and the shape of a rotational asymmetric lens is changed into a meniscus shape. The lens which can have a meniscus shape, which is different from a positive lens and a negative lens, is a lens capable of disposing a principal point outside of the lens, and employing this shape for the rotational asymmetric lens enables a principal point to be greatly fluctuated outside of the group. However, when making the rotational asymmetric lens into a meniscus shape, shifting occurs upon the upper line and underline of the marginal ray at the telephoto end or the wide-angle end (when the ray passes through the end of the lens). Accordingly, it is useful for another lens to correct this.

With a method for solving this, the lens for correction is changed into a meniscus shape, which can have a reverse tilt to cancel out the shift of the upper line and underline. A coefficient is determined by focusing attention on this at the time of introducing a higher order coefficient than a tertiary coefficient. Also, a meniscus shape can be shaped in the direction for reducing the mutual distance. This is because reducing the distance between the lenses enables a on-axis coma aberration to be reduced while suppressing this to the minimum upon each surface.

As described above, the present examples 6 and 7 reduce a on-axis coma aberration.

TABLE 1

| | a: 4.0000E−03 | | | |
| | n: 1.51742 | | | |
| | Amount of δ deviation | | | |
| | E1 | E2 | E3 | E4 |
| Telephoto end | 3.00 mm | −3.00 mm | −1.18 mm | 1.18 mm |
| Middle | 0.29 mm | −0.29 mm | 2.18 mm | −2.18 mm |
| Wide-angle end | −1.65 mm | 1.65 mm | 3.89 mm | −3.89 mm |

TABLE 2

| | Type of surface | Surface interval |
|---|---|---|
| Object surface | | Infinity |
| S0 Reference plane | | 0 |
| S1 | Flat surface | 1 |
| S2 | Polynomial surface | 0.5 |
| S3 | Polynomial surface | 1 |
| S4 | Flat surface | 0.4 |
| S5 Diaphragm surface | | 0.4 |
| S6 | Flat surface | 1 |
| S7 | Polynomial surface | 0.5 |
| S8 | Polynomial surface | 1 |
| S9 | Flat surface | |

TABLE 3

| | Type of surface | Curvature radius | Surface interval | Refractive index | Abbe number |
|---|---|---|---|---|---|
| Object surface | | | | | |
| Reference plane s0 | | | 0 | | |
| s1 | Polynomial surface | | 0.5 | 1.538604 | 65.5527 |
| s2 | Polynomial surface | | 0.3 | | |
| s3 | Polynomial surface | | 0.5 | 1.589647 | 62.0231 |
| s4 | Polynomial surface | | 0.1 | | |
| s6 | Spherical surface | 0.712795 | 0.5 | 1.48749 | 70.4058 |
| s7 | Spherical surface | 0.853974 | 0.929661 | | |
| Diaphragm surface s8 | | | 0.251098 | | |
| s9 | Spherical surface | 0.452264 | 0.5 | 1.48749 | 70.4058 |
| s10 | Spherical surface | 0.246629 | 0.819241 | | |
| s11 | Polynomial surface | | 0.6 | 1.62041 | 60.3236 |
| s12 | Polynomial surface | | 0.5 | | |
| s13 | Polynomial surface | | 0.6 | 1.62041 | 60.3236 |
| s14 | Polynomial surface | | 0.2 | | |
| s15 | Spherical surface | 0.19521 | 0.7 | 1.48749 | 70.4058 |
| s16 | Spherical surface | 0.05331 | 3 | | |
| Image plane | | | | | |

TABLE 4

| | Amount of deviation | | |
|---|---|---|---|
| Lens number | Telephoto end | Middle | Wide-angle end |
| E1 | 0.89952 | 0.49385 | −0.60408 |
| E2 | −0.89952 | −0.49385 | 0.60408 |
| E5 | −1.22297 | −0.29356 | 0.58002 |
| E6 | 1.22297 | 0.29356 | −0.58002 |

TABLE 5

| | | | | | | |
|---|---|---|---|---|---|---|
| S1 | C2: | 7.25E−02 | C3: | −2.17E−02 | C4: | −6.26E−03 |
| | C5: | 1.22E−03 | C6: | 5.61E−04 | C20: | 1.44E−01 |
| | C21: | −4.85E−02 | C22: | −1.05E−02 | C23: | −1.59E−03 |
| | C24: | 1.95E−03 | C40: | 2.90E−04 | C41: | 1.37E−03 |
| | C42: | 2.20E−03 | C60: | −4.96E−04 | | |
| S2 | C2: | 8.88E−02 | C3: | 4.58E−04 | C4: | −6.74E−03 |
| | C5: | 1.68E−03 | C6: | 6.93E−04 | C20: | 1.41E−01 |
| | C21: | 1.98E−02 | C22: | −1.06E−02 | C23: | −1.32E−03 |
| | C24: | 1.47E−03 | C40: | 1.08E−02 | C41: | 6.24E−03 |
| | C42: | 2.97E−03 | C60: | −7.26E−04 | | |
| S3 | C2: | 4.49E−02 | C3: | 5.69E−03 | C4: | 6.07E−03 |
| | C5: | 2.35E−04 | C6: | −4.21E−05 | C20: | 1.02E−01 |
| | C21: | −2.38E−02 | C22: | 4.02E−02 | C23: | 2.44E−03 |
| | C24: | −4.75E−03 | C40: | 2.87E−02 | C41: | −3.42E−03 |
| | C42: | −7.96E−03 | C60: | −1.15E−03 | | |
| S4 | C2: | 6.12E−02 | C3: | −2.26E−02 | C4: | 1.06E−02 |
| | C5: | −1.41E−03 | C6: | 5.87E−05 | C20: | 1.71E−01 |
| | C21: | −1.38E−01 | C22: | 7.36E−02 | C23: | −1.47E−02 |
| | C24: | −2.46E−03 | C40: | 3.38E−02 | C41: | −2.19E−02 |
| | C42: | −4.05E−03 | C60: | −1.28E−03 | | |
| S11 | C2: | −2.00E−02 | C3: | 2.91E−02 | C4: | 6.76E−03 |
| | C5: | −2.34E−03 | C6: | −2.23E−03 | C20: | 1.19E−02 |
| | C21: | 8.79E−02 | C22: | 6.91E−03 | C23: | −1.83E−02 |
| | C24: | −1.06E−02 | C40: | 2.13E−02 | C41: | −2.43E−02 |
| | C42: | −2.76E−02 | C60: | −6.62E−03 | | |
| S12 | C2: | −4.15E−02 | C3: | 7.74E−02 | C4: | 8.72E−03 |
| | C5: | −1.55E−03 | C6: | −2.17E−03 | C20: | −1.00E−01 |
| | C21: | 1.58E−01 | C22: | 2.16E−02 | C23: | −1.26E−02 |
| | C24: | −9.10E−03 | C40: | 6.61E−03 | C41: | −2.38E−02 |
| | C42: | −1.94E−02 | C60: | −1.42E−03 | | |
| S13 | C2: | −5.49E−03 | C3: | 3.23E−02 | C4: | −1.21E−02 |
| | C5: | −1.63E−03 | C6: | 9.65E−04 | C20: | −1.61E−01 |
| | C21: | 8.58E−02 | C22: | 1.15E−03 | C23: | −3.03E−03 |
| | C24: | −1.78E−04 | C40: | −2.17E−04 | C41: | 2.42E−03 |
| | C42: | −2.40E−03 | C60: | −2.36E−03 | | |
| S14 | C2: | −2.64E−02 | C3: | −1.02E−02 | C4: | −7.90E−03 |
| | C5: | −2.20E−03 | C6: | 7.70E−04 | C20: | −1.11E−01 |
| | C21: | −4.63E−02 | C22: | 1.04E−02 | C23: | −3.82E−03 |
| | C24: | −1.01E−04 | C40: | 1.27E−02 | C41: | −2.64E−03 |
| | C42: | 4.33E−04 | C60: | −9.88E−05 | | |

TABLE 6

| $\phi$ | ... | $\dfrac{1}{e+S_k}$ | ... | $\dfrac{1}{S_k}$ | ... |
|---|---|---|---|---|---|
| $\left|\dfrac{d\phi_1}{d\phi}\right|$ | Small | Small | Small | Equal | Great |
| $\left|\dfrac{d\phi_2}{d\phi}\right|$ | Great | Great | Great | Equal | Small |

TABLE 7

| | Type of surface | Surface interval | Refractive index | Abbe number |
|---|---|---|---|---|
| Object surface | | Infinity | | |
| Reference plane s0 | Flat surface | 0 | | |
| s1 | Polynomial surface | 0.5 | 1.48749 | 70.4 |
| s2 | Polynomial surface | 0.3 | | |
| s3 | Polynomial surface | 0.5 | 1.48749 | 70.4 |
| s4 | Polynomial surface | 0.1 | | |
| s5 | Spherical surface | 0.5 | 1.48749 | 70.4 |
| s6 | Spherical surface | 0.929645 | | |
| Diaphragm surface s7 | Flat surface | 0.251071 | | |
| s8 | Spherical surface | 0.5 | 1.48749 | 70.4 |
| s9 | Spherical surface | 0.819284 | | |
| s10 | Polynomial surface | 0.6 | 1.5759 | 62.9 |
| s11 | Polynomial surface | 0.5 | | |
| s12 | Polynomial surface | 0.6 | 1.518951 | 67.2 |
| s13 | Polynomial surface | 0.2 | | |
| s14 | Polynomial surface | 0.7 | 1.48749 | 70.4 |
| s15 | Polynomial surface | 3 | | |
| Image plane | Flat surface | | | |

TABLE 8

| | Amount of deviation | | |
|---|---|---|---|
| Lens number | Telephoto end | Middle | Wide-angle end |
| E1 | 0.9722 | 0.53763 | −0.51577 |
| E2 | −0.9722 | −0.53763 | 0.51577 |
| E5 | −1.25554 | −0.39583 | 0.50539 |
| E6 | 1.25554 | 0.39583 | −0.50539 |
| E7 | −0.68683 | −0.09902 | 0.13684 |

TABLE 9

| | | | | | | |
|---|---|---|---|---|---|---|
| S1 | C2 | 4.78E−02 | C3 | −2.66E−02 | C4 | −6.58E−03 |
| | C5 | 9.93E−04 | C6 | 5.80E−04 | C20 | 1.15E−01 |
| | C21 | −2.81E−02 | C22 | −1.31E−03 | C23 | 8.59E−04 |
| | C24 | 1.43E−02 | C40 | −3.96E−04 | C41 | 2.11E−03 |
| | C42 | 2.44E−04 | C60 | −3.19E−04 | | |
| S2 | C2 | 7.97E−02 | C3 | −1.73E−03 | C4 | −6.48E−03 |
| | C5 | 1.28E−03 | C6 | 5.89E−04 | C20 | 1.41E−01 |
| | C21 | 4.90E−02 | C22 | 4.78E−03 | C23 | 4.28E−03 |
| | C24 | 1.60E−02 | C40 | 1.42E−03 | C41 | 9.64E−03 |
| | C42 | 1.92E−03 | C60 | −2.41E−03 | | |
| S3 | C2 | 3.70E−02 | C3 | 2.38E−02 | C4 | −2.77E−03 |
| | C5 | −9.88E−04 | C6 | 6.87E−04 | C20 | 8.86E−02 |
| | C21 | 1.13E−02 | C22 | 1.74E−02 | C23 | −9.86E−04 |
| | C24 | −7.13E−04 | C40 | 2.02E−03 | C41 | 2.41E−03 |
| | C42 | −3.74E−03 | C60 | −4.76E−03 | | |
| S4 | C2 | 7.25E−02 | C3 | −9.45E−03 | C4 | 8.74E−04 |
| | C5 | −2.60E−03 | C6 | 9.37E−04 | C20 | 1.65E−01 |
| | C21 | −1.04E−01 | C22 | 4.03E−02 | C23 | −1.37E−02 |
| | C24 | 1.45E−03 | C40 | 1.80E−03 | C41 | −7.75E−03 |
| | C42 | −2.20E−03 | C60 | −3.26E−03 | | |
| S10 | C2 | −2.61E−02 | C3 | 3.20E−02 | C4 | 7.15E−03 |
| | C5 | 6.86E−04 | C6 | −2.70E−03 | C20 | 1.24E−02 |
| | C21 | −1.37E−02 | C22 | 1.49E−02 | C23 | −7.80E−03 |
| | C24 | −1.13E−02 | C40 | −4.54E−02 | C41 | 8.90E−03 |
| | C42 | −1.89E−02 | C60 | −7.19E−04 | | |
| S11 | C2 | −3.79E−02 | C3 | 8.01E−02 | C4 | 1.19E−02 |
| | C5 | 2.87E−03 | C6 | −1.77E−03 | C20 | 1.62E−02 |
| | C21 | 8.61E−02 | C22 | 2.45E−02 | C23 | −1.27E−03 |
| | C24 | −8.91E−03 | C40 | −3.90E−02 | C41 | 1.95E−02 |
| | C42 | −8.91E−03 | C60 | 4.55E−03 | | |

TABLE 9-continued

| | | | | | | |
|---|---|---|---|---|---|---|
| S12 | C2 | −1.74E−02 | C3 | 3.03E−02 | C4 | −1.01E−02 |
| | C5 | −9.73E−04 | C6 | 5.68E−04 | C20 | 6.62E−02 |
| | C21 | 8.09E−03 | C22 | −8.75E−03 | C23 | 4.91E−03 |
| | C24 | −9.23E−04 | C40 | −1.73E−02 | C41 | 1.43E−02 |
| | C42 | −6.34E−03 | C60 | −2.61E−03 | | |
| S13 | C2 | −3.94E−02 | C3 | −1.80E−02 | C4 | −6.10E−03 |
| | C5 | −1.82E−03 | C6 | 5.02E−04 | C20 | 2.07E−02 |
| | C21 | −1.54E−01 | C22 | 2.16E−03 | C23 | 2.85E−03 |
| | C24 | 3.73E−04 | C40 | 3.29E−03 | C41 | 6.87E−03 |
| | C42 | −1.49E−03 | C60 | 3.77E−03 | | |
| S14 | C2 | 1.12E−01 | C3 | 9.54E−03 | C4 | −1.83E−02 |
| | C5 | −7.46E−04 | C6 | −4.60E−03 | C20 | 2.61E−01 |
| | C21 | −8.66E−02 | C22 | −2.18E−02 | C23 | −6.73E−03 |
| | C24 | 4.42E−03 | C40 | −4.66E−02 | C41 | 1.69E−02 |
| | C42 | 1.60E−02 | C60 | 2.59E−03 | | |
| S15 | C2 | 6.96E−02 | C3 | 9.14E−03 | C4 | −2.20E−02 |
| | C5 | −1.33E−03 | C6 | −5.00E−03 | C20 | 2.43E−01 |
| | C21 | −1.16E−02 | C22 | −2.15E−02 | C23 | −1.64E−02 |
| | C24 | 2.79E−03 | C40 | −4.71E−02 | C41 | 1.02E−02 |
| | C42 | 1.42E−02 | C60 | −9.36E−05 | | |

TABLE 10

| | e | e' | e/e' |
|---|---|---|---|
| 1 | 4.66486 | 4.40074 | 1.060017 |
| 2 | 4.77492 | 4.43732 | 1.076082 |
| 3 | 4.99275 | 4.47979 | 1.114505 |
| 4 | 5.891 | 4.61327 | 1.276968 |
| 5 | 3.5578 | 3.80655 | 0.934652 |
| 6 | 4.21107 | 4.29634 | 0.980153 |

TABLE 11

|  | Type of surface | Surface interval | Refractive index | Abbe number |
|---|---|---|---|---|
| Object surface |  | Infinity |  |  |
| Reference plane s0 | Flat surface | 0 |  |  |
| s1 | Polynomial surface | 0.5 | 1.48749 | 70.4 |
| s2 | Polynomial surface | 0.3 |  |  |
| s3 | Polynomial surface | 0.5 | 1.48749 | 70.4 |
| s4 | Polynomial surface | 0.1 |  |  |
| s5 | Spherical surface | 0.5 | 1.48749 | 70.4 |
| s6 | Spherical surface | 0.929645 |  |  |
| Diaphragm surface s7 | Flat surface | 0.251071 |  |  |
| s8 | Spherical surface | 0.5 | 1.48749 | 70.4 |
| s9 | Spherical surface | 0.819284 |  |  |
| s10 | Polynomial surface | 0.6 | 1.549101 | 64.7 |
| s11 | Polynomial surface | 0.5 |  |  |
| s12 | Polynomial surface | 0.6 | 1.582253 | 67.2 |
| s13 | Polynomial surface | 1.43067 |  |  |
| s14 | Polynomial surface | 0.7 | 1.744251 | 44.2 |
| s15 | Polynomial surface | 1.76933 |  |  |
| Image plane | Flat surface |  |  |  |

TABLE 12

|  | Amount of deviation | | |
|---|---|---|---|
| Lens number | Telephoto end | Middle | Wide-angle end |
| E1 | 0.90459 | 0.51376 | −0.56819 |
| E2 | −0.90459 | −0.51376 | 0.56819 |
| E5 | −1.25999 | −0.31844 | 0.59454 |
| E6 | 1.25999 | 0.31844 | −0.59454 |

TABLE 13

|  | Amount of tilt | | |
|---|---|---|---|
| Lens number | Telephoto end | Middle | Wide-angle end |
| E7 | −0.68683 | −0.09902 | 0.13684 |

TABLE 14

| S1 | C2 | 6.50E−02 | C3 | −2.42E−02 | C4 | −6.49E−03 |
|---|---|---|---|---|---|---|
|  | C5 | 8.62E−04 | C6 | 6.90E−04 | C20 | 1.22E−01 |
|  | C21 | −3.62E−02 | C22 | −2.16E−03 | C23 | −4.12E−04 |
|  | C24 | 1.58E−03 | C40 | 4.36E−03 | C41 | 1.12E−03 |
|  | C42 | 3.67E−04 | C60 | −5.42E−04 |  |  |
| S2 | C2 | 8.79E−02 | C3 | 1.17E−03 | C4 | −6.78E−03 |
|  | C5 | 1.03E−03 | C6 | 6.84E−04 | C20 | 1.34E−01 |
|  | C21 | 4.33E−02 | C22 | 4.58E−04 | C23 | 9.45E−04 |
|  | C24 | 9.73E−04 | C40 | 1.37E−02 | C41 | 6.02E−03 |
|  | C42 | 8.06E−04 | C60 | −2.68E−03 |  |  |
| S3 | C2 | 3.48E−02 | C3 | 1.04E−02 | C4 | 5.84E−03 |
|  | C5 | −4.63E−04 | C6 | −1.20E−04 | C20 | 8.33E−02 |
|  | C21 | 7.76E−03 | C22 | 2.98E−02 | C23 | 3.16E−03 |
|  | C24 | −3.16E−03 | C40 | 2.02E−02 | C41 | 1.08E−04 |
|  | C42 | −6.92E−03 | C60 | −4.05E−03 |  |  |
| S4 | C2 | 6.14E−02 | C3 | −2.31E−02 | C4 | 1.05E−02 |
|  | C5 | −2.32E−03 | C6 | 3.23E−05 | C20 | 1.59E−01 |
|  | C21 | −1.15E−01 | C22 | 5.30E−02 | C23 | −7.61E−03 |
|  | C24 | −1.91E−03 | C40 | 2.33E−02 | C41 | −1.09E−02 |
|  | C42 | −6.00E−03 | C60 | −2.54E−03 |  |  |
| S10 | C2 | −2.08E−02 | C3 | 3.15E−02 | C4 | 5.00E−03 |
|  | C5 | −2.72E−04 | C6 | −2.39E−03 | C20 | 2.75E−02 |
|  | C21 | 4.81E−03 | C22 | 9.22E−03 | C23 | −5.95E−03 |
|  | C24 | −1.33E−02 | C40 | 2.36E−02 | C41 | 1.18E−04 |
|  | C42 | −2.04E−02 | C60 | −6.02E−03 |  |  |
| S11 | C2 | −3.50E−02 | C3 | 8.07E−02 | C4 | 9.08E−03 |
|  | C5 | 1.28E−03 | C6 | −2.44E−03 | C20 | −2.99E−02 |

TABLE 14-continued

|  | C21 | 1.48E−01 | C22 | 2.60E−02 | C23 | −6.29E−04 |
|---|---|---|---|---|---|---|
|  | C24 | −1.33E−02 | C40 | 1.14E−02 | C41 | 2.89E−03 |
|  | C42 | −1.46E−02 | C60 | −3.61E−03 |  |  |
| S12 | C2 | −2.10E−02 | C3 | 2.70E−02 | C4 | −1.09E−02 |
|  | C5 | −2.30E−03 | C6 | 3.99E−04 | C20 | −5.77E−02 |
|  | C21 | 6.67E−03 | C22 | 2.16E−02 | C23 | 6.06E−03 |
|  | C24 | −2.39E−03 | C40 | 7.33E−03 | C41 | 9.82E−03 |
|  | C42 | −1.07E−02 | C60 | −2.46E−03 |  |  |
| S13 | C2 | −2.89E−02 | C3 | −2.22E−02 | C4 | −8.53E−03 |
|  | C5 | −2.74E−03 | C6 | 3.05E−04 | C20 | −9.03E−02 |
|  | C21 | −1.40E−01 | C22 | 3.33E−02 | C23 | 5.08E−03 |
|  | C24 | −1.55E−03 | C40 | 2.18E−02 | C41 | 1.39E−03 |
|  | C42 | −5.96E−03 | C60 | 3.64E−03 |  |  |
| S14 | C2 | 2.48E−01 | C3 | −4.50E−02 | C4 | −7.67E−03 |
|  | C5 | 4.22E−03 | C6 | −6.63E−03 | C20 | 1.03E−01 |
|  | C21 | −9.87E−02 | C22 | −2.17E−02 | C23 | 9.05E−03 |
|  | C24 | 2.51E−03 | C40 | −2.17E−03 | C41 | 1.23E−02 |
|  | C42 | 5.53E−03 | C60 | −2.54E−03 |  |  |
| S15 | C2 | 2.73E−01 | C3 | −6.77E−02 | C4 | −1.10E−02 |
|  | C5 | 1.46E−02 | C6 | −1.37E−02 | C20 | 1.23E−01 |
|  | C21 | −1.00E−01 | C22 | −1.76E−02 | C23 | 8.90E−03 |
|  | C24 | 2.15E−04 | C40 | −3.09E−03 | C41 | 1.44E−02 |
|  | C42 | 2.72E−03 | C60 | −4.45E−03 |  |  |

TABLE 15

|  | e | e' | e/e' |
|---|---|---|---|
| 1 | 4.6555 | 4.36899 | 1.065578 |
| 2 | 4.74743 | 4.39491 | 1.080211 |
| 3 | 4.89929 | 4.42095 | 1.108198 |
| 4 | 5.30788 | 4.51597 | 1.175358 |
| 5 | 1.68025 | 4.07459 | 0.412373 |
| 6 | 4.08146 | 4.30733 | 0.947561 |

TABLE 16

|  | Type of surface | Curvature radius | Surface interval | Refractive index | Abbe number |
|---|---|---|---|---|---|
| Object surface |  |  | Infinity |  |  |
| Reference plane s0 | Flat surface |  | 0 |  |  |
| s1 | Polynomial surface |  | 0.5 | 1.538604 | 65.6 |
| s2 | Polynomial surface |  | 0.3 |  |  |
| s3 | Polynomial surface |  | 0.5 | 1.589647 | 62.06 |
| s4 | Polynomial surface |  | 0.1 |  |  |
| s5 | Spherical surface | 1.513485 | 0.5 | 1.48749 | 70.46 |
| s6 | Spherical surface | 1.281722 | 0.896555 |  |  |
| Diaphragm surface s7 | Flat surface |  | 0.166764 |  |  |
| s8 | Spherical surface | 2.336814 | 0.5 | 1.48749 | 70.46 |
| s9 | Spherical surface | 5.596556 | 0.936681 |  |  |
| s10 | Polynomial surface |  | 0.6 | 1.62041 | 60.36 |
| s11 | Polynomial surface |  | 0.5 |  |  |
| s12 | Polynomial surface |  | 0.6 | 1.62041 | 60.36 |
| s13 | Polynomial surface |  | 0.2 |  |  |
| s14 | Spherical surface | 3.728692 | 0.7 | 1.48749 | 70.46 |
| s15 | Spherical surface | 6.173476 | 3 |  |  |
| Image plane | Flat surface |  |  |  |  |

TABLE 17

|  | Amount of deviation | | |
|---|---|---|---|
| Lens number | Telephoto end | Middle | Wide-angle end |
| E1 | 0.90725 | 0.50479 | −0.56622 |
| E2 | −0.90725 | −0.50479 | 0.56622 |
| E5 | −1.23808 | −0.32928 | 0.55396 |
| E6 | 1.23808 | 0.32928 | −0.55396 |

TABLE 18

|  | Amount of deviation | | |
|---|---|---|---|
| Lens number | Telephoto end | Middle | Wide-angle end |
| E7 | −0.18878 | 0.01009 | 0.00099 |

TABLE 19

| S1 | C2 | 6.57E−02 | C3 | −2.26E−02 | C4 | −7.34E−03 |
|---|---|---|---|---|---|---|
|  | C5 | 7.69E−04 | C6 | 6.69E−04 | C20 | 1.42E−01 |
|  | C21 | −4.40E−02 | C22 | −6.74E−03 | C23 | −3.97E−04 |
|  | C24 | 1.85E−03 | C40 | 9.76E−04 | C41 | 9.37E−04 |
|  | C42 | 1.77E−03 | C60 | −8.97E−04 |  |  |
| S2 | C2 | 8.88E−02 | C3 | −7.93E−05 | C4 | −8.01E−03 |
|  | C5 | 9.31E−04 | C6 | 7.17E−04 | C20 | 1.29E−01 |
|  | C21 | 2.33E−02 | C22 | −4.38E−03 | C23 | 1.43E−03 |
|  | C24 | 1.54E−03 | C40 | 1.27E−02 | C41 | 6.95E−03 |
|  | C42 | 2.84E−03 | C60 | −9.50E−04 |  |  |
| S3 | C2 | 3.94E−02 | C3 | 5.74E−03 | C4 | 3.40E−03 |
|  | C5 | −1.89E−04 | C6 | −9.92E−05 | C20 | 8.19E−02 |
|  | C21 | −1.09E−02 | C22 | 3.71E−02 | C23 | 1.98E−04 |
|  | C24 | −4.10E−03 | C40 | 2.00E−02 | C41 | −1.28E−03 |
|  | C42 | −5.83E−03 | C60 | −1.14E−01 |  |  |
| S4 | C2 | 6.29E−02 | C3 | −2.27E−02 | C4 | 7.39E−03 |
|  | C5 | −2.15E−03 | C6 | 1.97E−04 | C20 | 1.68E−01 |
|  | C21 | −1.18E−01 | C22 | 6.86E−02 | C23 | −1.63E−02 |
|  | C24 | −1.60E−03 | C40 | 1.83E−02 | C41 | −1.26E−02 |
|  | C42 | −4.47E−03 | C60 | −1.57E−03 |  |  |

TABLE 19-continued

| S10 | C2 | −1.77E−02 | C3 | 2.80E−02 | C4 | 7.40E−03 |
|---|---|---|---|---|---|---|
|  | C5 | −1.08E−03 | C6 | −2.12E−03 | C20 | 2.08E−02 |
|  | C21 | 3.33E−02 | C22 | 1.28E−02 | C23 | −1.51E−02 |
|  | C24 | −1.09E−02 | C40 | 1.74E−02 | C41 | −2.60E−02 |
|  | C42 | −3.01E−02 | C60 | −7.57E−03 |  |  |
| S11 | C2 | −4.30E−02 | C3 | 7.36E−02 | C4 | 1.16E−02 |
|  | C5 | 3.34E−04 | C6 | −2.18E−03 | C20 | −8.35E−02 |
|  | C21 | 1.75E−01 | C22 | 3.14E−02 | C23 | −1.00E−02 |
|  | C24 | −1.15E−02 | C40 | 1.85E−02 | C41 | −2.37E−02 |
|  | C42 | −2.60E−02 | C60 | −6.31E−03 |  |  |
| S12 | C2 | −1.20E−02 | C3 | 3.04E−02 | C4 | −7.73E−03 |
|  | C5 | −1.46E−03 | C6 | 7.05E−04 | C20 | −1.57E−01 |
|  | C21 | 9.49E−02 | C22 | −1.03E−02 | C23 | −9.48E−03 |
|  | C24 | 2.28E−03 | C40 | 1.40E−02 | C41 | −6.51E−03 |
|  | C42 | 2.67E−03 | C60 | −3.79E−03 |  |  |
| S13 | C2 | −3.31E−02 | C3 | −9.97E−03 | C4 | −5.24E−03 |
|  | C5 | −1.89E−03 | C6 | 7.18E−04 | C20 | −1.14E−01 |
|  | C21 | −3.38E−02 | C22 | 8.50E−04 | C23 | −9.86E−03 |
|  | C24 | 1.67E−03 | C40 | 1.43E−02 | C41 | −7.61E−03 |
|  | C42 | 3.01E−03 | C60 | −4.04E−04 |  |  |

TABLE 20

|  | e | e' | e/e' |
|---|---|---|---|
| 1 | 4.58012 | 4.40445 | 1.039885 |
| 2 | 4.67492 | 4.4328 | 1.05462 |
| 3 | 4.84519 | 4.46744 | 1.084556 |
| 4 | 5.31689 | 4.64737 | 1.144064 |
| 5 | 2.1566 | 4.21798 | 0.511287 |
| 6 | 3.93389 | 4.3934 | 0.895409 |

TABLE 21

|  | Type of surface | Curvature radius | Surface interval | Refractive index | Abbe number |
|---|---|---|---|---|---|
| Object surface |  |  | Infinity |  |  |
| Reference plane s0 | Flat surface |  | 0 |  |  |
| s1 | Polynomial surface |  | 0.5 | 1.48749 | 70.4 |
| s2 | Polynomial surface |  | 0.3 |  |  |
| s3 | Polynomial surface |  | 0.5 | 1.48749 | 70.4 |
| s4 | Polynomial surface |  | 0.1 |  |  |
| s5 | Spherical surface | 1.778863 | 0.5 | 1.48749 | 70.4 |
| s6 | Spherical surface | 1.549574 | 0.929645 |  |  |
| Diaphragm surface s7 | Flat surface |  | 0.251071 |  |  |
| s8 | Spherical surface | 2.574972 | 0.5 | 1.48749 | 70.4 |
| s9 | Spherical surface | 37.2687 | 0.819284 |  |  |
| s10 | Polynomial surface |  | 0.6 | 1.556781 | 64.8 |
| s11 | Polynomial surface |  | 0.5 |  |  |
| s12 | Polynomial surface |  | 0.6 | 1.62041 | 60.3 |
| s13 | Polynomial surface |  | 0.50847 |  |  |
| s14 | Polynomial surface |  | 0.7 | 1.755201 | 27.6 |
| s15 | Polynomial surface |  | 0.222088 |  |  |
| s16 | Polynomial surface |  | 0.7 | 1.755201 | 27.6 |
| s17 | Polynomial surface |  | 1.76944 |  |  |
| Image plane | Flat surface |  |  |  |  |

TABLE 22

| | Amount of deviation | | |
|---|---|---|---|
| Lens number | Telephoto end | Middle | Wide-angle end |
| E1 | 0.9074 | 0.51109 | −0.56432 |
| E2 | −0.9074 | −0.51109 | 0.56432 |
| E5 | −1.2605 | −0.32101 | 0.59761 |
| E6 | 1.2605 | 0.32101 | −0.59761 |

TABLE 23

| | Amount of tilt | | |
|---|---|---|---|
| Lens number | Telephoto end | Middle | Wide-angle end |
| E7 | −4.35122 | −0.2827 | 1.43592 |
| E8 | −2.42017 | −0.76772 | −1.46017 |

TABLE 24

| | | | | | | | |
|---|---|---|---|---|---|---|---|
| S1 | C2 | 5.97E−02 | C3 | −2.31E−02 | C4 | −5.57E−03 |
| | C5 | 1.01E−03 | C6 | 6.79E−04 | C20 | 1.16E−01 |
| | C21 | −3.49E−02 | C22 | −4.36E−03 | C23 | −1.56E−03 |
| | C24 | 2.03E−03 | C40 | 5.09E−02 | C41 | 5.04E−04 |
| | C42 | −9.55E−05 | C60 | −9.17E−04 | | |
| S2 | C2 | 8.57E−02 | C3 | 2.21E−03 | C4 | −5.59E−03 |
| | C5 | 1.11E−03 | C6 | 6.39E−04 | C20 | 1.50E−01 |
| | C21 | 5.01E−02 | C22 | −4.53E−03 | C23 | −6.01E−04 |
| | C24 | 1.36E−03 | C40 | 1.80E−02 | C41 | 6.80E−03 |
| | C42 | 4.70E−04 | C60 | −2.69E−03 | | |
| S3 | C2 | 2.65E−02 | C3 | 8.82E−03 | C4 | 5.52E−03 |
| | C5 | −7.09E−04 | C6 | −1.80E−04 | C20 | 8.42E−02 |
| | C21 | 2.81E−02 | C22 | 1.70E−02 | C23 | 1.80E−03 |
| | C24 | −2.28E−03 | C40 | 1.84E−02 | C41 | −9.73E−04 |
| | C42 | −2.91E−03 | C60 | −2.54E−03 | | |
| S4 | C2 | 6.02E−02 | C3 | −2.71E−02 | C4 | 1.14E−02 |
| | C5 | −3.05E−03 | C6 | 1.16E−04 | C20 | 1.46E−01 |
| | C21 | −9.51E−02 | C22 | 3.53E−02 | C23 | −7.42E−03 |
| | C24 | −7.56E−04 | C40 | 1.84E−02 | C41 | −1.03E−02 |
| | C42 | −1.95E−02 | C60 | −1.36E−02 | | |
| S10 | C2 | −1.16E−03 | C3 | 2.41E−02 | C4 | 7.57E−03 |
| | C5 | 1.40E−04 | C6 | −2.42E−03 | C20 | 6.13E−02 |
| | C21 | −1.73E−02 | C22 | −9.72E−04 | C23 | −3.76E−03 |
| | C24 | −1.24E−02 | C40 | 2.09E−02 | C41 | 2.17E−03 |
| | C42 | −1.24E−02 | C60 | −7.28E−03 | | |

TABLE 24-continued

| | | | | | | | |
|---|---|---|---|---|---|---|---|
| S11 | C2 | −3.66E−02 | C3 | 7.74E−02 | C4 | 1.09E−02 |
| | C5 | 1.78E−03 | C6 | −1.91E−03 | C20 | −4.09E−02 |
| | C21 | 1.24E−01 | C22 | 1.66E−02 | C23 | −7.87E−04 |
| | C24 | −1.11E−02 | C40 | 8.04E−03 | C41 | 6.33E−03 |
| | C42 | −2.80E−03 | C60 | −1.36E−03 | | |
| S12 | C2 | −7.34E−03 | C3 | 2.08E−02 | C4 | −1.03E−02 |
| | C5 | −2.79E−03 | C6 | 1.45E−04 | C20 | −6.60E−02 |
| | C21 | 8.10E−02 | C22 | 1.89E−02 | C23 | −8.15E−04 |
| | C24 | −1.28E−03 | C40 | −8.07E−03 | C41 | −1.81E−02 |
| | C42 | −5.14E−03 | C60 | −3.59E−03 | | |
| S13 | C2 | −3.20E−02 | C3 | −2.87E−02 | C4 | −1.03E−02 |
| | C5 | −3.43E−03 | C6 | 3.99E−04 | C20 | −7.99E−02 |
| | C21 | −9.48E−02 | C22 | 3.32E−02 | C23 | −4.09E−04 |
| | C24 | 3.92E−04 | C40 | −1.53E−02 | C41 | −2.33E−02 |
| | C42 | 3.53E−03 | C60 | −4.54E−04 | | |
| S14 | C2 | −2.18E−01 | C3 | 4.56E−03 | C4 | −2.58E−02 |
| | C5 | −3.07E−03 | C6 | 1.22E−02 | C20 | −2.29E−01 |
| | C21 | −5.18E−02 | C22 | 8.42E−02 | C23 | 2.59E−02 |
| | C24 | 8.84E−04 | C40 | −3.23E−02 | C41 | 1.53E−02 |
| | C42 | −5.35E−03 | C60 | 1.33E−02 | | |
| S15 | C2 | −1.67E−01 | C3 | 1.49E−02 | C4 | −2.87E−02 |
| | C5 | −8.32E−03 | C6 | 1.43E−02 | C20 | −6.27E−02 |
| | C21 | −1.68E−03 | C22 | 7.45E−02 | C23 | 9.49E−03 |
| | C24 | 3.21E−03 | C40 | −2.11E−02 | C41 | 3.64E−03 |
| | C42 | −1.41E−02 | C60 | 1.11E−02 | | |
| S16 | C2 | 1.80E−01 | C3 | 1.02E−03 | C4 | −5.50E−03 |
| | C5 | 3.65E−05 | C6 | −9.26E−03 | C20 | 2.19E−01 |
| | C21 | −1.40E−02 | C22 | 3.77E−02 | C23 | 6.55E−03 |
| | C24 | −6.45E−03 | C40 | 3.38E−02 | C41 | −1.26E−03 |
| | C42 | −7.92E−03 | C60 | −4.67E−03 | | |
| S17 | C2 | 1.99E−01 | C3 | −8.04E−03 | C4 | 1.96E−02 |
| | C5 | 6.80E−03 | C6 | −2.56E−02 | C20 | 1.21E−01 |
| | C21 | −2.10E−02 | C22 | 4.81E−02 | C23 | 8.57E−03 |
| | C24 | −1.03E−02 | C40 | 8.75E−02 | C41 | −3.80E−04 |
| | C42 | −1.02E−02 | C60 | −1.60E−02 | | |

TABLE 25

| | e | e' | e/e' |
|---|---|---|---|
| 1 | 4.74959 | 4.29297 | 1.106365 |
| 2 | 4.83084 | 4.32908 | 1.115905 |
| 3 | 5.01599 | 4.34547 | 1.154303 |
| 4 | 5.71758 | 4.338 | 1.318022 |
| 5 | 2.75974 | 4.33504 | 0.636612 |
| 6 | 4.0421 | 4.38994 | 0.920764 |

TABLE 26

| Object surface | Type of surface | Surface interval | Refractive index | Abbe number |
|---|---|---|---|---|
| Reference plane s0 | Flat surface | 0 | | |
| s1 | XY polynomial surface | 0.6 | 1.48749 | 70.4 |
| s2 | XY polynomial surface | 0.2 | | |
| s3 | XY polynomial surface | 0.6 | 1.48749 | 70.4 |
| s4 | XY polynomial surface | 0.6 | | |
| Diaphragm surface s5 | Flat surface | 1.6 | | |
| s6 | XY polynomial surface | 0.5 | 1.5219 | 67 |
| s7 | XY polynomial surface | 0.1 | | |
| s8 | XY polynomial surface | 0.5 | 1.615232 | 51.2 |
| s9 | XY polynomial surface | 0.9 | | |
| s10 | XY polynomial surface | 0.5 | 1.48749 | 70.4 |
| s11 | XY polynomial surface | 3.0466 | | |
| Image plane | Flat surface | | | |

TABLE 27

| | Amount of deviation | | |
|---|---|---|---|
| Lens number | Telephoto end | Middle | Wide-angle end |
| E1 | 1.20411 | 1.03695 | 0.69269 |
| E2 | −1.19577 | −0.82654 | −0.12914 |
| E3 | −0.96144 | −0.34862 | 0.7032 |
| E4 | −0.43232 | −0.28899 | −0.47989 |
| E5 | 1.03109 | 0.40512 | −0.28936 |

TABLE 28

| | | | | | | | |
|---|---|---|---|---|---|---|---|
| s1 | C2 | −2.90E−02 | C3 | −4.82E−02 | C4 | −5.36E−03 | |
| | C5 | 9.16E−04 | C6 | 3.08E−04 | C20 | 9.01E−02 | |
| | C21 | −8.09E−02 | C22 | −9.40E−04 | C23 | 1.18E−02 | |
| | C24 | 3.99E−03 | C40 | −6.81E−03 | C41 | 1.06E−02 | |
| | C42 | 7.80E−03 | C60 | 1.88E−03 | | | |
| s2 | C1 | −1.00E−01 | C2 | −4.88E−02 | C3 | −2.09E−02 | |
| | C4 | −3.09E−03 | C5 | 1.35E−03 | C6 | 2.94E−04 | |
| | C20 | 5.63E−02 | C21 | −3.53E−02 | C22 | 8.12E−03 | |
| | C23 | 1.82E−02 | C24 | 4.66E−03 | C40 | −2.02E−02 | |
| | C41 | 2.09E−02 | C42 | 1.06E−02 | C60 | 1.03E−02 | |
| s3 | C1 | −2.22E−02 | C2 | 5.87E−03 | C3 | 4.20E−02 | |
| | C4 | −5.51E−03 | C5 | −4.97E−04 | C6 | 3.47E−04 | |
| | C20 | −2.68E−02 | C21 | 1.41E−01 | C22 | 1.41E−02 | |
| | C23 | −1.93E−02 | C24 | 6.55E−03 | C40 | 1.48E−03 | |
| | C41 | −3.87E−02 | C42 | 1.83E−02 | C60 | 4.02E−03 | |

TABLE 28-continued

| | | | | | | |
|---|---|---|---|---|---|---|
| s4 | C2 | 2.06E−02 | C3 | 1.42E−02 | C4 | −4.73E−03 |
| | C5 | −2.94E−03 | C6 | 7.68E−04 | C20 | −4.00E−02 |
| | C21 | 9.09E−02 | C22 | 3.21E−02 | C23 | −2.29E−02 |
| | C24 | 3.82E−03 | C40 | 2.80E−02 | C41 | −5.20E−02 |
| | C42 | 1.86E−02 | C60 | −6.72E−03 | | |
| s5 | C2 | −6.00E−02 | C3 | −6.72E−02 | C4 | −5.53E−03 |
| | C5 | 8.74E−03 | C6 | 1.06E−03 | C20 | −1.21E−02 |
| | C21 | 7.62E−02 | C22 | 1.81E−02 | C23 | −2.88E−02 |
| | C24 | −8.36E−03 | C40 | 9.74E−03 | C41 | −2.50E−02 |
| | C42 | −1.82E−02 | C60 | 8.84E−03 | | |
| s7 | C1 | −9.23E−04 | C2 | −1.25E−02 | C3 | −1.16E−02 |
| | C4 | 4.78E−03 | C5 | 9.30E−03 | C6 | 1.11E−04 |
| | C20 | 2.66E−02 | C21 | 1.55E−01 | C22 | 3.01E−02 |
| | C23 | −1.29E−02 | C24 | −4.03E−03 | C40 | −1.43E−01 |
| | C41 | −2.42E−03 | C42 | −1.01E−02 | C60 | 6.56E−02 |
| s8 | C1 | 5.94E−02 | C2 | −2.95E−02 | C3 | 1.79E−02 |
| | C4 | 3.27E−03 | C5 | 5.06E−03 | C6 | −2.95E−03 |
| | C20 | 4.76E−02 | C21 | 1.50E−01 | C22 | 2.89E−03 |
| | C23 | −2.59E−02 | C24 | 6.41E−03 | C40 | −1.41E−01 |
| | C41 | 5.46E−03 | C42 | −1.64E−02 | C60 | 2.85E−02 |
| s9 | C1 | 1.27E−01 | C2 | −1.22E−01 | C3 | −2.06E−02 |
| | C4 | 9.78E−03 | C5 | 3.74E−03 | C6 | −3.52E−03 |
| | C20 | −7.64E−02 | C21 | 1.27E−01 | C22 | −6.38E−03 |
| | C23 | −2.48E−02 | C24 | 7.39E−04 | C40 | 2.57E−05 |
| | C41 | −9.17E−03 | C42 | −2.01E−02 | C60 | −1.28E−03 |
| s10 | C1 | −2.89E−02 | C2 | −1.21E−01 | C3 | 3.59E−02 |
| | C4 | −2.18E−02 | C5 | −5.47E−03 | C6 | 3.16E−03 |
| | C20 | −2.69E−01 | C21 | 1.38E−01 | C22 | −2.02E−02 |
| | C23 | −1.76E−02 | C24 | −7.12E−03 | C40 | 3.86E−02 |
| | C41 | −2.21E−02 | C42 | −1.40E−02 | C60 | 8.06E−03 |
| s11 | C2 | 3.66E−02 | C3 | 3.51E−02 | C4 | −1.22E−02 |
| | C5 | −3.40E−03 | C6 | 2.64E−03 | C20 | −7.75E−02 |
| | C21 | 5.37E−02 | C22 | 9.63E−03 | C23 | −5.73E−03 |
| | C24 | −1.98E−03 | C40 | 1.13E−02 | C41 | −9.72E−03 |
| | C42 | −5.94E−03 | C60 | −3.64E−04 | | |

TABLE 29

| | Comparative example 2 | Example 1 | Example 2 | Example 3 | Example 4 | Example 5 |
|---|---|---|---|---|---|---|
| φ of E7 | | | | | | |
| Telephoto end | 0.070555 | 0.0524264 | 0.026859 | 0.0568105 | −0.048357 | −0.176985 |
| Middle | 0.070555 | 0.0451396 | 0.0244142 | 0.0568155 | −0.044729 | −0.160276 |
| Wide-angle | 0.070555 | 0.0441824 | 0.0250744 | 0.0568155 | −0.043986 | −0.159685 |
| Differences | 0 | 0.008244 | 0.0024448 | 5E−06 | 0.0043708 | 0.0173 |
| Difference × diagonal length | 0 | 0.037098 | 0.0110016 | 2.25E−05 | 0.0196686 | 0.07785 |
| φ of G1 | | | | | | |
| Telephoto end | 0.092751 | 0.092899 | 0.100731 | 0.0994485 | 0.0915985 | 0.202515 |
| Middle | 0.021375 | 0.0248308 | 0.0387807 | 0.0346099 | 0.0296608 | 0.151895 |
| Wide-angle | −0.18425 | −0.16593 | −0.158782 | −0.16345 | −0.175728 | 0.0666744 |

TABLE 29-continued

|  | Comparative example 2 | Example 1 | Example 2 | Example 3 | Example 4 | Example 5 |
|---|---|---|---|---|---|---|
| Differences | 0.276998 | 0.258829 | 0.259513 | 0.2628985 | 0.2673265 | 0.1358406 |
| Difference × diagonal length | 1.246491 | 1.1647305 | 1.1678085 | 1.1830433 | 1.2029693 | 0.6112827 |
| φ of G3 | | | | | | |
| Telephoto end | −0.58115 | −0.552922 | −0.515653 | −0.455917 | −0.512315 | −0.07615 |
| Middle | −0.10308 | −0.099618 | −0.086842 | −0.053169 | −0.049238 | 0.0498576 |
| Wide-angle | 0.197742 | 0.188682 | 0.216735 | 0.224316 | 0.277264 | 0.212012 |
| Differences | 0.778892 | 0.741604 | 0.732388 | 0.680233 | 0.789579 | 0.2881619 |
| Difference × diagonal length | 3.505014 | 3.337218 | 3.295746 | 3.0610485 | 3.5531055 | 1.2967286 |
| $\Delta|\phi d|min/\Delta|\phi d|$ | — | 31.396046 | 106.14897 | 52579.7 | 61.161915 | 7.8520578 |

TABLE 30

| | Type of surface | Curvature radius | Surface interval | Refractive index | Abbe number |
|---|---|---|---|---|---|
| Object surface | | | Infinity | | |
| S1 | Polynomial surface | | 0.5 | 1.48749 | 70.4 |
| S2 | Polynomial surface | | 0.3 | | |
| S3 | Polynomial surface | | 0.5 | 1.48749 | 70.4 |
| S4 | Polynomial surface | | 0.1 | | |
| S5 | Spherical surface | 1.811351 | 0.5 | 1.48749 | 70.4 |
| S6 | Spherical surface | 1.593065 | 0.837525 | | |
| S7(diaphragm surface) | Flat surface | | 0.337252 | | |
| S8 | Spherical surface | 2.618194 | 0.5 | 1.48749 | 70.4 |
| S9 | Spherical surface | 9.964944 | 0.825224 | | |
| S10 | Polynomial surface | | 0.6 | 1.48749 | 70.4 |
| S11 | Polynomial surface | | 0.5 | | |
| S12 | Polynomial surface | | 0.6 | 1.48749 | 70.4 |
| S13 | Polynomial surface | | Variable | | |
| S14 | Spherical surface | 2.997087 | 0.7 | 1.563804 | 63.7 |
| S15 | Spherical surface | 2.925063 | Variable | | |
| Image plane | Flat surface | | | | |

TABLE 31

| | Amount of deviation | | |
|---|---|---|---|
| Lens number | Telephoto end | Middle | Wide-angle end |
| E1 | 0.8603 | 0.40646 | −0.8496 |
| E2 | −0.8603 | −0.40646 | 0.8496 |
| E5 | −1.42634 | −0.47734 | 0.74018 |
| E6 | 1.42635 | 0.47734 | −0.74018 |

TABLE 32

| | Amount of movement in optical-axis direction | | |
|---|---|---|---|
| Surface interval | Telephoto end | Middle | Wide-angle end |
| S13 | 0.1161 | 1.60533 | 1.46085 |
| S15 | 3.0839 | 1.59467 | 1.73915 |

TABLE 33

| S2 | C2 | 0.064011 | C3 | −0.03116 | C4 | −0.01175 |
|---|---|---|---|---|---|---|
| | C5 | −0.00116 | C6 | 0.000393 | C20 | 0.075119 |
| | C21 | −0.04918 | C22 | 0.002403 | C23 | 0.002028 |
| | C24 | 0.002764 | C40 | 0.005307 | C41 | 0.002913 |
| | C42 | −0.00149 | C60 | −0.00124 | | |
| S3 | C2 | 7.73E−02 | C3 | −1.15E−02 | C4 | −1.31E−02 |
| | C5 | −1.25E−03 | C6 | 3.24E−04 | C20 | 7.44E−02 |
| | C21 | 1.20E−02 | C22 | 7.50E−03 | C23 | 4.11E−03 |

TABLE 33-continued

| | C24 | 2.40E−03 | C40 | 2.53E−02 | C41 | 7.20E−03 |
|---|---|---|---|---|---|---|
| | C42 | −1.87E−03 | C80 | −3.60E−03 | | |
| S4 | C2 | −2.22E−04 | C3 | 2.72E−02 | C4 | 1.07E−03 |
| | C5 | −1.16E−03 | C6 | 3.30E−04 | C20 | 1.15E−01 |
| | C21 | 2.09E−02 | C22 | 2.34E−02 | C23 | −6.92E−03 |
| | C24 | −2.12E−03 | C40 | 1.88E−02 | C41 | 4.24E−04 |
| | C42 | −1.82E−03 | C60 | −2.35E−03 | | |
| S5 | C2 | 1.07E−02 | C3 | 1.99E−03 | C4 | 2.77E−03 |
| | C5 | −2.07E−03 | C6 | 4.49E−04 | C20 | 1.66E−01 |
| | C21 | −7.04E−02 | C22 | 4.04E−02 | C23 | −1.87E−02 |
| | C24 | −2.97E−04 | C40 | 4.18E−03 | C41 | −9.75E−03 |
| | C42 | 5.91E−04 | C60 | −1.83E−04 | | |
| S11 | C2 | −6.17E−04 | C3 | 1.68E−02 | C4 | 7.78E−03 |
| | C5 | −1.69E−03 | C6 | −1.27E−03 | C20 | 6.32E−02 |
| | C21 | 2.77E−02 | C22 | 1.45E−02 | C23 | −1.51E−02 |
| | C24 | −8.81E−03 | C40 | 1.39E−02 | C41 | −2.23E−02 |
| | C42 | −2.21E−02 | C60 | −4.24E−03 | | |
| S12 | C2 | −3.47E−02 | C3 | 5.86E−02 | C4 | 1.11E−02 |
| | C5 | −1.03E−03 | C6 | −9.77E−04 | C20 | −5.60E−02 |
| | C21 | 1.62E−01 | C22 | 3.50E−02 | C23 | −1.26E−02 |
| | C24 | −7.53E−03 | C40 | 1.04E−02 | C41 | −2.22E−02 |
| | C42 | −1.79E−02 | C60 | −1.83E−03 | | |
| S13 | C2 | 3.67E−02 | C3 | 4.05E−02 | C4 | −1.63E−02 |
| | C5 | −3.14E−03 | C6 | 6.66E−04 | C20 | −7.27E−02 |
| | C21 | 6.55E−02 | C22 | −1.64E−02 | C23 | −6.86E−03 |
| | C24 | 2.62E−03 | C40 | −4.94E−03 | C41 | 9.24E−04 |
| | C42 | −6.16E−05 | C60 | −4.63E−03 | | |
| S14 | C2 | 3.53E−03 | C3 | 5.92E−03 | C4 | −1.10E−02 |
| | C5 | −4.34E−03 | C6 | 4.31E−04 | C20 | −4.00E−02 |
| | C21 | −5.69E−02 | C22 | −5.75E−04 | C23 | −8.40E−03 |
| | C24 | 1.83E−03 | C40 | 8.15E−03 | C41 | −3.22E−03 |
| | C42 | 1.40E−03 | C60 | −2.10E−03 | | |

TABLE 34

|   | e | e' | e/e' |
|---|---|---|---|
| 1 | 4.64019 | 4.45874 | 1.040695 |
| 2 | 4.68524 | 4.47408 | 1.047196 |
| 3 | 4.84857 | 4.49115 | 1.079583 |
| 4 | 5.38721 | 4.45972 | 1.20797 |
| 5 | 3.2979 | 4.56394 | 0.722599 |
| 6 | 4.32296 | 4.55333 | 0.949406 |

TABLE 35

| | Magnifying power | | | | |
|---|---|---|---|---|---|
| | E1 | E2 | E5 | E6 | E7 |
| Telephoto end | 0 | 0.466035 | 1.507369 | 2.039752 | 0.879476 |
| Middle | 0 | 0.437331 | 1.117957 | 1.117665 | 0.896435 |
| Wide-angle end | 0 | 0.381325 | 0.00571 | 0.574456 | 0.89421 |

TABLE 36

| | Type of surface | Curvature radius | Surface interval | Refractive index | Abbe number |
|---|---|---|---|---|---|
| Object surface | | | Infinity | | |
| S1 | Polynomial surface | | 0.5 | 1.563839 | 60.7 |
| S2 | Polynomial surface | | 0.1 | | |
| S3 | Polynomial surface | | 0.5 | 1.697002 | 48.5 |
| S4 | Polynomial surface | | 0.1 | | |
| S5(diaphragm surface) | Flat surface | | 0 | | |
| S6 | Polynomial surface | | 0.5 | 1.743198 | 49.3 |
| S7 | Polynomial surface | | 0.3 | | |
| S8 | Polynomial surface | | 0.5 | 1.697002 | 48.5 |
| S9 | Polynomial surface | | Variable | | |
| S10 | Aspheric surface | | 0.5 | 1.48749 | 70.2 |
| S11 | Aspheric surface | −3 | | 1.62536 | |
| S12 | Aspheric surface | −1.38429 | 0.5 | 1.48749 | 70.2 |
| S13 | Aspheric surface | −20.5692 | Variable | | |
| S14 | Flat surface | | 2.970165 | 1.494 | 75 |
| S15 | Flat surface | | | 1.51633 | 64.1 |
| S16 | Flat surface | | | | |
| Image plane | Flat surface | | | | |

TABLE 37

| | Amount of deviation | | |
|---|---|---|---|
| Lens number | Telephoto end | Middle | Wide-angle end |
| E1 | 0.89063 | 0.0945 | −0.20408 |
| E2 | −0.89063 | −0.0945 | 0.20408 |
| E3 | −1.14918 | −0.22964 | 0.09379 |
| E4 | 1.14918 | 0.22964 | −0.09379 |

TABLE 38

| | Amount of movement in optical-axis direction | | |
|---|---|---|---|
| Surface interval | Telephoto end | Middle | Wide-angle end |
| S9 | 2.77832 | 2.85902 | 2.83894 |
| S13 | 0.496332 | 0.415639 | 0.43571 |

TABLE 39

| | A | B |
|---|---|---|
| S10 | −0.00775 | −0.02033 |
| S11 | 0.042386 | 0.00162 |
| S12 | 0.01989 | −0.00842 |
| S13 | −0.00943 | −0.00301 |

TABLE 40

| | A | B |
|---|---|---|
| S10 | −0.00775 | −0.02033 |
| S11 | 0.042386 | 0.00162 |
| S12 | 0.01989 | −0.00842 |
| S13 | −0.00943 | −0.00301 |

TABLE 41

| | | | | | | |
|---|---|---|---|---|---|---|
| S1 | C2 | 0.049804 | C3 | −0.01866 | C4 | −0.00222 |
| | C5 | −0.00043 | C6 | −3.8E−05 | C20 | 0.039089 |
| | C21 | −0.10081 | C22 | 0.009658 | C23 | 0.015455 |
| | C24 | 0.004319 | C40 | −0.01888 | C41 | 0.00384 |
| | C42 | 0.007769 | C60 | 0.010441 | | |
| S2 | C2 | −1.04E−03 | C3 | 3.35E−03 | C4 | 1.34E−03 |
| | C5 | 1.06E−03 | C6 | 2.40E−04 | C20 | −2.75E−02 |
| | C21 | −6.05E−02 | C22 | 3.06E−02 | C23 | 3.32E−02 |
| | C24 | 5.75E−03 | C40 | 6.26E−04 | C41 | 1.09E−02 |
| | C42 | 8.73E−03 | C60 | 3.84E−02 | | |
| S3 | C2 | 4.72E−02 | C3 | 4.13E−02 | C4 | −8.18E−03 |
| | C5 | 6.82E−04 | C6 | 1.94E−04 | C20 | −2.05E−02 |
| | C21 | 1.16E−01 | C22 | −2.36E−02 | C23 | −2.41E−03 |
| | C24 | 1.29E−02 | C40 | 3.49E−02 | C41 | −4.08E−02 |
| | C42 | 1.85E−02 | C60 | 5.50E−03 | | |
| S4 | C2 | 3.57E−03 | C3 | 1.52E−02 | C4 | 4.27E−04 |
| | C5 | −1.37E−03 | C6 | 2.17E−04 | C20 | −3.19E−02 |
| | C21 | 3.86E−02 | C22 | 9.80E−03 | C23 | −8.82E−03 |
| | C24 | 6.36E−03 | C40 | 2.86E−02 | C41 | −1.41E−01 |
| | C42 | 3.92E−02 | C60 | −3.15E−02 | | |
| S6 | C2 | 1.77E−02 | C3 | 8.83E−03 | C4 | 7.32E−03 |
| | C5 | 5.07E−04 | C6 | −6.67E−04 | C20 | 3.76E−02 |
| | C21 | 2.14E−02 | C22 | 2.27E−02 | C23 | 1.57E−02 |
| | C24 | −1.90E−02 | C40 | −3.08E−02 | C41 | −6.30E−02 |
| | C42 | 1.02E−03 | C60 | −1.31E−02 | | |

TABLE 41-continued

| | | | | | | |
|---|---|---|---|---|---|---|
| S7 | C2 | 9.50E−03 | C3 | 4.16E−02 | C4 | 2.00E−03 |
| | C5 | 1.66E−03 | C6 | −4.20E−04 | C20 | −2.57E−02 |
| | C21 | 1.11E−01 | C22 | 1.08E−02 | C23 | 1.54E−02 |
| | C24 | −1.43E−02 | C40 | −8.12E−02 | C41 | 1.96E−02 |
| | C42 | −1.07E−02 | C60 | 3.53E−02 | | |
| S8 | C2 | 3.94E−03 | C3 | 2.01E−02 | C4 | 6.19E−03 |
| | C5 | 4.43E−04 | C6 | −2.59E−04 | C20 | −1.91E−02 |
| | C21 | 1.32E−03 | C22 | 5.29E−02 | C23 | 3.14E−02 |
| | C24 | −1.75E−03 | C40 | −4.54E−02 | C41 | 1.25E−03 |
| | C42 | −4.47E−03 | C60 | 3.60E−02 | | |
| S9 | C2 | −2.81E−03 | C3 | −4.45E−03 | C4 | 4.62E−03 |
| | C5 | 5.88E−04 | C6 | 5.69E−05 | C20 | 1.87E−02 |
| | C21 | −4.74E−02 | C22 | 3.77E−02 | C23 | 2.52E−02 |
| | C24 | 1.58E−03 | C40 | −5.16E−03 | C41 | 3.37E−04 |
| | C42 | −2.97E−03 | C60 | 8.63E−03 | | |

TABLE 42

| | Magnifying power | | | | | |
|---|---|---|---|---|---|---|
| | E1 | E2 | E3 | E4 | E5 | E6 |
| Tele-photo end | 0 | 0.486578 | 1.445043 | 1.764707 | 0.424062 | 1.261455 |
| Middle | 0 | 0.481248 | 1.120378 | 1.104816 | 0.424243 | 1.261209 |
| Wide-angle end | 0 | −0.80056 | −0.13916 | 0.575994 | 0.42375 | 1.261915 |

Also, embodiments and modifications of at least one exemplary embodiment include the following.

A zoom optical system in which multiple optical groups of which optical power is variable and one or more optical groups are disposed in the optical-axis direction for performing zooming by changing the power of the multiple optical groups of which optical power is variable, where the multiple optical groups of which optical power is variable have multiple optical elements Ld each including a rotationally asymmetrical surface for moving in the direction in the direction different from the optical axis to change the power within the optical group, and the one or more optical groups include an optical group S having one or more optical elements Ls which have symmetry as to at least one surface and can perform decentering.

A zoom optical system in which multiple optical groups of which optical power is variable and two or more optical groups are disposed in the optical-axis direction for performing zooming by changing the power of the multiple optical groups of which optical power is variable, where the multiple optical groups of which optical power is variable have multiple optical elements Ld each including a rotationally asymmetrical surface for moving in the direction in the direction different from the optical axis to change the power within the optical group, and where the two or more optical groups include an optical group S having one or more optical elements Ls which have symmetry as to at least one surface and can perform decentering, and an optical group C of which optical power is substantially unchangeable.

The one or more optical elements Ls can be capable of decentering include an optical element Lss for shifting in the direction different from the optical axis.

The one or more optical elements Ls can be capable of decentering include an optical element Lst for tilting.

EMBODIMENT 5

The sign of the optical power of the optical group C can be unchangeable within the entire zoom range.

When the maximum value of the absolute value of the optical power in the multiple optical groups of which optical power is variable is |Φd|max at the entire zoom positions, the maximum value of the absolute value of the optical power in the optical group S is |Φs|max at the entire zoom positions, the following condition $|\Phi s|max < |\Phi d|max$ can be satisfied.

The one or more optical elements Ls can be capable of decentering include an optical element Lss for shifting in the direction different from the optical axis, the multiple optical elements Ld include an optical element Lds for shifting in the direction different from the optical axis, and when assuming that the maximum value of the absolute value of the amount of shift of the optical element Lds is |Dd|max at the entire zoom positions, and the maximum value of the absolute value of the amount of shift of the optical element Lss is |Ds|max at the entire zoom positions, the following condition $|Ds|max < |Dd|max$ can be satisfied.

When moving in the direction different from the optical axis, the principal-point position of an optical group including the multiple optical elements Ld is the optical-axis direction, the multiple optical elements Ld include an optical element, which can have a shape for moving outside of the optical group.

When assuming that the forward principal-point position and backward principal-point position of an optical group A of the multiple optical groups of which optical power is variable are $H_A$ and $H_A'$ respectively, the forward principal-point position and backward principal-point position of an optical group B closer to the image side than the optical group A are $H_B$ and $H_B'$, the distance between the object point and the forward principal-point position $H_A$ is eo, the distance between the backward principal-point position $H_A'$ and forward principal-point position $H_B$ is e, the distance between the backward principal-point position $H_B'$ and the image point is ei, and a smaller distance between the distance eo and distance ei is e', the distance e and distance e' are essentially the same at an arbitrary zoom position.

Here, the following condition $0.7 < e/e' < 1.4$ can be satisfied.

When assuming that of the multiple optical groups of which optical power is variable, the backward principal-point position of the optical group A is $H_A'$, the forward principal-point position of the optical group B closer to the image side than the optical group A is $H_B$, the distance between the backward principal-point position $H_A'$ and forward principal-point position $H_B$ in a case in which the power of the entire system is the minimum within the range of the positive optical power of the area where the optical power of the optical group A is variable is et1, the distance between the backward principal-point position $H_A'$ and forward principal-point position $H_B$ in a case in which the power of the entire system is the maximum within the range of the positive optical power of the area where the optical power of the optical group A is variable is ew1, the distance between the backward principal-point position $H_A'$ and forward principal-point position $H_B$ in a case in which the power of the entire system is the minimum within the range of the negative optical power of the area where the optical power of the optical group A is variable is et2, and the distance between the backward principal-point position $H_A'$ and forward principal-point position $H_B$ in a case in which the power of the entire system is the maximum within the range of the negative optical power of the area where the optical power of the optical group A is variable is ew2, the following conditions et1<ew1 et2<ew2 can be satisfied.

When assuming that an optical group of the multiple optical groups of which optical power is variable is an optical group A, and an optical group closer to the image side than the optical group A is an optical group B, the maximum value of the absolute value of the optical power between the optical groups A and B in the entire zoom range is $|\Phi|max$. Furthermore, a first variable optical power $\Phi 1$, a second variable optical power $\Phi 2$, and the value of sum of the optical power in an arbitrary zoom position of the first and second variable optical power units can be expressed as $\Phi AB = \Phi 1 + \Phi 2$, where the following condition $-|\Phi|max \leq \leq \Phi AB \leq \leq |\Phi|max$ can be satisfied.

The zoom optical system can include an optical group of which optical power is variable, a lens group (lens unit) of which optical power is substantially unchangeable, an optical group of which optical power is variable, and an optical group having an optical element capable of decentering, in order from the object side toward the image side.

The one or more optical elements Ls can be capable of decentering perform decentering so as to correct and/or reduce the residual aberration of the optical group of which optical power is variable or/and an aberration to be generated when attempting to change optical power.

A zoom optical system in which multiple optical groups of which optical power is variable and one or more optical groups are disposed in the optical-axis direction for performing zooming by changing the power of the multiple optical groups of which optical power is variable, where the multiple optical groups of which optical power is variable have multiple optical elements Ld each including a rotationally asymmetrical surface for moving in the direction in the direction different from the optical axis to change the power within the optical group, and the one or more optical groups include an optical group S having one or more optical elements Ls which have symmetry as to at least one surface and can move in the optical-axis direction.

A zoom optical system in which multiple optical groups of which optical power is variable and one or more optical groups are disposed in the optical-axis direction for performing zooming by changing the power of the multiple optical groups of which optical power is variable, where the multiple optical groups of which optical power is variable have multiple optical elements Ld each including a rotationally asymmetrical surface for moving in the direction different from the optical axis to change the power within the optical group, and the one or more optical groups include an optical group S having one or more optical elements Ls which have symmetry as to at least one surface and can move in the optical-axis direction, and an optical group C of which optical power is substantially unchangeable.

The optical elements Ls can move at the time of zooming.

The one or more optical elements, which can move in the optical-axis direction, can include an optical element having positive refracting power.

When assuming the amount of movement in the entire zoom range of one optical element of the one or more optical elements which can move in the optical-axis direction is d, and the entire length of the entire system is T, the following condition $d/T<0.6$ can be satisfied.

When moving in the direction different from the optical axis, the principal-point position of an optical group including the multiple optical elements Ld is the optical-axis direction, and the multiple optical elements Ld include an optical element, which can have a shape for moving outside of the optical group.

When assuming that the forward principal-point position and backward principal-point position of an optical group A of the multiple optical groups of which optical power is variable are $H_A$ and $H_A'$ respectively, the forward principal-point position and backward principal-point position of an optical group B closer to the image side than the optical group A are $H_B$ and $H_B'$, the distance between the object point and the forward principal-point position $H_A$ is eo, the distance between the backward principal-point position $H_A'$ and forward principal-point position $H_B$ is e, the distance between the backward principal-point position $H_B'$ and the image point is ei, and a smaller distance between the distance eo and distance ei is e', the distance e and distance e' are essentially the same at an arbitrary zoom position.

Here, the following condition $0.7<e/e'<1.4$ can be satisfied.

When assuming that of the multiple optical groups of which optical power is variable, the backward principal-point position of the optical group A is $H_A'$, the forward principal-point position of the optical group B closer to the image side than the optical group A is $H_B$, the distance between the backward principal-point position $H_A'$ and forward principal-point position $H_B$ in a case in which the power of the entire system is the minimum within the range of the positive optical power of the area where the optical power of the optical group A is variable is et1, the distance between the backward principal-point position $H_A'$ and forward principal-point position $H_B$ in a case in which the power of the entire system is the maximum within the range of the positive optical power of the area where the optical power of the optical group A is variable is ew1, the distance between the backward principal-point position $H_A'$ and forward principal-point position $H_B$ in a case in which the power of the entire system is the minimum within the range of the negative optical power of the area where the optical power of the optical group A is variable is et2, and the distance between the backward principal-point position $H_A'$ and forward principal-point position $H_B$ in a case in which the power of the entire system is the maximum within the range of the negative optical power of the area where the optical power of the optical group A is variable is ew2, the following conditions et1<ew1 et2<ew2 can be satisfied.

When assuming that an optical group of the multiple optical groups of which optical power is variable is an optical group A, and an optical group closer to the image side than the optical group A is an optical group B, in the event of zooming from the telephoto end toward the wide-angle end, the power of the optical group A changes from positive to negative, the power of the optical group B changes from negative to positive, a zoom position where the optical power of the optical group A matches with the optical power of the optical group B exists in the entire zoom range, and the matched zoom position is closer to the wide-angle side than the middle zoom position within the entire zoom range.

When assuming that of an optical group A and an optical group B closer to the image side than the optical group A of the multiple optical groups of which optical power is variable, a greater one of which the absolute value of the optical power at the wide-angle end is $|\Phi gw|max$, and a smaller one of which the absolute value of the optical power at the telephoto end is $|\Phi gt|min$, the following condition $$|\Phi gw|max < |\Phi gt|min$$

can be satisfied.

When assuming that an optical group of the multiple optical groups of which optical power is variable is an optical group A, and an optical group closer to the image side than the optical group A is an optical group B, the maximum value of the absolute value of the optical power between the optical groups A and B in the entire zoom range is $|\Phi|max$, and the total value of the optical power of the optical group A and optical group B at an arbitrary zoom position is $\Phi_{AB}$, the following condition $$-|\Phi|max \leq \Phi_{AB} \leq |\Phi|max$$

can be satisfied.

When assuming that of the entire zooming range, the maximum value of the values obtained by dividing the maximum value of the absolute value of the image-forming magnification of each of the multiple optical elements Ld by the minimum value is Bd max, and the minimum value of the values obtained by dividing the maximum value of the absolute value of the image-forming magnification of each of the one or more optical elements Ls by the minimum value is Bs min, the following condition $$Bs\ min < Bd\ max$$

can be satisfied.

When assuming that the amount of change in the optical-axis direction caused by zooming from the telephoto end toward the wide-angle end of the forward principal-point position $H_A$ of the optical group A of the multiple optical groups of which optical power is variable is $\Delta H_A$, the amount of change in the optical-axis direction caused by zooming from the telephoto end toward the wide-angle end of the forward principal-point position $H_B$ of the optical group B closer to the image side than the optical group A is $\Delta H_B$, greater amount of change between the amount of change $\Delta H_A$ and the amount of change $\Delta H_B$ is $\Delta H_d$ max, and the amount of change of the forward principal-point position of the one or more optical elements Ls is $\Delta H_S$, the following condition $$\Delta H_S < \Delta H_d\ max$$

can be satisfied.

An image can be formed on a photoelectric conversion element.

An imaging apparatus can including the zoom optical system, and a photoelectric conversion element for photo-accepting an image formed by the zoom optical system.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Applications No. 2005-186984 filed Jun. 27, 2005, and No. 2005-186961 filed Jun. 27, 2005, which are hereby incorporated by reference herein in their entirety.

What is claimed is:

1. A zoom optical system comprising:
a plurality of variable power optical units of which optical power changes as magnification varies, wherein the plurality of variable power optical units each has plural optical elements moving in a direction different from an optical axis as magnification varies;
a fixed optical unit of which optical power does not change as magnification varies; and
a moving optical unit which moves as magnification varies, wherein when the maximum value of the absolute value of the optical power in an optical group of the plurality of variable power optical units is $|\Phi d|$ max within the entire range of variable power positions, and the maximum value of the absolute value of the optical power of the moving optical unit is $|\Phi s|$ max within the entire range of variable power positions, the following condition $$|\Phi s|\ max < |\Phi d|\ max$$

is satisfied.

2. The zoom optical system according to claim 1, wherein the plurality of variable power optical units each include a rotational asymmetrical surface and have an optical element for moving in the direction different from the optical axis.

3. The zoom optical system according to claim 1, wherein the moving optical unit moves in the direction different from the optical axis as magnification varies.

4. The zoom optical system according to claim 1, wherein the moving optical unit moves along the optical axis as magnification varies.

5. The zoom optical system according to claim 4, wherein when the amount of movement within the entire zoom range of the moving optical unit is d, and the entire length of the entire system is T, the following condition $$d/T < 0.6$$

is satisfied.

6. The zoom optical system according to claim 1, wherein the moving optical unit is made up of one optical element.

7. The zoom optical system according to claim 1, wherein the sign of the optical power of the moving optical unit is unchangeable over the entire variable power range.

8. The zoom optical system according to claim 1, wherein the moving optical unit has an optical element for moving in the direction different from the optical axis; and
wherein when the maximum value of the absolute value of the amount of shift of an optical element of the plurality of variable optical units within the entire range of variable power positions is $|Dd|$ max, and the maximum value of the absolute value of the amount of shift of the optical element of the moving optical units within the entire range of variable power positions is |Ds| max, the following condition

|Ds| max < |Dd| max is satisfied.

9. The zoom optical system according to claim 1, wherein the moving optical unit includes an optical element having positive refracting power.

10. The zoom optical system according to claim 1, wherein the plurality of variable power optical units have a first variable power optical unit and a second variable power optical unit; and
  wherein when a greater absolute value of the optical power at the wide-angle end of the first and second variable power optical units is |Φgw . max, and a smaller absolute value of the optical power at the telephoto end of the first and second optical units is |Φgt| min, the following condition

|Φgw| max < |Φgt| min is satisfied.

11. The zoom optical system according to claim 1, wherein the plurality of variable power optical units have a first variable power optical unit and a second variable power optical unit; and
  wherein when the maximum value of the absolute value of the optical power in the first and second variable power optical units in the entire zoom range is |Φ| max and Φ1 is the first variable power optical unit optical power and Φ2 is the second variable power optical unit optical power then when the value of sum of the optical powers in an arbitrary zoom position of the first and second variable power optical units is ΦAB=Φ1+Φ2, the following condition −|Φ| max ≦ΦAB ≦|Φ| max is satisfied.

12. An imaging apparatus comprising: the zoom optical system according to claim 1; and
  a photoelectric conversion element for photo-accepting an image to be formed by the zoom optical system.

13. A zoom optical system comprising:
  a plurality of variable power optical units of which optical power changes as magnification varies, wherein the plurality of variable power optical units each has plural optical elements moving in a direction different from an optical axis as magnification varies;
  a fixed optical unit of which optical power does not change as magnification varies; and
  a moving optical unit which moves as magnification varies,
  wherein the moving optical unit has an optical element for moving in the direction different from the optical axis; and
  wherein when the maximum value of the absolute value of the amount of shift of an optical element of the plurality of variable optical units within the entire range of variable power positions is |Dd| max, and the maximum value of the absolute value of the amount of shift of the optical element of the moving optical units within the entire range of variable power positions is |Ds| max, the following condition

|Ds| max < |Dd| max is satisfied.

14. An imaging apparatus comprising:
  the zoom optical system according to claim 13; and
  a photoelectric conversion element for photo-accepting an image to be formed by the zoom optical system.

15. A zoom optical system comprising:
  a plurality of variable power optical units of which optical power changes as magnification varies, wherein the plurality of variable power optical units each has plural optical elements moving in a direction different from an optical axis as magnification varies;
  a fixed optical unit of which optical power does not change as magnification varies; and
  a moving optical unit which moves as magnification varies,
  wherein when the amount of movement within the entire zoom range of the moving optical unit is d, and the entire length of the entire system is T, the following condition d/T<0.6 is satisfied.

16. An imaging apparatus comprising:
  the zoom optical system according to claim 15; and
  a photoelectric conversion element for photo-accepting an image to be formed by the zoom optical system.

17. A zoom optical system comprising:
  a plurality of variable power optical units of which optical power changes as magnification varies, wherein the plurality of variable power optical units each has plural optical elements moving in a direction different from an optical axis as magnification varies;
  a fixed optical unit of which optical power does not change as magnification varies; and
  a moving optical unit which moves as magnification varies,
  wherein the plurality of variable power optical units have a first variable power optical unit and a second variable power optical unit; and
  wherein when the maximum value of the absolute value of the optical power in the first and second variable power optical units in the entire zoom range is |Φ| max and Φ1 is the first variable power optical unit optical power and Φ2 is the second variable power optical unit optical power then when the value of sum of the optical powers in an arbitrary zoom position of the first and second variable power optical units is ΦAB=Φ1+Φ2, the following condition −|Φ| max ≦ΦAB ≦|Φ| max is satisfied.

18. An imaging apparatus comprising:
  the zoom optical system according to claim 17; and
  a photoelectric conversion element for photo-accepting an image to be formed by the zoom optical system.

19. A zoom optical system comprising:
  a plurality of variable power optical units of which optical power changes as magnification varies, wherein the plurality of variable power optical units each has plural optical elements moving in a direction different from an optical axis as magnification varies;
  a fixed optical unit of which optical power does not change as magnification varies; and
  a moving optical unit which moves in the direction different from the optical axis as magnification varies.

20. An imaging apparatus comprising: the zoom optical system according to claim 19; and
  a photoelectric conversion element for photo-accepting an image to be formed by the zoom optical system.

* * * * *